United States Patent
Nakasaka et al.

(10) Patent No.: US 8,573,166 B2
(45) Date of Patent: Nov. 5, 2013

(54) SPARK IGNITION TYPE INTERNAL COMBUSTION ENGINE

(75) Inventors: Yukihiro Nakasaka, Suntou-gun (JP);
Yoshihiro Sakayanagi, Mishima (JP);
Hiroyuki Tanaka, Susono (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 0 days.

(21) Appl. No.: 13/575,851

(22) PCT Filed: Jan. 28, 2010

(86) PCT No.: PCT/JP2010/051543
§ 371 (c)(1),
(2), (4) Date: Jul. 27, 2012

(87) PCT Pub. No.: WO2011/092867
PCT Pub. Date: Aug. 4, 2011

(65) Prior Publication Data
US 2012/0304968 A1 Dec. 6, 2012

(51) Int. Cl.
*F02B 75/04* (2006.01)
(52) U.S. Cl.
USPC .... 123/48 R; 123/48 C; 123/78 C; 123/78 R; 123/90.15; 701/101; 701/105
(58) Field of Classification Search
USPC ............... 123/48 R, 48 C, 78 R, 78 C, 90.15; 701/101, 105
See application file for complete search history.

(56) References Cited

U.S. PATENT DOCUMENTS

| | | | |
|---|---|---|---|
| 7,753,013 B2* | 7/2010 | Hiyoshi et al. | 123/78 E |
| 7,917,279 B2* | 3/2011 | Akihisa et al. | 701/103 |
| 7,997,241 B2* | 8/2011 | Kamiyama et al. | 123/90.17 |
| 8,347,834 B2* | 1/2013 | Akihisa et al. | 123/78 C |
| 8,413,618 B2* | 4/2013 | Kamiyama et al. | 123/48 B |
| 2002/0139346 A1* | 10/2002 | Aoyama et al. | 123/339.24 |
| 2009/0125211 A1* | 5/2009 | Akihisa et al. | 701/103 |

FOREIGN PATENT DOCUMENTS

| | | |
|---|---|---|
| JP | 2004-218522 A | 8/2004 |
| JP | 2007-303423 A | 11/2007 |
| JP | 2008-025540 A | 2/2008 |

OTHER PUBLICATIONS

International Search Report mailed Mar. 9, 2010 of PCT/JP2010/051543.

* cited by examiner

*Primary Examiner* — Noah Kamen
*Assistant Examiner* — Grant Moubry
(74) *Attorney, Agent, or Firm* — Kenyon & Kenyon LLP

(57) ABSTRACT

An internal combustion engine which is provided with a variable compression ratio mechanism which can change a mechanical compression ratio and a variable valve timing mechanism which can control a closing timing of an intake valve. No-entry regions ($X_1$, $X_2$) are set for a combination of the mechanical compression ratio, the closing timing of the intake valve, and the intake air amount. Furthermore, a no-entry layer is set so as to surround the no-entry region ($X_2$). When the demanded intake air amount is made to decrease and the operating point moves toward the no-entry region ($X_2$), the operating point is prohibited from entering the no-entry layer whereby the operating point is blocked from entering the no-entry region ($X_2$).

7 Claims, 38 Drawing Sheets

Fig.6
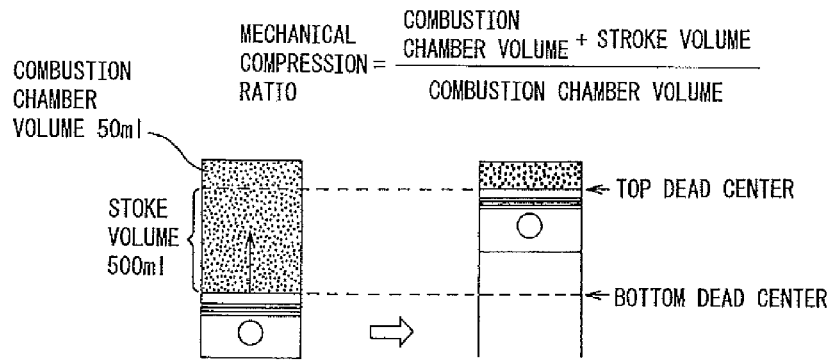
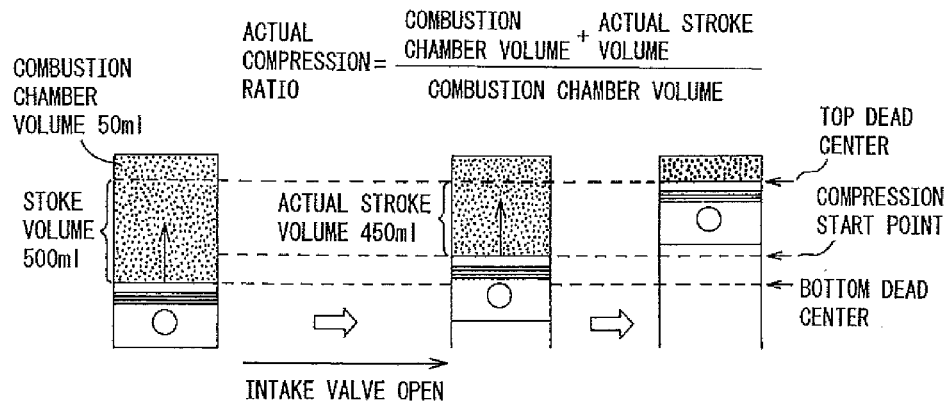
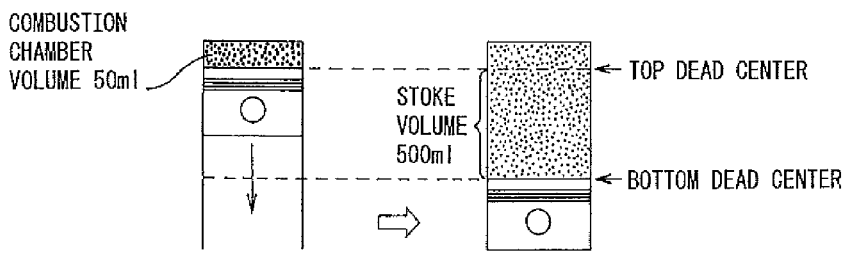

Fig.12
(A)
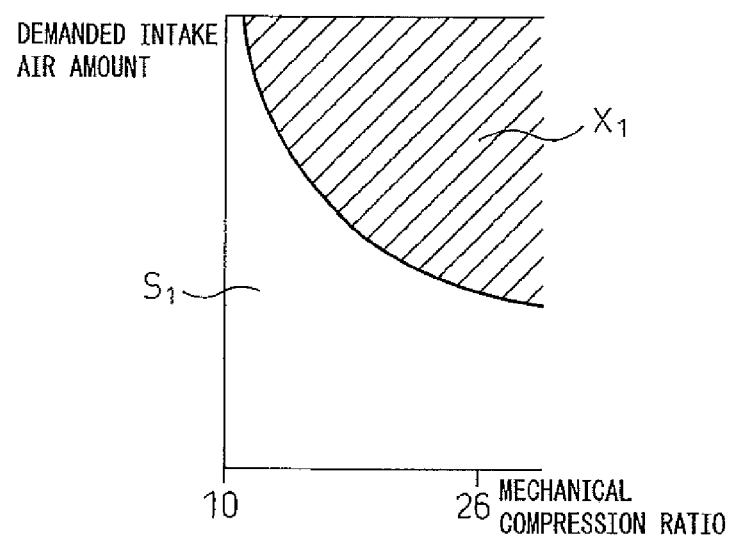
(B)
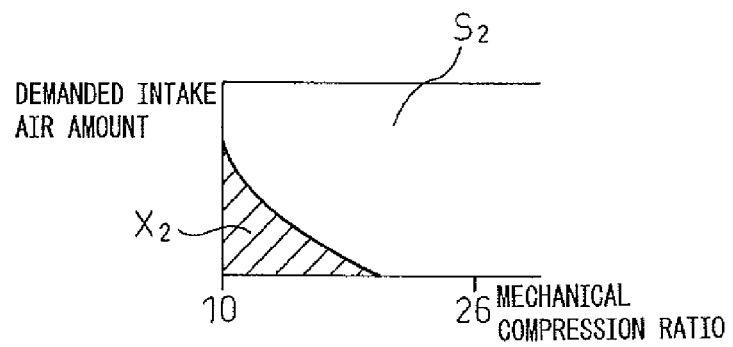

Fig. 34
(A)
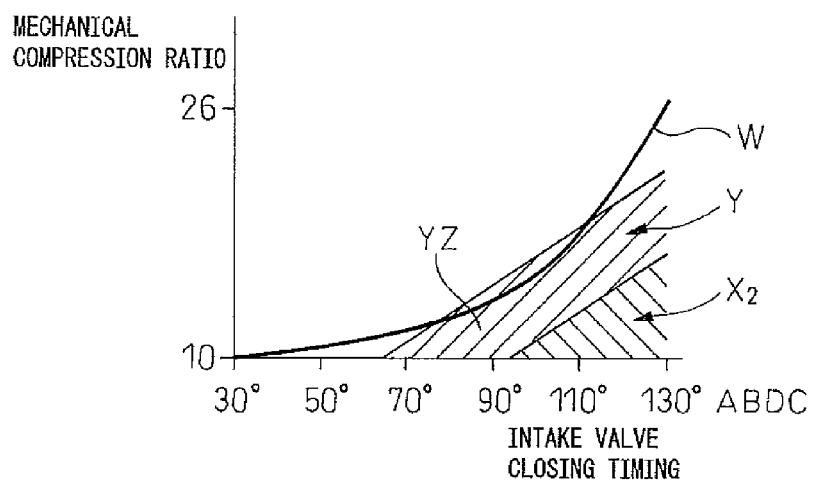
(B)
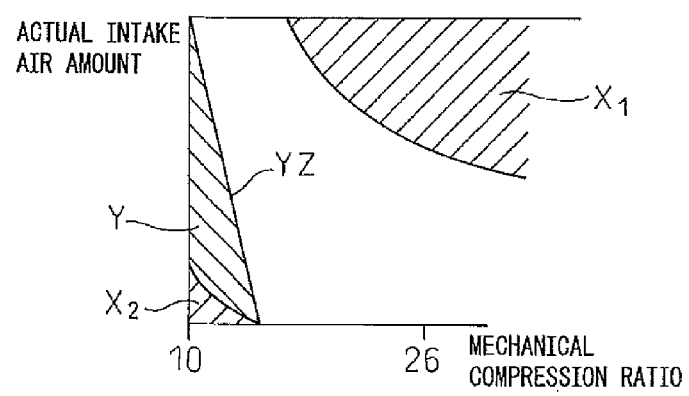
(C)
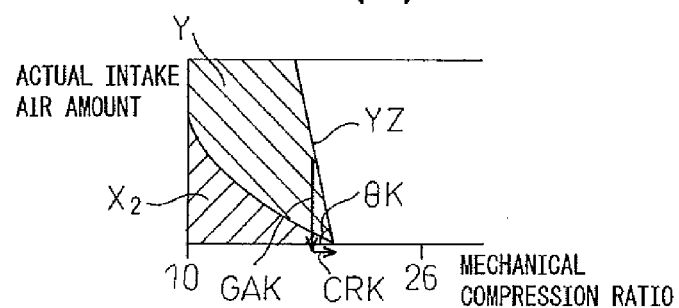

SPARK IGNITION TYPE INTERNAL COMBUSTION ENGINE

This is a 371 national phase application of PCT/JP2010/051543 filed 28 Jan. 2010, the contents of which are incorporated herein by reference.

TECHNICAL FIELD

The present invention relates to a spark ignition type internal combustion engine.

BACKGROUND ART

Known in the art is a spark ignition type internal combustion engine which is provided with a variable compression ratio mechanism which can change the mechanical compression ratio and a variable valve timing mechanism which can control a closing timing of an intake valve and which is designed to maintain an actual compression ratio substantially constant regardless of an engine load (see, for example, Patent Literature 1). In this internal combustion engine, as the engine load becomes higher, that is, as the demanded intake air amount becomes greater, the closing timing of the intake valve is advanced to approach intake bottom dead center. At this time, to maintain the actual compression ratio substantially constant, the mechanical compression ratio is made to drop as the demanded intake air amount becomes greater.

CITATIONS LIST

Patent Literature

Patent Literature 1: Japanese Patent Publication (A) No. 2007-303423

SUMMARY OF INVENTION

Technical Problem

In this regard, if making the closing timing of the intake valve and the mechanical compression ratio change in accordance with the demanded intake air amount in this way, usually the speeds by which the closing timing of the intake valve and the mechanical compression ratio can be made to change differ. Generally speaking, making the mechanical compression ratio change requires more time than making the closing timing of the intake valve change. Therefore, for example, when the demanded intake air amount is made to decrease, the speed of retardation of the closing timing of the intake valve becomes faster than the speed of increase of the mechanical compression ratio and therefore the intake air amount is made to decrease before the mechanical compression ratio becomes higher. As a result, the problem arises that the compression end pressure in the combustion chamber becomes lower and therefore good combustion can no longer be obtained.

Therefore, in a spark ignition type internal combustion engine which is provided with a variable compression ratio mechanism and a variable valve timing mechanism, it is necessary to set a no-entry region in which the compression end pressure becomes low for combinations of the mechanical compression ratio, the closing timing of the intake valve, and the intake air amount and to prohibit an operating point showing the combination of the mechanical compression ratio, the closing timing of the intake valve, and the intake air amount from entering this no-entry region.

In this regard, in this case, when the above-mentioned operating point reaches the no-entry region, it is possible to change the direction of movement of the operating point in a direction where it will not enter the no-entry region and thereby prevent the operating point from entering the no-entry region. However, even if making the direction of movement of the operating point change when the operating point reaches the no-entry region in this way, sometimes the operating point will actually end up entering the no-entry region. Therefore, there is the problem that there is a risk that good combustion can no longer be obtained.

An object of the present invention is to provide a spark ignition type internal combustion engine which can secure good combustion when the demanded intake air amount is made to decrease.

Solution to Problem

According to the present invention, there is provided a spark ignition type internal combustion engine comprising a variable compression ratio mechanism which can change a mechanical compression ratio and a variable valve timing mechanism which can control a closing timing of an intake valve, wherein a no-entry region for a combination of a mechanical compression ratio, a closing timing of an intake valve and an intake air amount is set, an operating point showing the combination of the mechanical compression ratio, the closing timing of the intake valve and the intake air amount is prohibited from entering the no-entry region regardless of an operating state of the engine, the no-entry region has a broadest region at the time of a minimum intake air amount and gradually becomes smaller as the intake air amount increases, a no-entry layer is set which extends along an edge of the no-entry region at the time of the minimum intake air amount and which extends from the no-entry region toward an intake air amount increase side while surrounding the no-entry region as the intake air amount increases from the minimum intake air amount, the operating point is prohibited from entering the no-entry layer when the demanded intake air amount is made to decrease and the operating point moves toward the no-entry region, and thereby the operating point is blocked from entering the no-entry region.

Advantageous Effects of Invention

Movement of the operating point toward the no-entry region is blocked by the no-entry layer before the operating point approaches the no-entry region. As a result, it is possible to reliably avoid the operating point entering the no-entry region and therefore possible to obtain good combustion.

BRIEF DESCRIPTION OF THE DRAWINGS

FIG. 6 is a view for explaining a mechanical compression ratio, actual compression ratio, and expansion ratio.

FIG. 12 is a view which shows a no-entry region.

FIG. 34 is a view showing a no-entry layer.

DESCRIPTION OF EMBODIMENTS

Figure 1:
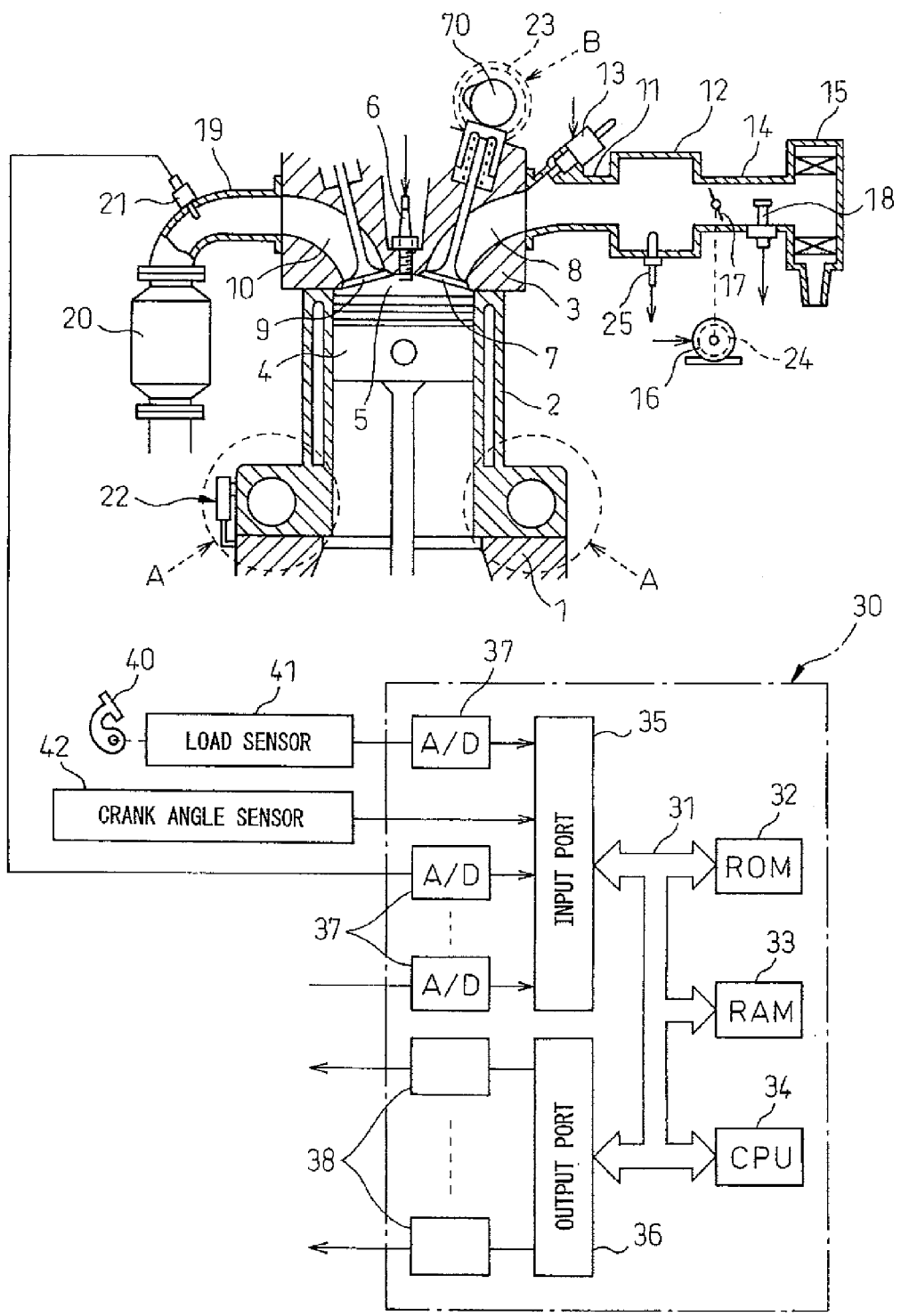
FIG. 1 is an overview of a spark ignition type internal combustion engine.

FIG. 1 is a side cross-sectional view of a spark ignition type internal combustion engine.

Referring to FIG. 1, 1 indicates a crankcase, 2 a cylinder block, 3 a cylinder head, 4 a piston, 5 a combustion chamber, 6 a spark plug which is arranged at a center of a top face of a combustion chamber 5, 7 an intake valve, 8 an intake port, 9 an exhaust valve, and 10 an exhaust port. Each intake port 8 is connected through an intake branch pipe 11 to a surge tank 12. At each intake branch pipe 11, a fuel injector 13 which injects fuel toward the corresponding intake port 8 is arranged. Note that, the fuel injectors 13 may also be arranged inside the combustion chambers 5 instead of being attached to the intake branch pipes 11.

The surge tank 12 is connected through an intake duct 14 to an air cleaner 15. Inside of the intake duct 14, a throttle valve 17 which is driven by an actuator 16 and an intake air amount detector 18 which uses for example a hot wire are arranged. On the other hand, each exhaust port 10 is connected through an exhaust manifold 19 to a catalytic converter 20 which holds a for example three-way catalyst. Inside the exhaust manifold 19, an air-fuel ratio sensor 21 is arranged.

On the other hand, in the embodiment which is shown in FIG. 1, at a connecting part of the crankcase 1 and the cylinder block 2, a variable compression ratio mechanism A which can make the relative positions of the crankcase 1 and the cylinder block 2 change in the cylinder axis direction so as to change the volume of a combustion chamber 5 when the piston 4 is positioned at compression top dead center is provided. Furthermore, an actual compression action start timing changing mechanism B which can change a start timing of the actual compression action is provided. Note that, in the embodiment which is shown in FIG. 1, this actual compression action start timing changing mechanism B is comprised of a variable valve timing mechanism which can control the closing timing of the intake valve 7.

As shown in FIG. 1, the crankcase 1 and the cylinder block 2 have attached to them a relative position sensor 22 for detecting a relative positional relationship between the crankcase 1 and the cylinder block 2. This relative position sensor 22 outputs an output signal which shows the change in the distance between the crankcase 1 and the cylinder block 2. Further, a valve timing sensor 23 which generates an output signal showing a closing timing of each intake valve 7 is attached to the variable valve timing mechanism B, while a throttle opening degree sensor 24 which generates an output signal showing a throttle valve opening degree is attached to the throttle valve drive-use actuator 16.

An electronic control unit 30 is comprised of a digital computer which is provided with a ROM (read only memory) 32, RAM (random access memory) 33, CPU (microprocessor) 34, input port 35, and output port 36, which are connected to each other by a bidrectional bus 31. A pressure sensor 25 for detecting the pressure inside of the surge tank 12 is attached to the surge tank 12. The output signals of the intake air amount detector 18, the air-fuel ratio sensor 21, relative position sensor 22, valve timing sensor 23, throttle opening degree sensor 24, and pressure sensor 25 are input through corresponding AD converters 37 to the input port 35. Further, an accelerator pedal 40 is connected to a load sensor 41 which generates an output voltage which is proportional to the amount of depression L of the accelerator pedal 40. The output voltage of the load sensor 41 is input through the corresponding AD converter 37 to the input port 35. Furthermore, the input port 35 is connected to a crank angle sensor 42 which generates an output pulse every time a crankshaft rotates by for example 30°. On the other hand, the output port 36 is connected through the corresponding drive circuits 38 to the spark plugs 6, fuel injectors 13, throttle valve drive-use actuator 16, and variable compression ratio mechanism A and variable valve timing mechanism B.

Figure 2:
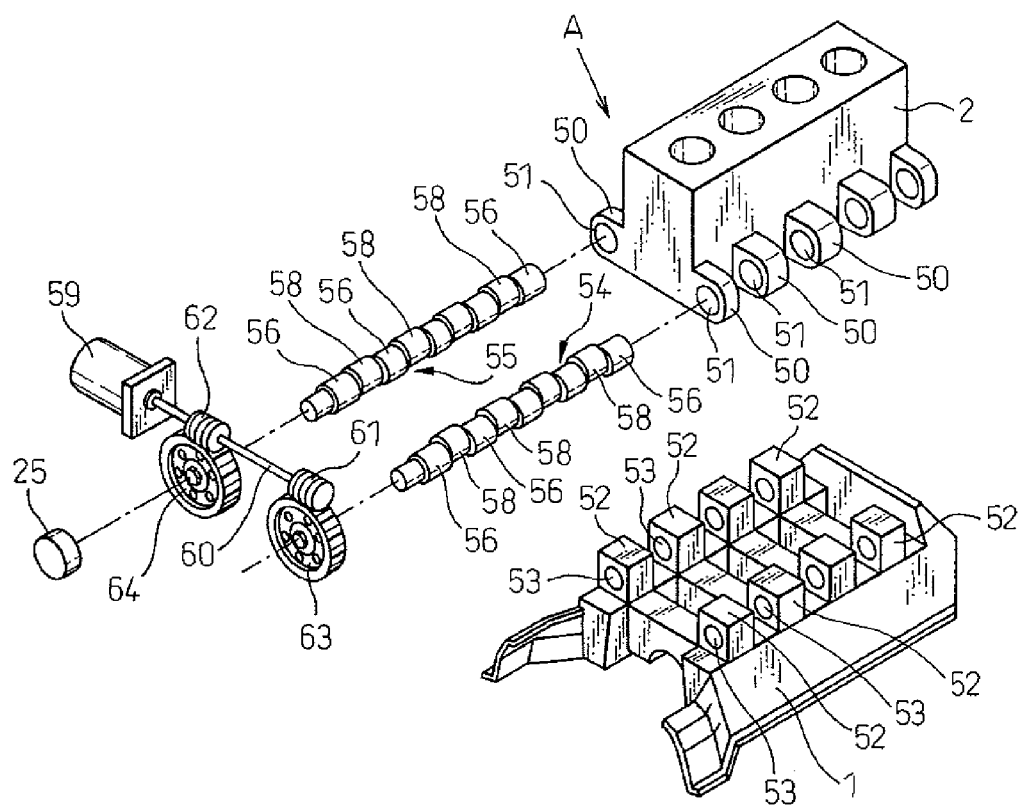
FIG. 2 is a disassembled perspective view of a variable compression ratio mechanism.
Figure 3:
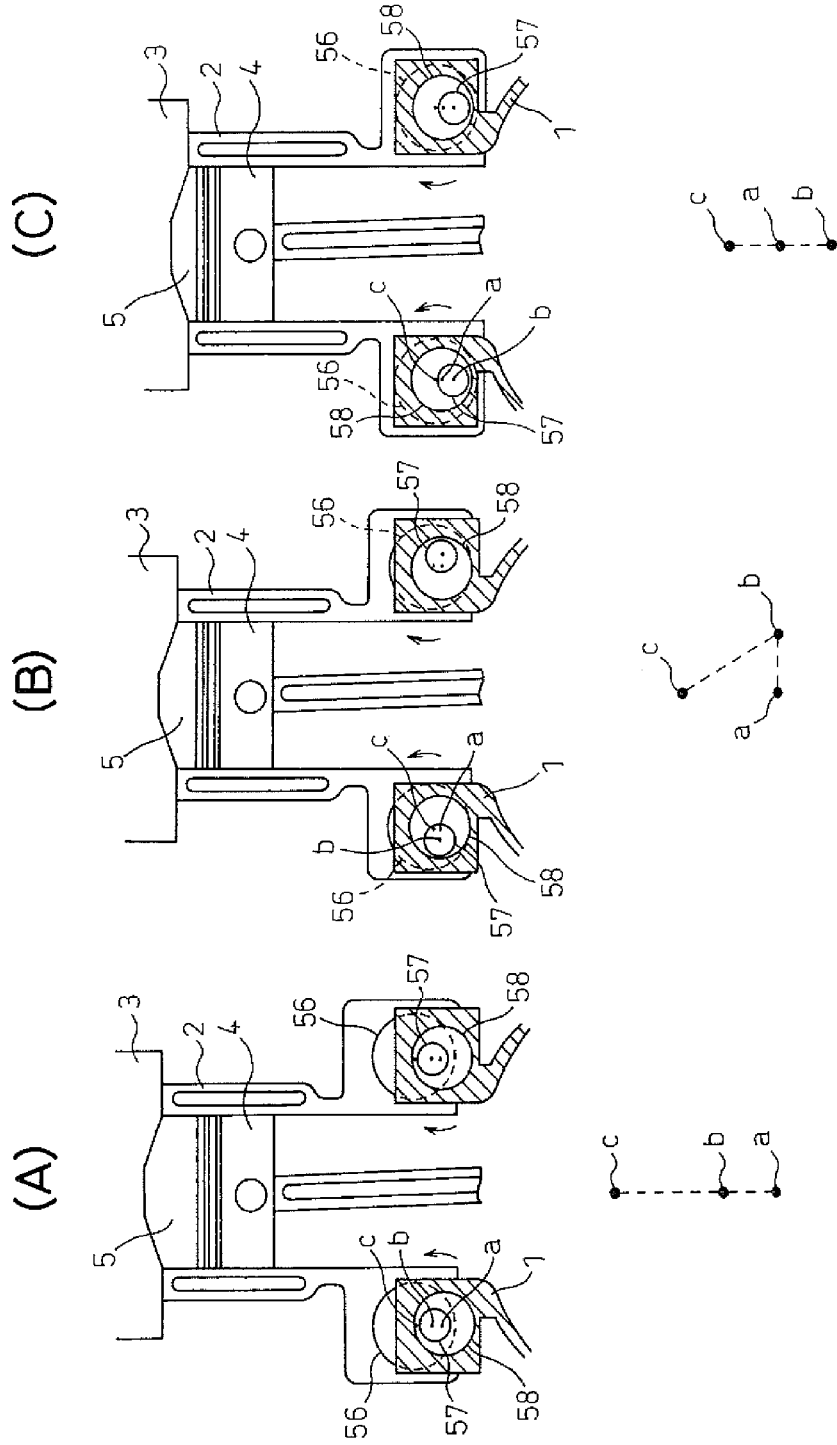
FIG. 3 is a side cross-sectional view of an internal combustion engine expressed schematically.

FIG. 2 is a disassembled perspective view of the variable compression ratio mechanism A which is shown in FIG. 1, while FIG. 3 is a side cross-sectional view of an internal combustion engine expressed schematically. Referring to FIG. 2, a plurality of projections 50 are formed at intervals from each other at the bottom of the two side walls of the cylinder block 2. In the projections 50, cam holes 51 with circular cross-sections are formed. On the other hand, on the top surface of the crankcase 1, a plurality of projections 52 are formed at intervals from each other to fit between the corresponding projections 50. Inside these projections 52 as well, cam holes 53 with circular cross-sections are formed.

As shown in FIG. 2, a pair of camshafts 54 and 55 are provided. On the camshafts 54 and 55, circular cams 58 which are to be inserted rotatably in the cam holes 53 are fastened at every other position. These circular cams 58 are coaxial with the axes of rotation of the camshafts 54 and 55. On the other hand, at both sides of each circular cam 58, as shown in FIG. 3, eccentric shafts 57 are arranged eccentrically with respect to the axes of rotation of the camshafts 54 and 55. On the eccentric shafts 57, separate circular cams 56 are attached rotatably in an eccentric manner. As shown in FIG. 2, these circular cams 56 are arranged at the two sides of each circular cam 58. These circular cams 56 are inserted inside the corresponding cam holes 51 in a rotatable manner. Further, as shown in FIG. 2, a cam angle sensor 25 which generates an output signal showing the rotational angle of the camshaft 55 is attached to the camshaft 55.

If the circular cams 58 which are fastened to the camshafts 54 and 55 are made to rotate in opposite directions as shown by the arrows in FIG. 3(A) from the state which is shown in FIG. 3(A), the eccentric shafts 57 move in opposite directions, so the circular cams 56 rotate in opposite directions from the circular cams 58 in the cam holes 51 and, as shown in FIG. 3(B), the positions of the eccentric shafts 57 change from high positions to intermediate height positions. Next, furthermore, if making the circular cams 58 rotate in the direction shown by the arrow, as shown in FIG. 3(C), the eccentric shafts 57 become the lowest position.

Note that, FIG. 3(A), FIG. 3(B), and FIG. 3(C) show the positional relationship between a center "a" of the circular cam 58, a center "b" of the eccentric shaft 57, and a center "c" of the circular cam 56 in the respective states.

As will be understood from a comparison with FIG. 3(A) to FIG. 3(C), the relative positions of the crankcase 1 and the cylinder block 2 are determined by the distance between the center "a" of the circular cam 58 and the center "c" of the circular cam 56. The larger the distance between the center "a" of the circular cam 58 and the center "c" of the circular cam 56, the further the cylinder block 2 from the crankcase 1. That is, the variable compression ratio mechanism A makes the relative position between the crankcase 1 and the cylinder block 2 change by a crank mechanism which uses a rotating cam. If the cylinder block 2 moves away from the crankcase 1, the volume of the combustion chamber 5 when the piston 4 is positioned at compression top dead center increases, therefore by making the camshafts 54 and 55 rotate, the volume of the combustion chamber 5 when the piston 4 is positioned at compression top dead center can be changed.

As shown in FIG. 2, to make the cam shafts 54 and 55 rotate in opposite directions, the shaft of a drive motor 59 is provided with a pair of worm gears 61 and 62 with opposite thread directions. Gears 63 and 64 engaging with these worm gears 61 and 62 are fastened to ends of the cam shafts 54 and 55. In this embodiment, by drying the drive motor 59, the volume of a combustion chamber 5 when the piston 4 is positioned at compression top dead center can be changed over a broad range.

Figure 4:
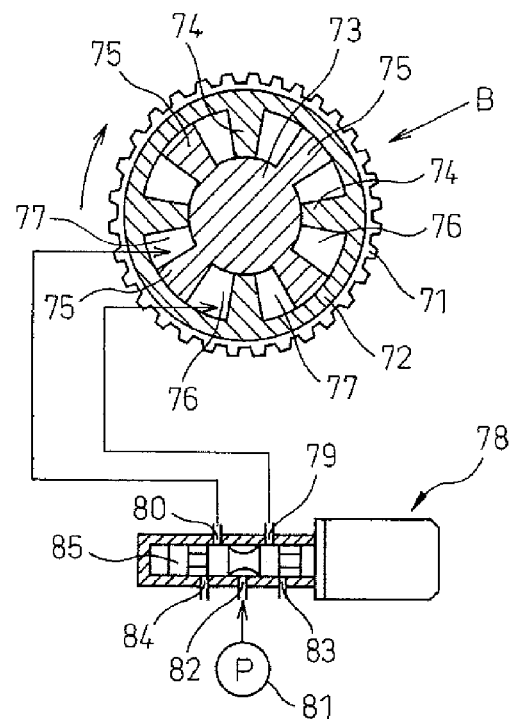
FIG. 4 is a view which shows a variable valve timing mechanism.

On the other hand, FIG. 4 shows a variable valve timing mechanism B which is attached to the end of a cam shaft 70 for driving the intake valve 7 in FIG. 1. Referring to FIG. 4, this variable valve timing mechanism B is provided with a timing pulley 71 which is rotated by an engine crankshaft through a timing belt in the arrow direction, a cylindrical housing 72 which rotates together with the timing pulley 71, a shaft 73 which rotates together with the camshaft 70 for driving the intake value and can rotate relative to the cylindrical housing 72, a plurality of partitions 74 which extend from an inside circumference of the cylindrical housing 72 to an outside circumference of the shaft 73, and vanes 75 which extend between the partitions 74 from the outside circumference of the shaft 73 to the inside circumference of the cylindrical housing 72. Hydraulic chambers 76 for advancing use and hydraulic chambers 77 for retarding use are formed on the two sides of the vanes 75.

The feed of working oil to the hydraulic chambers 76 and 77 is controlled by a working oil feed control valve 78. This working oil feed control valve 78 is provided with hydraulic ports 79 and 80 which are connected to the hydraulic chambers 76 and 77, a feed port 82 for working oil which is discharged from a hydraulic pump 81, a pair of drain ports 83 and 84, and a spool valve 85 for controlling connection and disconnection of the ports 79, 80, 82, 83, and 84.

When the phase of a cam of the camshaft 70 for driving the intake valve should be advanced, in FIG. 4, the spool valve 85 is made to move to the right, the working oil which is fed from the feed port 82 is fed through the hydraulic port 79 to the hydraulic chambers 76 for advancing use and the working oil in the hydraulic chambers 77 for retarding use is exhausted from the drain port 84. At this time, the shaft 73 is made to rotate relative with respect to the cylindrical housing 72 in the arrow direction.

As opposed to this, when the phase of a cam of the camshaft 70 for driving the intake valve should be retarded, in FIG. 4, the spool valve 85 is made to move to the left, the working oil which is fed from the feed port 82 is fed through the hydraulic port 80 to the hydraulic chambers 77 for retarding use, and the working oil in the hydraulic chambers 76 for advancing use is exhausted from the drain port 83. At this time, the shaft 73 is made to rotate relative with respect to the cylindrical housing 72 in the opposite direction to the arrow.

When the shaft 73 is made to rotate relative with respect to the cylindrical housing 72, if the spool valve 85 is returned to the neutral position which is shown in FIG. 4, the relative rotational operation of the shaft 73 is made to stop. The shaft 73 is held at the relative rotational position at that time. Therefore, the variable valve timing mechanism B can be used to make the phase of a cam of the camshaft 70 for driving the intake valve advance or be retarded by exactly a desired amount.

Figure 5:
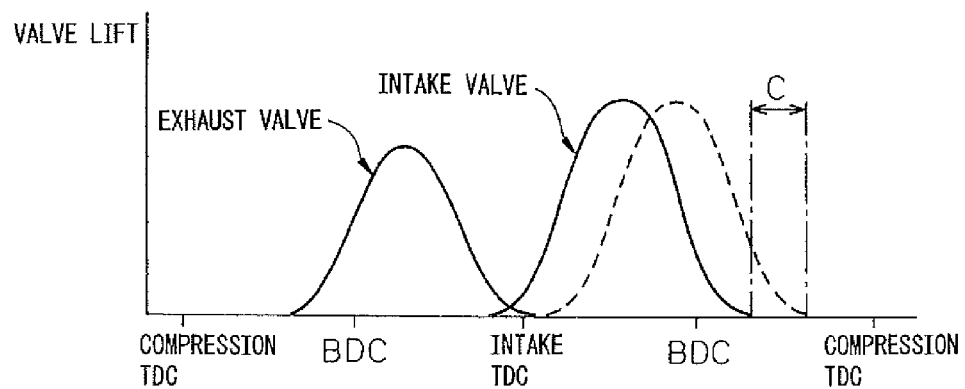
FIG. 5 is a view which shows an amount of lift of an intake valve and exhaust valve.

In FIG. 5, the solid line shows the time when the phase of a cam of the intake valve drive-use camshaft 70 is advanced the most, while the broken line shows when the phase of a cam of the intake valve drive-use camshaft 70 is retarded the most by the variable valve timing mechanism B. Therefore, the opening time period of the intake valve 7 can be set to any range of the region shown by the solid line in FIG. 5 and the range shown by the broken line, therefore the closing timing of the intake valve 7 can also be set to any crank angle in the range shown by the arrow "c" in FIG. 5.

The variable valve timing mechanism B which is shown in FIG. 1 and FIG. 4 shows one example. For example, it is possible to use a variable valve timing mechanism which changes only the closing timing of the intake valve while maintaining the opening timing of the intake valve constant or various other types of variable valve timing mechanisms.

Next, referring to FIG. 6, the meanings of the terms which are used in the present application will be explained. Note that, FIGS. 6(A), (B), and (C) show an engine where the combustion chamber volume is 50 ml and the stroke volume of the piston is 500 ml for the explanation. In these FIGS. 6(A), (B), and (C), "combustion chamber volume" means the volume of a combustion chamber when a piston is positioned at compression top dead center.

FIG. 6(A) explains the mechanical compression ratio. The mechanical compression ratio is a value which is mechanically determined from only the stroke volume of the piston and the combustion chamber volume at the time of a compression stroke. This mechanical compression ratio is expressed by (combustion chamber volume+stroke volume)/combustion chamber volume. In the example which is shown in FIG. 6(A) this mechanical compression ratio becomes (50 ml+500 ml)/50 ml=11.

FIG. 6(B) explains the actual compression ratio. This actual compression ratio is a value which is determined from the actual piston stroke volume and the combustion chamber volume when the compression action is actually started to when a piston reaches top dead center. This actual compression ratio is expressed by (combustion chamber volume+actual stroke volume)/combustion chamber volume. That is, as shown in FIG. 6(B), in the compression stroke, even if the piston starts to rise, no compression action is performed while the intake valve is open. The actual compression action is started after the intake valve closes. Therefore, the actual compression ratio is expressed as follows using the actual stroke volume. In the example which is shown in FIG. 6(B), the actual compression ratio becomes (50 ml+450 ml)/50 ml=10.

FIG. 6(C) explains the expansion ratio. The expansion ratio is a value which is determined from the stroke volume of the piston and the combustion chamber volume at the expansion stroke. This expansion ratio is expressed by the (combustion chamber volume+stroke volume)/combustion chamber volume. In the example which is shown in FIG. 6(C), this expansion ratio becomes (50 ml+500 ml)/50 ml=11.

Next, referring to FIG. 7 and FIG. 8, a superexpansion ratio cycle which is used in the present invention will be explained. Note that, FIG. 7 shows the relationship between the theoretical thermal efficiency and the expansion ratio, while FIG. 8 shows a comparison of the ordinary cycle and superhigh expansion ratio cycle which are selectively used in accordance with the load in the present invention.

FIG. 8(A) shows an ordinary cycle in the case where an intake valve closes near bottom dead center and a compression action by a piston is started from near substantially suction bottom dead center. In the example which is shown in FIG. 8(A), in the same way as the example which is shown in FIGS. 6(A), (B), (C), the combustion chamber volume is made 50 ml and the stroke volume of the piston is made 500 ml. As will be understood from FIG. 8(A), in the ordinary cycle, the mechanical compression ratio is (50 ml+500 ml)/50 ml=11, the actual compression ratio is also about 11, and the expansion ratio also becomes (50 ml+500 ml)/50 ml=11. That is, in an ordinary internal combustion engine, the mechanical compression ratio, the actual compression ratio, and the expansion ratio become substantially equal.

Figure 7:
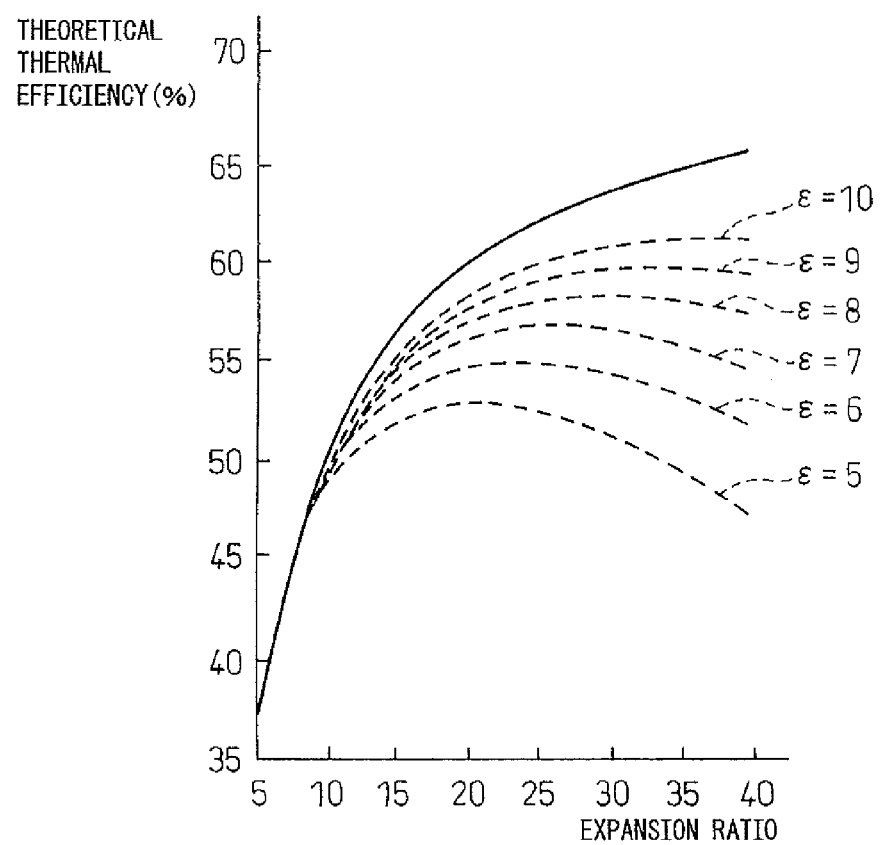
FIG. 7 is a view which shows a relationship between a theoretical thermal efficiency and the expansion ratio.
Figure 8:
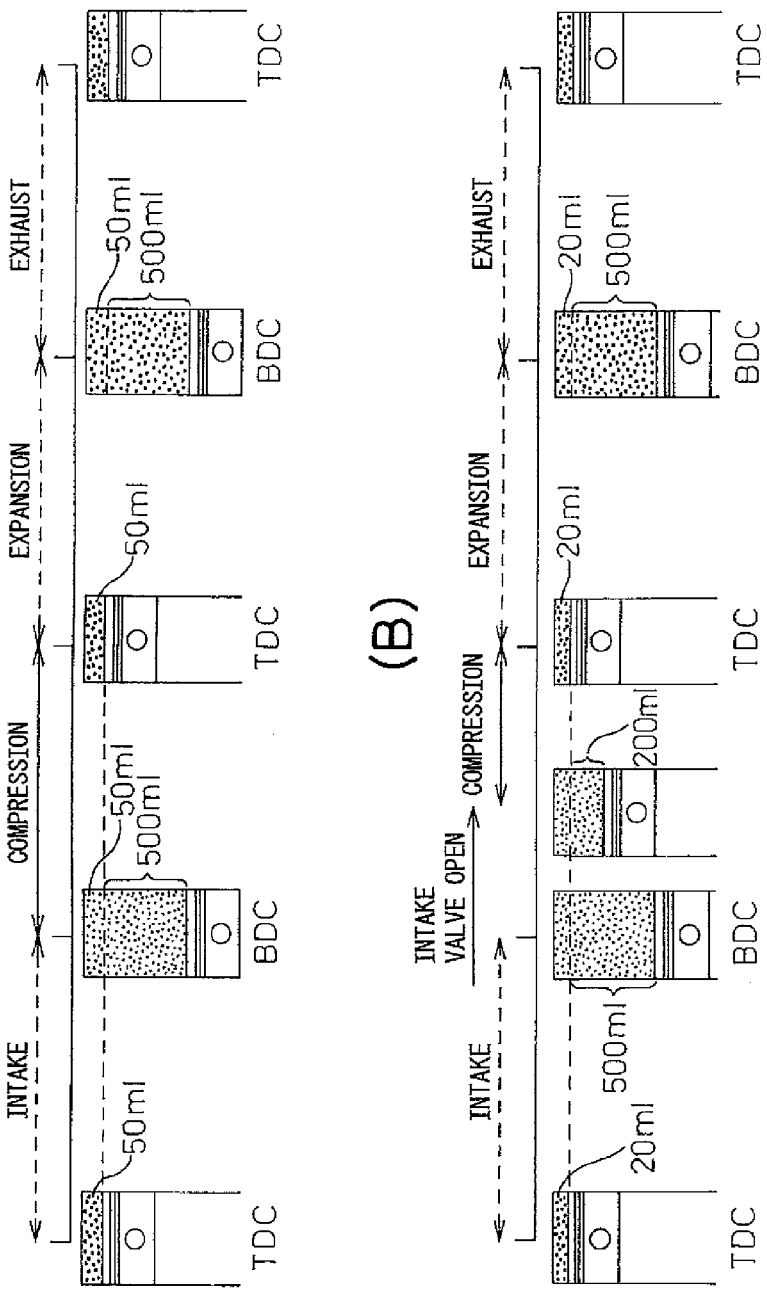
FIG. 8 is a view for explaining an ordinary cycle and a superhigh expansion ratio cycle.

The solid line in FIG. 7 shows the change in the theoretical thermal efficiency in the case where the actual compression ratio and expansion ratio are substantially equal, that is, the ordinary cycle. In this case, it is learned that the larger the expansion ratio, that is, the higher the actual compression ratio, the higher the theoretical thermal efficiency. Therefore, to raise the theoretical thermal efficiency in an ordinary cycle, it is sufficient to raise the actual compression ratio. However, due to the restrictions on the occurrence of knocking at the time of engine high load operation, the actual compression ratio can only be raised even at the maximum to about 12. Accordingly, in an ordinary cycle, the theoretical thermal efficiency cannot be made sufficiently high.

On the other hand, under this situation, to raise the theoretical thermal efficiency while strictly differentiating between the mechanical compression ratio and the actual compression ratio was studied and as a result it is discovered that in the theoretical thermal efficiency, the expansion ratio is dominant and the theoretical thermal efficiency is not affected much at all by the actual compression ratio. That is, if raising the actual compression ratio, the explosive force rises, but compression requires a large energy, accordingly even if raising the actual compression ratio, the theoretical thermal efficiency will not rise much at all.

As opposed to this, if increasing the expansion ratio, the time period during which a pushing force acts on a piston at the time of the expansion stroke becomes longer, therefore the time period during which the piston gives a rotational force to the crankshaft becomes longer. Therefore, the larger the expansion ratio, the higher the theoretical thermal efficiency. The broken line $\epsilon=10$ of FIG. 7 shows the theoretical thermal efficiency in the case of raising the expansion ratio in the state fixing the actual compression ratio at 10. In this way, it is learned that there is not a great difference between the amount of rise of the theoretical thermal efficiency when raising the expansion ratio in the state maintaining the actual compression ratio $\epsilon$ at a low value and the amount of rise of the theoretical thermal efficiency when the actual compression ratio is made to increase together with the expansion ratio as shown by the solid line in FIG. 7.

If the actual compression ratio is maintained at a low value in this way, knocking will not occur. Therefore, if raising the expansion ratio in the state maintaining the actual compression ratio at a low value, it is possible to block knocking while greatly raising the theoretical thermal efficiency. FIG. 8(B) shows an example of the case where the variable compression ratio mechanism A and the variable valve timing mechanism B are used to maintain the actual compression ratio at a low value while raising the expansion ratio.

Referring to FIG. 8(B), in this example, the variable compression ratio mechanism A is used to make the volume of a combustion chambers decrease from 50 ml to 20 ml. On the other hand, the variable valve timing mechanism B is used to make the closing timing of an intake valve retarded until the volume of the actual piston stroke changes from 500 ml to 200 ml. As a result, in this example, the actual compression ratio becomes (20 ml+200 ml)/20 ml=11, while the expansion ratio becomes (20 ml+500 ml)/20 ml=26. In the ordinary cycle which is shown in FIG. 8(A), as explained earlier, the actual compression ratio is about 11 and the expansion ratio is 11. Compared with this case, in the case which is shown in FIG. 8(B), it is learned that only the expansion ratio is raised to 26. This is the reason that it is called the "superhigh expansion ratio cycle".

Generally speaking, in an internal combustion engine, the lower the engine load, the worse the thermal efficiency. Therefore, to improve the thermal efficiency at the time of vehicle operation, that is, to improve the fuel efficiency, it becomes necessary to improve the thermal efficiency at the time when the engine load is low. On the other hand, in the superhigh expansion ratio cycle which is shown in FIG. 8(B), the actual piston stroke volume at the time of the compression stroke is made smaller, so the amount of intake air which can be sucked into a combustion chamber 5 becomes smaller, therefore this superhigh expansion ratio cycle can only be employed when the engine load is relatively low. Therefore, in the present invention, when the engine load is relatively low, the superhigh expansion ratio cycle which is shown in FIG. 8(B) is used, while at the time of engine high load operation, the ordinary cycle which is shown in FIG. 8(A) is used.

Next, the operational control as a whole will be explained while referring to FIG. 9.

Figure 9:
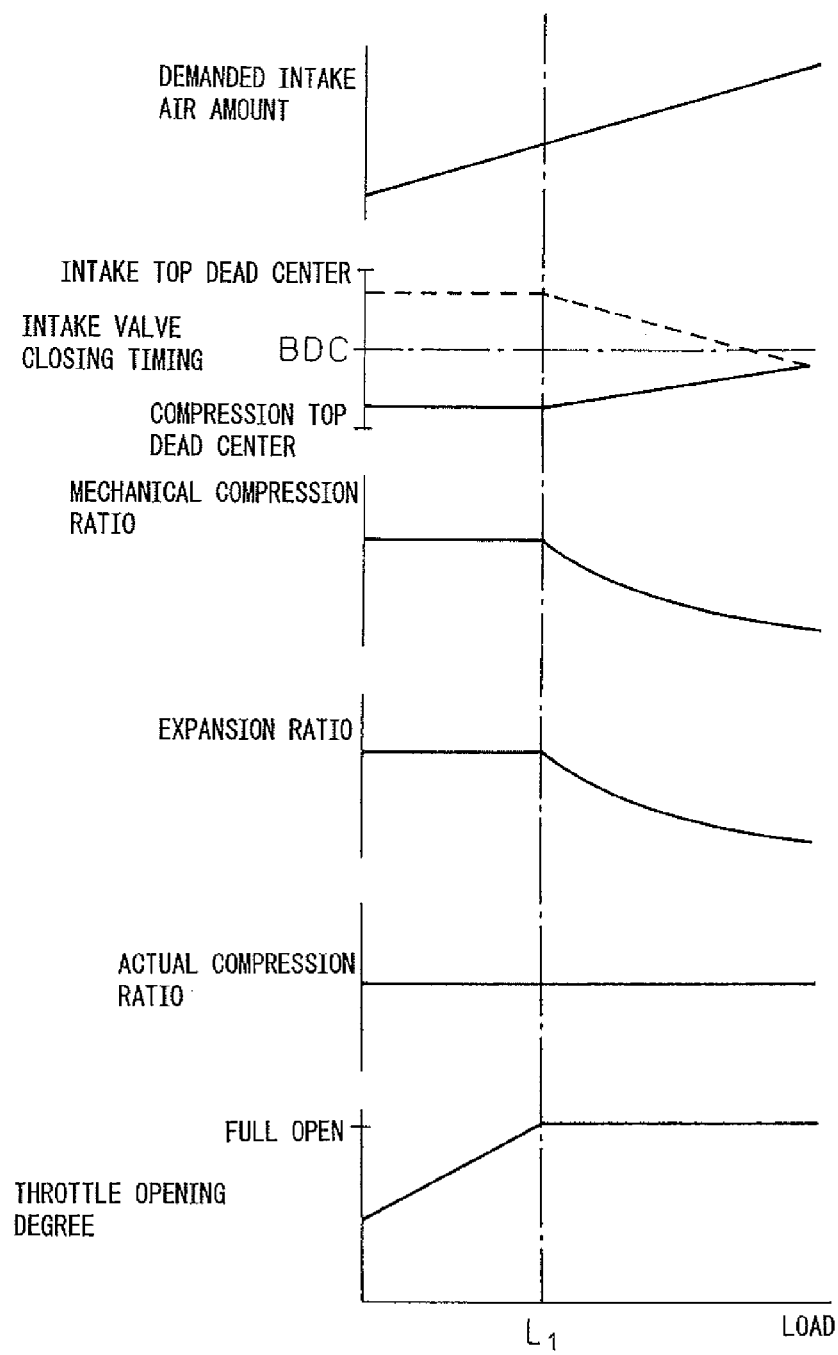
FIG. 9 is a view which shows changes in the mechanical compression ratio etc. in accordance with the engine load.

FIG. 9 shows the changes in the intake air amount, the closing timing of the intake valve, the mechanical compression ratio, the expansion ratio, the actual compression ratio, and the opening degree of the throttle valve 17 in accordance with the engine load at a certain engine speed. Note that, FIG. 9 shows the case where the average air-fuel ratio in the combustion chamber 5 is feedback controlled to the stoichiometric air-fuel ratio based on the output signal of the air-fuel ratio sensor 21 so that the three-way catalyst in the catalytic converter 20 can simultaneously reduce the unburned HC, CO, and $NO_x$ in the exhaust gas.

Now, as explained earlier, at the time of engine high load operation, the ordinary cycle which is shown in FIG. 8(A) is executed. Therefore, as shown in FIG. 9, at this time, the mechanical compression ratio is made low, so the expansion ratio is low. As shown by the solid line in FIG. 9, the closing timing of the intake valve 7 is made to advance as shown by the solid line in FIG. 5. Further, at this time, the amount of intake air is large. At this time, the opening degree of the throttle valve 17 is maintained full open, so the pumping loss becomes zero.

On the other hand, as shown in FIG. 9 by the solid line, if the engine load becomes low, along with this, the closing timing of the intake valve 7 is retarded to reduce the amount of intake air. Further, at this time, as shown in FIG. 9, as the engine load becomes lower, the mechanical compression ratio is increased so that the actual compression ratio is held substantially constant. Therefore, as the engine load becomes lower, the expansion ratio is also increased. Note that, at this time as well, the throttle valve 17 is held in the full open state. Therefore, the amount of intake air which is fed into the combustion chamber 5 is controlled by changing the closing timing of the intake valve 7 regardless of the throttle valve 17.

In this way, when the engine load becomes lower from the engine high load operating state, the mechanical compression ratio is made to increase along with the decrease in the amount of intake air under a substantially constant actual compression ratio. That is, the volume of the combustion chamber 5 when the piston 4 reaches compression top dead center is made to decrease proportionally to the decrease in the amount of intake air. Therefore, the volume of the combustion chamber 5 when the piston 4 reaches compression top dead center changes in proportion to the amount of intake air. Note that, at this time, in the example which is shown in FIG. 9, the air-fuel ratio in the combustion chamber 5 becomes the stoichiometric air-fuel ratio, so the volume of the combustion chamber 5 when the piston 4 reaches compression top dead center changes proportionally to the amount of fuel.

If the engine load becomes further lower, the mechanical compression ratio is made to further increase. If the engine load falls to the intermediate load $L_1$ somewhat near low load, the mechanical compression ratio reaches the limit mechanical compression ratio of the structural limit of the combustion chamber 5. If the mechanical compression ratio reaches the limit mechanical compression ratio, in the region of a load lower than the engine load $L_1$ when the mechanical compression ratio reaches the limit mechanical compression ratio, the mechanical compression ratio is held at the limit mechanical compression ratio. Therefore, at the time of low load side engine intermediate load operation and engine low load operation, that is, at the engine low load side, the mechanical compression ratio becomes maximum and the expansion ratio also becomes maximum. Putting this another way, at the engine low load operation side, the mechanical compression ratio is made maximum so that the maximum expansion ratio is obtained.

On the other hand, in the embodiment which is shown in FIG. 9, if the engine load falls to $L_1$, the closing timing of the intake valve 7 becomes the limit closing timing enabling control of the amount of intake air which is fed into the combustion chamber 5. If the closing timing of the intake valve 7 reaches the limit closing timing, in the region of a low lower than the engine load $L_1$ when the closing timing of the intake valve 7 reaches the limit closing timing, the closing timing of the intake valve 7 is held at the limit closing timing.

If the closing timing of the intake valve 7 is held at the limit closing timing, the amount of intake air will no longer be able to be controlled by the change of the closing timing of the intake valve 7. In the embodiment which is shown in FIG. 9, at this time, that is, in the region of a load lower than the engine load $L_1$ when the closing timing of the intake valve 7 reaches the limit closing timing, the throttle valve 17 is used to control the amount of intake air which is fed into the combustion chamber 5. The lower the engine load, the smaller the opening degree of the throttle valve 17 is made.

On the other hand, as shown in FIG. 9 by the broken line, as the engine load becomes lower, by advancing the closing timing of the intake valve 7 as well, it is possible to control the amount of intake air without depending on the throttle valve 17. Therefore, in FIG. 9, if comprehensively expressing both the case which is shown by the solid line and the case which is shown by the broken line, in the embodiment according to the present invention, the closing timing of the intake valve 7 is shifted as the engine load becomes lower in a direction away from intake bottom dead center BDC until the limit closing timing $L_1$ enabling control of the amount of intake air which is fed into the combustion chamber. In this way, the amount of intake air can be controlled by making the closing timing of the intake valve 7 change as shown in FIG. 9 by the solid line and can be controlled by making it change as shown by the broken line, but below the present invention will be explained with reference to the example of the case of making the closing timing of the intake valve 7 change as shown in FIG. 9 by the solid line.

In this regard, as explained earlier, in the superhigh expansion ratio cycle which is shown in FIG. 8(B), the expansion ratio is made 26. This expansion ratio is preferably high, but as will be understood from FIG. 7, if 20 or more, a considerably high theoretical thermal efficiency can be obtained even with respect to the actually usable lower limit actual compression ratio $\epsilon=5$. Therefore, in the present invention, the variable compression ratio mechanism A is formed so that the expansion ratio becomes 20 or more.

Next, referring to FIG. 10 to FIG. 12, a no-entry region and a reference operating line for the mechanical compression ratio and the closing timing of the intake valve will be explained.

Figure 10:
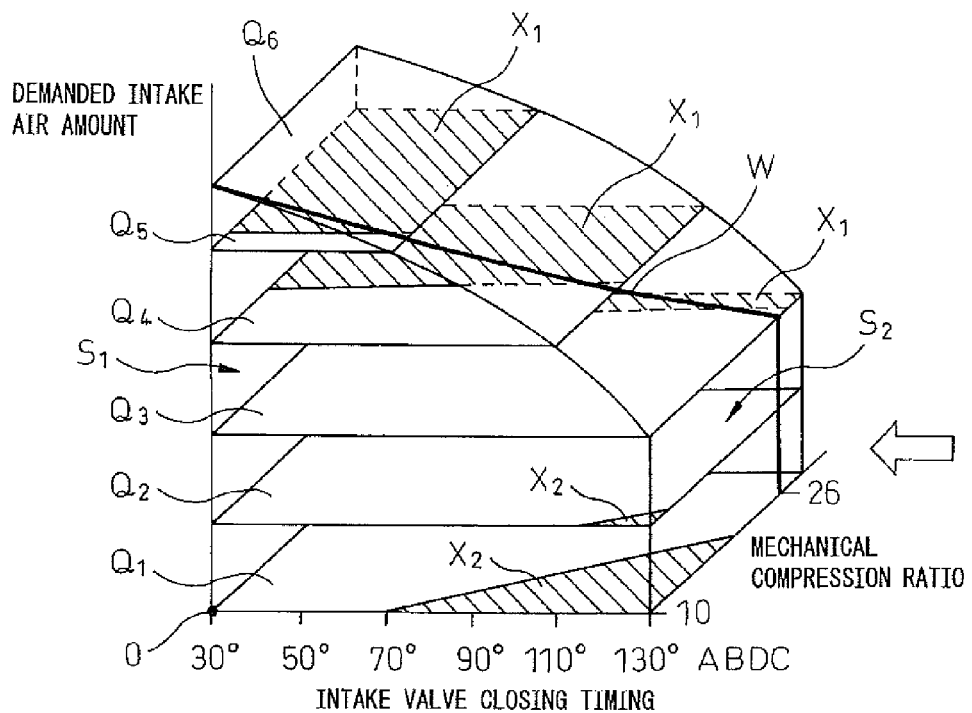
FIG. 10 is a view which shows no-entry regions and a target operating line.

FIG. 10 shows the amount of intake air which is required for obtaining the demanded engine load, that is, the demanded intake air amount, the mechanical compression ratio, and the closing timing of the intake valve. Note that, in FIG. 10, the demanded intake air amount increases the further from the origin O, while the mechanical compression ratio increases the further from the origin O. Further, in FIG. 10, the closing timing of the intake valve is expressed by the crank angle after intake bottom dead center (ABDC), therefore the closing timing of the intake valve is retarded the further from the origin O.

On the other hand, in FIG. 10, $Q_1$, $Q_2$, $Q_3$, $Q_4$, and $Q_5$ respectively express identical intake air amount planes. $Q_6$ expresses a throttle full open plane where the throttle valve 17 is full open. As will be understood from FIG. 10, this throttle full open plane $Q_6$ is comprised of an upwardly bulging curved plane. At the region below this throttle full open plane $Q_6$, the further down, the smaller the throttle opening degree.

In FIG. 10, the regions which are shown by the hatching show no-entry regions in the identical intake air amount planes $Q_1$, $Q_2$, $Q_3$, $Q_4$, and $Q_5$. On the other hand, FIG. 11 shows what is seen from the top of FIG. 10. FIG. 12(A) shows the left side plane $S_1$ in FIG. 10 as seen from the arrow direction, while FIG. 12(B) shows the right side plane $S_2$ in FIG. 10 as seen from the arrow direction. In these FIG. 11 and FIGS. 12(A) and (B) as well, the regions which are shown by the hatching show no-entry regions.

Figure 11:
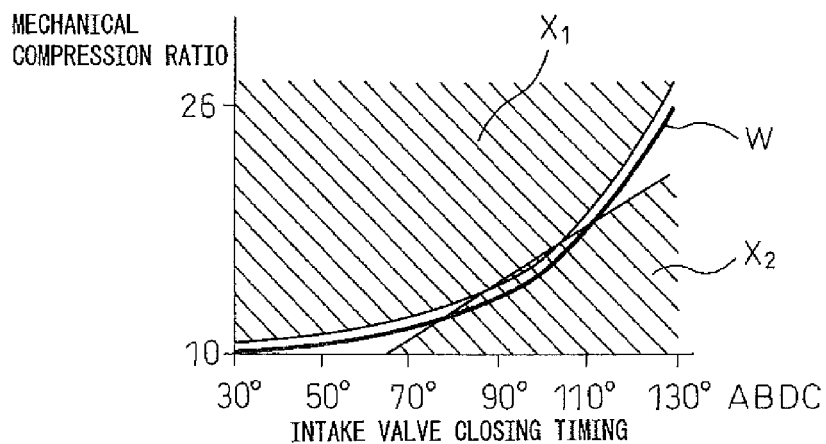
FIG. 11 is a view which shows no-entry regions and a target operating line.

From FIG. 10, FIG. 11, and FIGS. 12(A) and (B), it will be understood that the no-entry regions spread three-dimensionally and that further the no-entry regions are comprised of high load side regions $X_1$ and low load side regions $X_2$, that is, two types of regions. Note that, as will be understood from FIG. 10, FIG. 11, and FIGS. 12(A) and (B), the high load side no-entry regions $X_1$ are formed at the side where the demanded intake air amount is large, the closing timing of the intake valve is at the advanced side, and the mechanical compression ratio is high, while the low load side no-entry regions $X_2$ are formed at the side where the demanded intake air amount is small, the closing timing of the intake valve is at the retarded side, and the mechanical compression ratio is low.

Now then, FIG. 9 shows the relationship among the closing timing of the intake valve, the mechanical compression ratio, the actual compression ratio, and the throttle opening degree which gives the minimum fuel consumption for the demanded intake air amount. The line which satisfies the relationship of these is shown by the solid line W in FIG. 10 and FIG. 11. As will be understood from FIG. 10, this line W extends on the throttle full open plane $Q_6$ at the side of the greater amount of intake air than the identical intake air amount plane $Q_3$ and extends on the right side plane $S_2$ at the side of a smaller amount of intake air than the identical intake air amount plane $Q_3$. This identical intake air amount plane $Q_3$ corresponds to the load $L_1$ of FIG. 9.

That is, in FIG. 9, in the region where the engine load is higher than $L_1$, the higher the engine load, that is, the greater the demanded intake air amount, the more the closing timing of the intake valve is advanced in the state where the throttle valve 17 is held full open. At this time, the mechanical compression ratio is made to fall the more the demanded intake air amount is increased so that the actual compression ratio becomes constant. The relationship between the mechanical compression ratio and the closing timing of the intake valve at this time is expressed by the line W on the throttle full open plane $Q_6$ of FIG. 10. That is, as shown in FIG. 10, at the side greater than the intake air amount from the identical intake air amount plane $Q_3$, the more the demanded intake air amount increases, the more the closing timing of the intake valve is advanced in the state where the throttle valve 17 is held full open. At this time, the mechanical compression ratio is made to fall the more the demanded intake air amount is increased so that the actual compression ratio becomes constant.

On the other hand, in FIG. 9, in the region where the engine load is lower than $L_1$, the mechanical compression ratio and the closing timing of the intake valve are held constant. The lower the engine load, that is, the more the demanded intake air amount is decreased, the more the opening degree of the throttle valve 17 is made to decrease. The relationship between the mechanical compression ratio and the closing timing of the intake valve at this time is expressed by the line W on the right side plane $S_2$ of FIG. 10. That is, as shown in FIG. 10, at the side where the intake air amount is smaller than the identical intake air amount plane $Q_3$, the mechanical compression ratio and the closing timing of the intake valve are held constant. The lower the engine load, that is, the more the demanded intake air amount is decreased, the more the opening degree of the throttle valve 17 is made to decrease.

In the Description, the line followed by the mechanical compression ratio and the closing timing of the intake valve when the demanded intake air amount changes is called the "operating line". In particular, the line W which is shown by FIG. 10 is called the "reference operating line. Note that, as explained earlier, this reference operating line shows the minimum fuel consumption operating line giving the minimum fuel consumption.

As explained earlier, on this reference operating line W, the actual compression ratio is made constant. The actual compression ratio has nothing to do with the opening degree of the throttle valve 17 and is determined only by the mechanical compression ratio and the closing timing of the intake valve, so in FIG. 10 becomes an identical actual compression ratio on a curved plane which passes through the reference operating line W and extends in the vertical direction. In this case, the actual compression ratio becomes high at the high mechanical compression ratio side from this curved plane, while the actual compression ratio becomes low at the low mechanical compression ratio side from this curved plane. That is, roughly speaking, the high load side no-entry regions $X_1$ are positioned at regions of a higher actual compression ratio than the actual compression ratio on the reference operating line W, while the low load side no-entry regions $X_2$ are positioned at regions of a lower actual compression ratio than the actual compression ratio on the reference operating line W.

Now then, if raising the actual compression ratio to improve the fuel economy, knocking will occur. If retarding the ignition timing to prevent the occurrence of knocking, the combustion will become unstable and torque fluctuation will occur. The high load side no-entry regions $X_1$ are operating regions where such torque fluctuation occurs. Therefore, at the time of engine operation, it is necessary to ensure that the operating state of the engine will not enter such operating regions where torque fluctuation occurs. On the other hand, if the amount of intake air is small and the actual compression ratio becomes lower, combustion will become harder. As the opening degree of the throttle valve 17 becomes smaller and the compression end pressure becomes lower, the fuel economy deteriorates and torque fluctuation occurs. The low load side no-entry regions $X_2$ are operating regions in which such torque fluctuation occurs. Therefore, at the time of engine operation, it is necessary to ensure that the operating state of the engine will not enter such operating regions.

On the other hand, the higher the actual compression ratio becomes, the more the fuel economy is improved. Therefore, the minimum fuel consumption operating line where the minimum fuel consumption can be obtained without the occurrence of knocking or torque fluctuation, as shown by W in FIG. 10 and FIG. 11, extends at the outside of the high load side no-entry regions $X_1$ along the outer edges of the high load side no-entry regions $X_1$. As explained earlier, in the embodiment according to the present invention, this minimum fuel consumption operating line is made the reference operating line W. Basically, the mechanical compression ratio, the closing timing of the intake valve, and the opening degree of the throttle valve 17 are controlled in accordance with the demanded intake air amount so that the operating point showing the combination of the mechanical compression ratio and the closing timing of the intake valve moves on this reference operating line W. Note that, the current operating point is constantly detected by the relative position sensor 22, valve timing sensor 23, and throttle opening degree sensor 24.

Next, the method of control of the mechanical compression ratio, the closing timing of the intake valve, and the opening degree of the throttle valve 17 according to the present invention will be explained from the basic method of control. This basic method of control is shown from FIG. 13 to FIG. 15.

Figure 13:
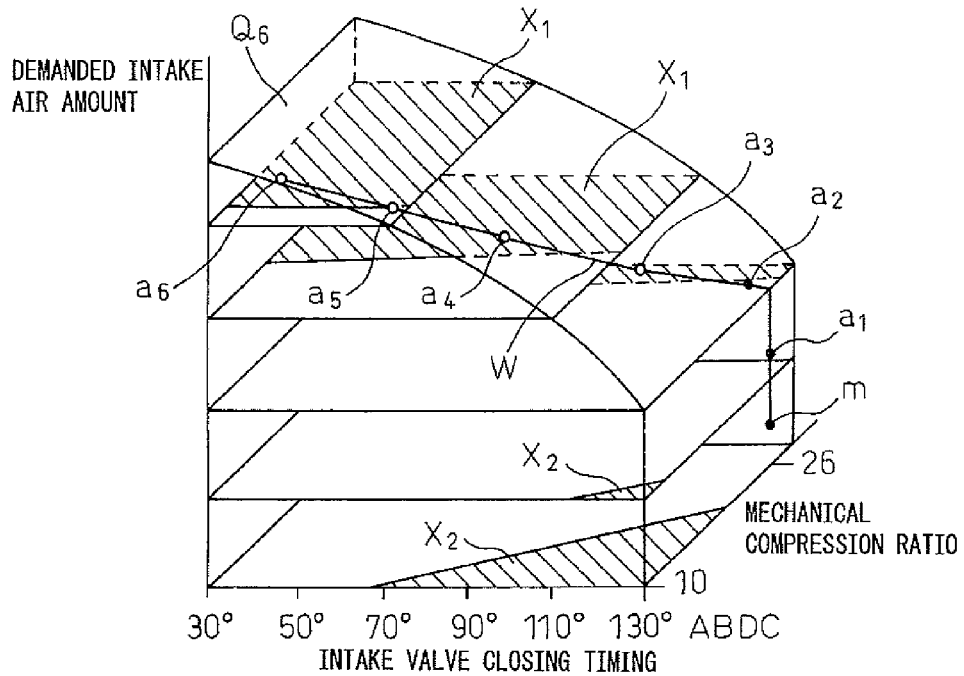
FIG. 13 is a view which shows a target operating point and an operating point.

That is, FIG. 13 shows the case where the demanded intake air amount is made to increase when the mechanical compression ratio and the closing timing of the intake valve are maintained at values at the point "m" on the reference operating line W. In this regard, in the embodiment according to the present invention, for example, the demanded intake air amount is calculated every predetermined time period. The operating point on the reference operating line W which satisfies the demanded intake air amount calculated every predetermined time period is successively calculated. One example of the operating points which satisfy the demanded intake air amount, that is, the demanded operating points, is shown in FIG. 13 by $a_1$, $a_2$, $a_3$, $a_4$, $a_5$, and $a_6$. That is, in this example, the demanded operating point which satisfies the demanded intake air amount which is first detected after the demanded intake air amount is made to increase is $a_1$, the demanded operating point which satisfies the demanded intake air amount which is next detected is $a_2$, and the demanded operating point which satisfies the demanded intake air amount which is next detected is $a_3$.

If the demanded operating point changes, the operating point which shows the mechanical compression ratio and the closing timing of the intake valve changes toward a new demanded operating point. That is, in the example which is shown in FIG. 13, the operating point which shows the mechanical compression ratio and the closing timing of the intake valve changes from the point "m" to the point "$a_1$" if the demanded operating point is made $a_1$, while the operating point which shows the mechanical compression ratio and the closing timing of the intake valve changes toward $a_2$ if the demanded operating point is made $a_2$. In this case, if the mechanical compression ratio and the closing timing of the intake valve reach the demanded operating point before the demanded operating point changes, the mechanical compression ratio and the closing timing of the intake valve will change following changes in the demanded operating point without any problem at all. However, if the mechanical compression ratio and the closing timing of the intake valve do not reach the demanded operating point before the demanded operating point changes, sometimes a problem will occur.

That is, in FIG. 13, when the mechanical compression ratio and the closing timing of the intake valve are at the point "m", when the demanded operating point is $a_1$, the mechanical compression ratio and the intake valve timing will not change. At this time, the opening degree of the throttle valve 17 is made to increase to satisfy the demanded intake air amount. The response to change of the opening degree of the throttle valve 17 by the actuator 16 is extremely fast, therefore when the demanded operating point becomes $a_1$, the operating point which shows the mechanical compression ratio and the closing timing of the intake valve immediately moves from the point "m" to the point "$a_1$".

Next, when the demanded operating point becomes $a_2$, the mechanical compression ratio is made to decrease just a little and the closing timing of the intake valve is advanced just a little while the throttle valve 17 is made full open. At this time, the mechanical compression ratio and the closing timing of the intake valve reach near the demanded operating point $a_2$ around when the next demanded operating point $a_3$ is calculated. The mechanical compression ratio and the closing timing of the intake valve which are reached at this time are shown by the operating point $b_2$ in FIG. 14 which shows them seen from above FIG. 13.

If the demanded operating point $a_3$ is calculated, the mechanical compression ratio and the closing timing of the intake valve start to move from the operating point $b_2$ toward the demanded operating point $a_3$. That is, in the state where the throttle valve 17 is full open, the mechanical compression ratio is made to fall and the closing timing of the intake valve is made to advance. However, the response of the change of the mechanical compression ratio by the variable compression ratio mechanism A and the response of the change of the closing timing of the intake valve 7 by the variable valve timing mechanism B are not that fast. In particular, the response of the change of the mechanical compression ratio by the variable compression ratio mechanism A is considerably slow. Therefore, if the speed of increase of the demanded intake air amount is fast, the demanded operating point and the operating point showing the actual values of the mechanical compression ratio and the closing timing of the intake valve gradually separate from each other. For example, in FIG. 14, when the demanded operating point moves to $a_6$, the state arises where the operating point which shows the actual values of the mechanical compression ratio and the closing timing of the intake valve continues to be positioned near $b_2$.

However, in such a case, if making the mechanical compression ratio and the closing timing of the intake valve move toward the demanded operating point without entering the no-entry region $X_1$ by feedback control, time is required until the mechanical compression ratio and the closing timing of the intake valve reach the demanded operating point. That is, in this case, by making the closing timing of the intake valve advance, when the operating point is about to enter the inside of a no-entry region $X_1$, the action of advancing the closing timing of the intake valve is stopped, then the mechanical compression ratio is made to decrease by exactly a certain amount. If the mechanical compression ratio is made to decrease by exactly a certain amount, the closing timing of the intake valve is again advanced. If the operating point is about to enter the no-entry region $X_1$, the action retarding the closing timing of the intake valve is stopped. Below, this is repeated.

That is, if making the mechanical compression ratio and the closing timing of the intake valve move toward the demanded operating point by feedback control, the operating point which shows the mechanical compression ratio and the closing timing of the intake valve moves in a zigzag state along the outer edges of the no-entry region $X_1$, therefore time is required for the mechanical compression ratio and the closing timing of the intake valve to reach the demanded operating point. As a result, a good response of the engine to changes in the demanded intake air amount cannot be obtained.

Therefore, in the present invention, when the demanded intake air amount changes, a target operating point which the mechanical compression ratio and the closing timing of the intake valve can reach after a certain time when moving from the current operating point toward the demanded operating point which satisfies the demanded intake air amount without entering the no-entry regions $X_1$ and $X_2$ is calculated and the mechanical compression ratio and the closing timing of the intake valve are made to change toward this target operating point.

Next, one embodiment which embodies the present invention will be explained with reference to FIG. 14 which shows the throttle full open plane $Q_6$. As explained earlier, FIG. 14 shows the case where when the demanded operating point becomes $a_3$, the operating point which shows the mechanical compression ratio and the closing timing of the intake valve is $b_2$. In this case, the arrow $R_2$ expresses the amount which the mechanical compression ratio can reach by a predetermined fixed time when moving toward the demanded operating point $a_3$, while the arrow $S_2$ expresses the amount which the closing timing of the intake valve can reach by a predetermined fixed time when moving toward the demanded operating point $a_3$. Further, in FIG. 14, $c_2$ indicates the target operating point which can be reached after a fixed time when moving from the current operating point $b_2$ toward the demanded operating point $a_3$ satisfying the demanded intake air amount without entering the no-entry region $X_1$.

Figure 14:
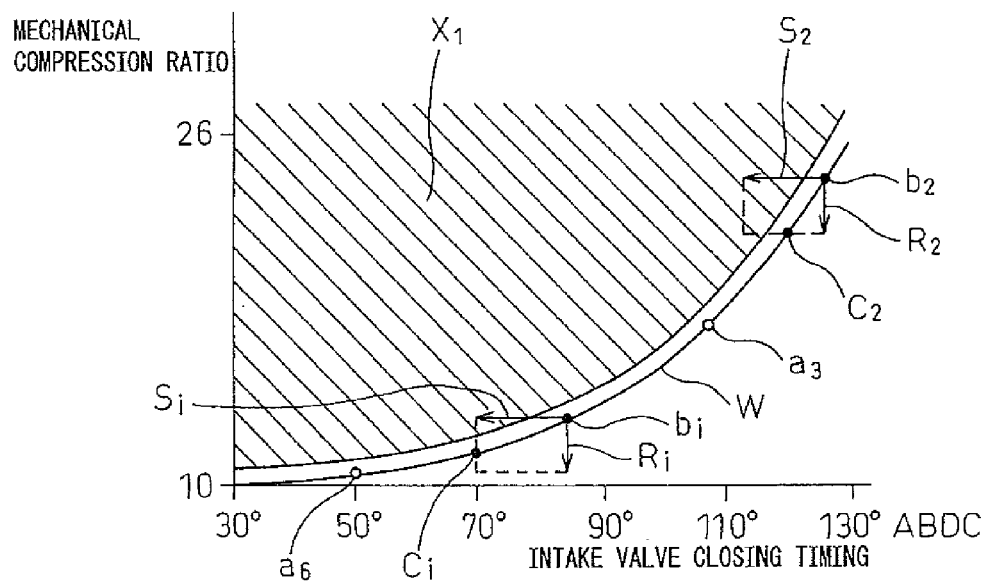
FIG. 14 is a view which shows a target operating point and an operating point.

As shown in FIG. 14, when the demanded intake air amount is made to increase and the operating point $b_2$ and the demanded operating point $a_3$ are on the throttle full open plane $Q_6$, this target operating point $c_2$ is positioned on the reference operating line W, in the example which is shown in FIG. 14, on the minimum fuel consumption operating line W. That is, in the example which is shown in FIG. 14, when the throttle valve 17 is maintained in the full open state, the target operating point is made to move outside of the no-entry regions $X_1$ on the minimum fuel consumption operating line W extending along the outer edges of the no-entry regions $X_1$.

Further, in FIG. 14, when the demanded operating point is $a_6$, if the operating point showing the mechanical compression ratio and the closing timing of the intake valve is $b_i$, in this case as well, the target operating point is made the point $c_i$ on the reference operating line W. Note that, in FIG. 14, the arrow $R_i$ similarly expresses the amount which the mechanical compression ratio can reach after a fixed time, while the arrow $S_i$ expresses the amount which the closing timing of the intake valve can reach after a fixed time.

In this way, in the example which is shown in FIG. 14, if the target operating point $c_2$ is calculated when the operating point is $b_2$, the operating point which shows the mechanical compression ratio and the closing timing of the intake valve will reach the target operating point $c_2$ after a fixed time. At this time, the next new target operating point which can be reached after a fixed time when moving from the current operating point $c_2$ toward the demanded operating point which satisfies the demanded intake air amount without entering the no-entry region $X_1$ is calculated. The operating point reaches this new target operating point after a fixed time. In this case, in the embodiment according to the present invention, the mechanical compression ratio, the closing timing of the intake valve, and the opening degree of the throttle valve 17 are made to reach the target operating point by PID (proportional integration and differentiation) control.

In this way, in the example which is shown in FIG. 14, the operating point which shows the mechanical compression ratio and the closing timing of the intake valve moves smoothly without stopping along the reference operating line W. That is, in FIG. 13, when the mechanical compression ratio and the closing timing of the intake valve are maintained at the point "m", if the demanded intake air amount is made to increase, the mechanical compression ratio and the closing timing of the intake valve can be made to change smoothly along the reference operating line W without stopping as shown by the arrow in FIG. 15. As a result, it becomes possible to secure a good response of the engine to changes in the demanded intake air amount.

In this case, to further improve the response of the engine to the demanded intake air amount, it is preferable to separate the target operating points $c_2$ and $c_i$ as much as possible from the corresponding current operating points $b_2$ and $b_i$. Therefore, in the embodiment according to the present invention, the target operating points $c_2$ and $c_i$ are made operating points the furthest from the current operating points $b_2$ and $b_i$ among the operating points which can be reached after a fixed time when moving from the corresponding the current operating points $b_2$ and $b_i$ toward the demanded operating point satisfying the demanded intake air amount without entering the no-entry region $X_1$.

That is, when the current operating point is $b_2$, the limit reached by the mechanical compression ratio from the operating point $b_2$ is made the target operating point $c_2$. Regarding the closing timing of the intake valve, this target operating point $c_2$ becomes before the reachable limit of the closing timing of the intake valve from the operating point $b_2$. Therefore, at this time, the mechanical compression ratio is made to drop by the possible maximum speed, while the closing timing of the intake valve is advanced by a speed slower than the possible maximum speed. As opposed to this, when the current operating point is $b_i$, the reachable limit of the closing timing of the intake valve from the operating point $b_i$ is made the target operating point $c_i$. Regarding the mechanical compression ratio, this target operating point $c_i$ becomes before the reachable limit of the closing timing of the intake valve from the operating point $b_i$. Therefore, at this time, the closing timing of the intake valve is advanced by the possible maximum speed, while the mechanical compression ratio is made to decrease by a speed slower than the possible maximum speed.

The maximum speed of change possible for the closing timing of the intake valve, that is, the value which can be reached after a fixed time, is not affected much at all by the operating state of the engine. Therefore, the value which the closing timing of the intake valve can reach after a fixed time becomes constant regardless of the operating state of the engine. As opposed to this, the maximum speed of change possible for the mechanical compression ratio, that is, the value which can be reached after a fixed time, is strongly affected by the operating state of the engine etc. Next, this will be explained while referring to FIG. 16 and FIG. 17.

Figure 16:
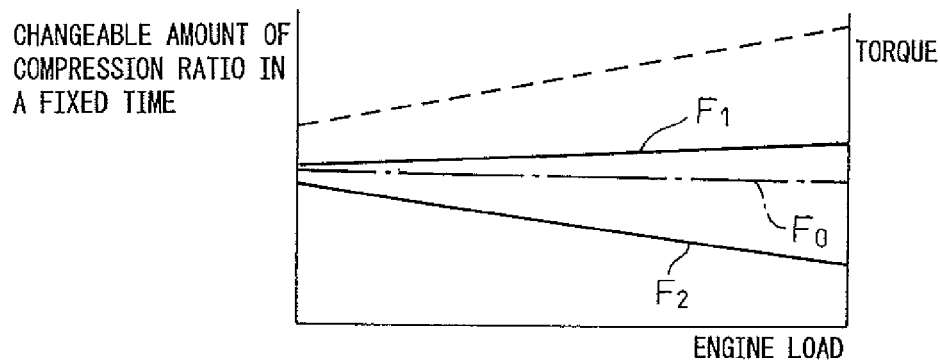
FIG. 16 is a view which shows a changeable amount of the mechanical compression ratio in a fixed time.

FIG. 16 shows the relationship between the changeable amount of the mechanical compression ratio at a fixed time, that is, the compression ratio difference between the current mechanical compression ratio and the mechanical compression ratio which can be reached after a fixed time, and the engine load. Note that, FIG. 16 shows the changeable amount of the compression ratio when the mechanical compression ratio is made a certain mechanical compression ratio. In FIG. 16, the dot and dash line $F_0$ shows the changeable amount of the compression ratio when the engine is stopped. Further, FIG. 16 shows the torque which is applied to the variable compression ratio mechanism A by the combustion pressure by the broken line. This torque acts in a direction pulling the cylinder block 2 away from the crankcase 1, that is, in a direction making the compression ratio fall. This torque, as shown by the broken line, is made larger the higher the combustion pressure becomes, that is, higher the engine load becomes.

In this way, this torque acts on the variable compression ratio mechanism A in a direction making the compression ratio fall, so when making the mechanical compression ratio fall, the mechanical compression ratio easily falls. Therefore, in this case, the changeable amount of the compression ratio becomes larger. In FIG. 16, the solid line $F_1$ shows the changeable amount of the compression ratio in this case. The changeable amount of the compression ratio in this case becomes larger the higher the engine load. As opposed to this, this torque counters the increase in the mechanical compression ratio, so when making the mechanical compression ratio increase, the changeable amount of the compression ratio becomes smaller compared with when making the mechanical compression ratio fall. In FIG. 16, the solid line $F_2$ shows the changeable amount of the compression ratio in the case of making the mechanical compression ratio increase. The changeable amount of the compression ratio in this case becomes smaller the higher the engine load.

In one embodiment according to the present invention, the changeable amount of the compression ratio which becomes the reference as shown by $F_0$ in FIG. 16 is stored in advance. This reference changeable amount of the compression ratio is corrected by the relationship shown by $F_1$ and $F_2$ in FIG. 16 to calculate the changeable amount of the compression ratio in accordance with the engine load. Next, the value of the mechanical compression ratio which can be reached after a fixed time is calculated from this calculated changeable amount of the compression ratio. That is, in this embodiment, the value of the mechanical compression ratio which can be reached after a fixed time is changed in accordance with the engine load when the demanded intake air amount is changed.

Figure 17:
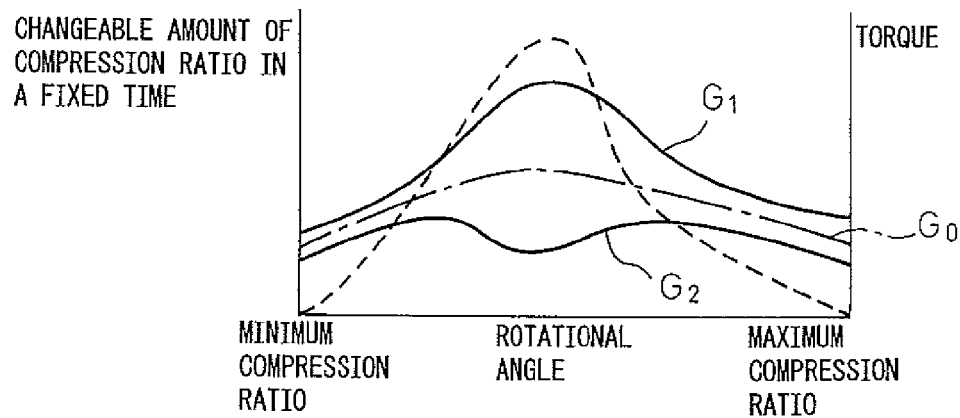
FIG. 17 is a view which shows a changeable amount of the mechanical compression ratio in a fixed time.

FIG. 17 shows the relationship between the changeable amount of the mechanical compression ratio and the rotational angles of the camshafts 54 and 55, that is, the rotational angles of the circular cams 58, at a fixed time. Note that, the left end of the abscissa in FIG. 17 shows the time of the lowest state of the mechanical compression ratio which is shown in FIG. 3(A), while the right end of the abscissa in FIG. 17 shows the time of the highest state of the mechanical compression ratio which is shown in FIG. 3(C). Further, FIG. 17 shows the changeable amount of the compression ratio when the engine load is made a certain load. In FIG. 17, the broken line shows the torque which is applied to the variable compression ratio mechanism A by the combustion pressure.

In the embodiment which is shown in FIG. 2, as the worm gears, a type where the worm gears 61 and 62 are not made to rotate by the gears 63 and 64, that is, a type where the worm gears 61 and 62 act to stop reverse rotation of the gears 63 and 64, is used. The dot and dash line $G_0$ of FIG. 17 shows the changeable amount of the compression ratio when engine operation is stopped where such worm gears are used. As will be understood from FIGS. 3(A), (B), and (C), when the mechanical compression ratio is intermediate, that is, at the time shown in FIG. 3(B), the change in the compression ratio per unit rotational angle of the camshafts 54, 55 becomes the maximum. Therefore, as shown by the dot and dash line $G_0$ in FIG. 17, when the mechanical compression ratio is intermediate, the changeable amount of the compression ratio becomes the maximum.

Further, as shown by the broken line in FIG. 17, the torque which is applied to the variable compression ratio mechanism A by the combustion pressure becomes the highest at the time which is shown in FIG. 3(B), that is, at the time when the mechanical compression ratio is intermediate. On the other hand, in FIG. 17, the solid line $G_1$ shows the case of making the mechanical compression ratio fall, while the solid line $G_2$ shows the case of making the mechanical compression ratio increase. As shown in FIG. 17, the changeable amount of the compression ratio $G_1$ when making the mechanical compression ratio fall becomes larger than the changeable amount of the compression ratio $G_2$ when making the mechanical compression ratio increase. Further, when the mechanical compression ratio is intermediate, the torque which is based on the combustion pressure becomes the highest, so, at this time, the changeable amount of the compression ratio $G_1$ becomes high and the changeable amount of the compression ratio $G_2$ falls.

In the embodiment according to the present invention, the changeable amount of the compression ratio which becomes the reference shown by $G_0$ in FIG. 17 is stored in advance. This reference changeable amount of the compression ratio is corrected by the relationship shown by $G_1$ and $G_2$ in FIG. 17 to calculate the changeable amount of the compression ratio in accordance with the rotational angles of the camshafts 54 and 55. Furthermore, this changeable amount of the compression ratio is corrected in FIG. 16 by the relationship shown by $F_1$ and $F_2$ to calculate the changeable amount of the compression ratio in accordance with the rotational angle of the camshafts 54 and 55 and the engine load. Next, the value of the mechanical compression ratio which can be reached after a fixed time is calculated from this calculated changeable amount of the compression ratio.

That is, in this embodiment, when the demanded intake air amount changes, the value of the mechanical compression ratio which can be reached after a fixed time is made to change in accordance with the rotational angle of the rotating cams 58 and the engine load.

Next, referring to FIG. 18 to FIG. 35, the case where the demanded intake air amount is made to decrease will be explained. Note that, among FIG. 18 to FIG. 35, FIG. 18 and FIG. 19 show the case where the demanded intake air amount is made to decrease slowly, FIG. 20 to FIG. 27 show the case where the demanded intake air amount is made to decrease relatively fast, and FIG. 28 to FIG. 35 show the case where the demanded intake air amount is made to decrease very fast. Note that, FIG. 18 to FIG. 35 show the case where the action of decreasing the demanded intake air amount is started when the operating point which shows the combination of the mechanical compression ratio and the closing timing of the intake valve is at the point "n" on the reference operating line W.

First, referring to FIG. 18 and FIG. 19, the case where the demanded intake air amount is made to decrease slowly will be explained. Note that, FIG. 19 shows the throttle full open plane $Q_6$ similar to FIG. 14.

Figure 19:
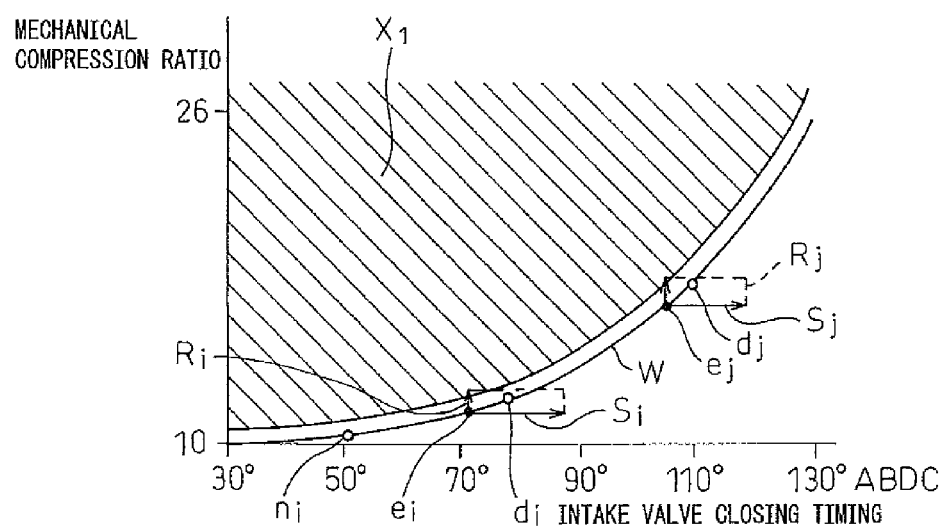
FIG. 19 is a view which shows a target operating point and an operating point.

FIG. 19 shows the relationship between the current operating point and the demanded operating point in this case. That is, FIG. 19 shows that the demanded operating point is $d_i$ when the current operating point is $e_i$. At this time, the amount which the mechanical compression ratio can reach after a fixed time is shown by $R_i$. At this time, the amount which the closing timing of the intake valve can reach after a fixed time is shown by $S_i$. Furthermore, FIG. 19 shows the demanded operating point when the current operating point is $e_j$ by $d_j$. At this time, the amount which the mechanical compression ratio can reach after a fixed time is shown by $R_j$. At this time, the amount which the closing timing of the intake valve can reach after a fixed time is shown by $S_j$.

In this case, the demanded operating point $d_i$ becomes before the reachable limit of the mechanical compression ratio and becomes before the reachable limit of the closing timing of the intake valve, so the demanded operating point $d_i$ becomes the target operating point. In the same way, the demanded operating point $d_j$ becomes before the reachable limit of the mechanical compression ratio and becomes before the reachable limit of the closing timing of the intake valve, so the demanded operating point $d_j$ becomes the target operating point. Therefore, in this case, the operating point moves along the reference operating line W. That is, when the demanded intake air amount slowly decreases, the throttle valve 17 is held full open and, in that state, the closing timing of the intake valve is gradually retarded and the mechanical compression ratio is gradually increased so that the actual compression ratio becomes constant.

Next, referring to FIG. 20 to FIG. 27, the case where the demanded intake air amount is made to decrease relatively fast will be explained. As explained earlier, in the embodiment according to the present invention, the demanded intake air amount is calculated, for example, every predetermined time period. The successively calculated demanded operating points on the reference operating line W which satisfy the demanded intake air amount are shown in FIG. 22 by $d_1$, $d_2$, $d_3$, $d_4$, and $d_5$.

Figure 20:
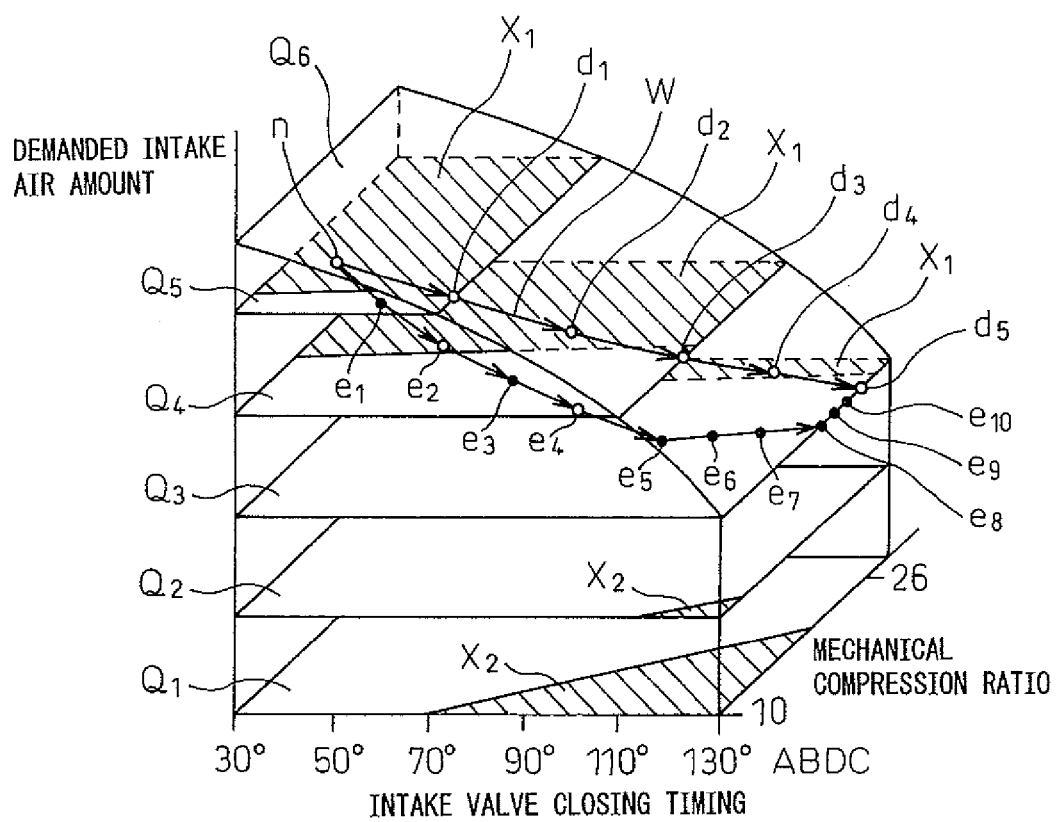
FIG. 20 is a view which shows a target operating point and an operating point.

Note that, to enable easy understanding of the control according to the present invention, FIG. 20 shows the case where the demanded intake air amount at the demanded operating point $d_1$ is $Q_5$, the demanded intake air amount at the demanded operating point $d_2$ is a value between $Q_5$ and $Q_4$, the demanded intake air amount at the demanded operating point $d_3$ is $Q_4$, the demanded intake air amount at the demanded operating point $d_4$ is between $Q_4$ and $Q_3$, and the demanded intake air amount at the demanded operating point $d_5$ is $Q_3$. That is, this shows the case where the demanded intake air amount which is successively calculated changes from $Q_6$ (point "n") to $Q_5$, a value between $Q_5$ and $Q_4$, $Q_4$, a value between $Q_4$ and $Q_3$, and $Q_3$.

Figure 21:
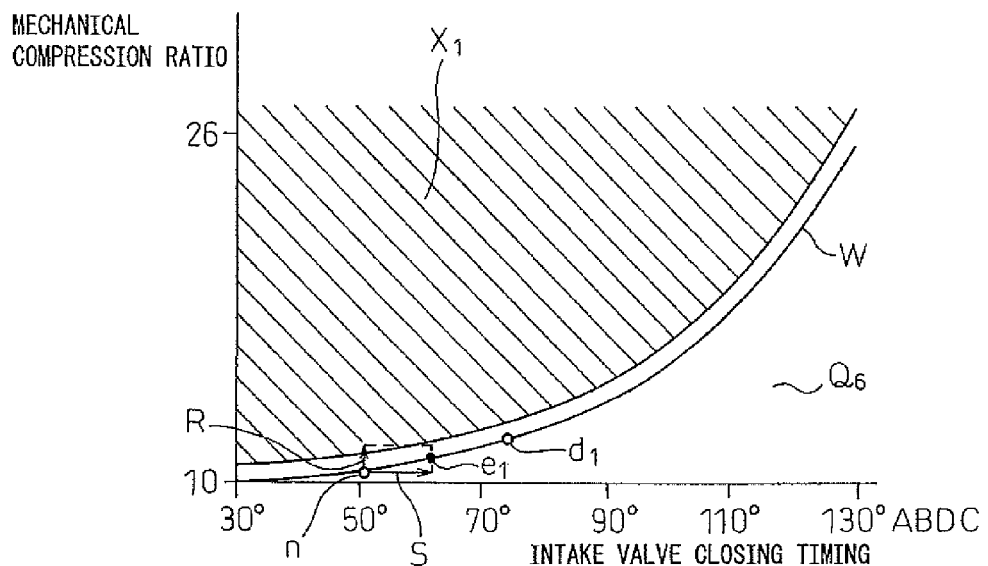
FIG. 21 is a view which shows a target operating point and an operating point.
Figure 22:
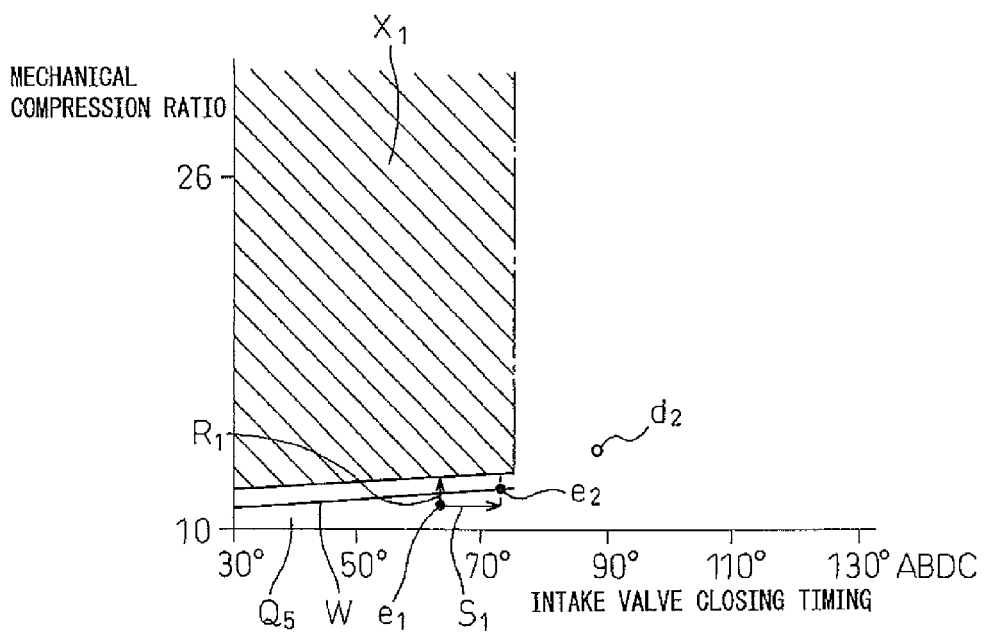
FIG. 22 is a view which shows a target operating point and an operating point.
Figure 23:
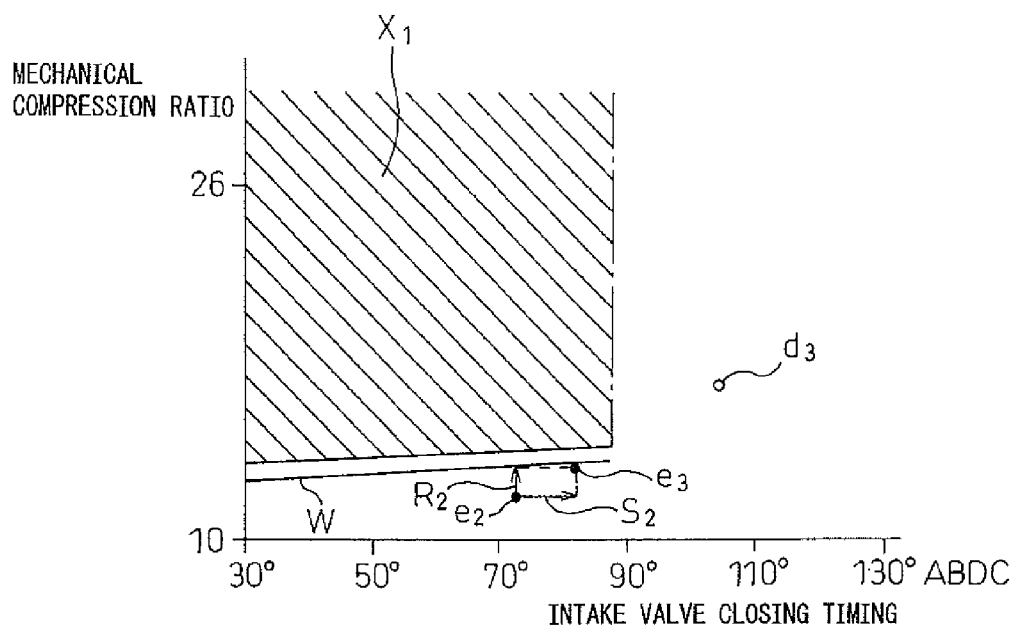
FIG. 23 is a view which shows a target operating point and an operating point.
Figure 24:
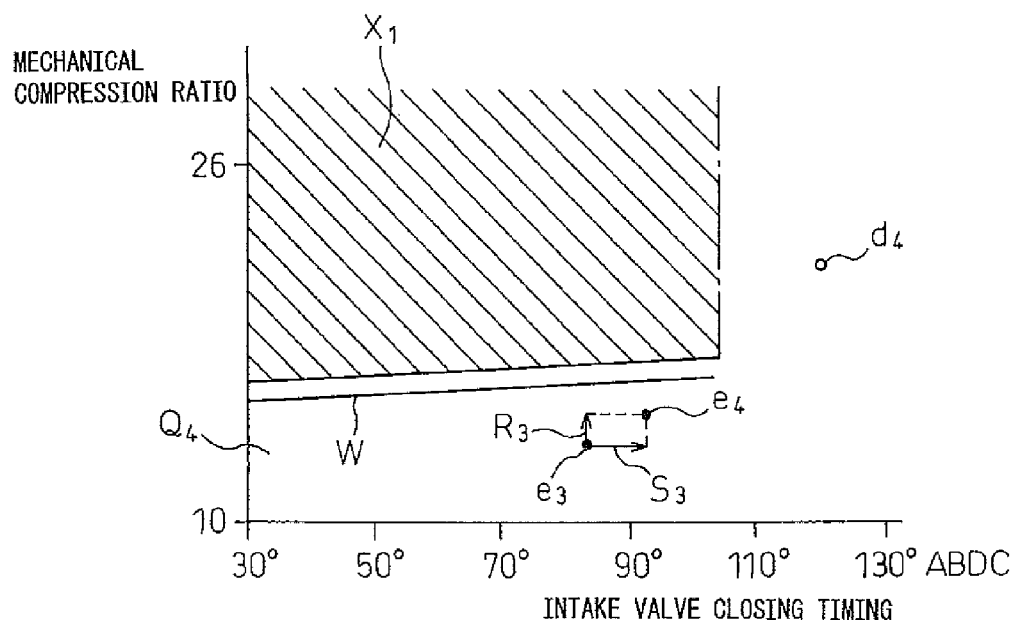
FIG. 24 is a view which shows a target operating point and an operating point.
Figure 25:
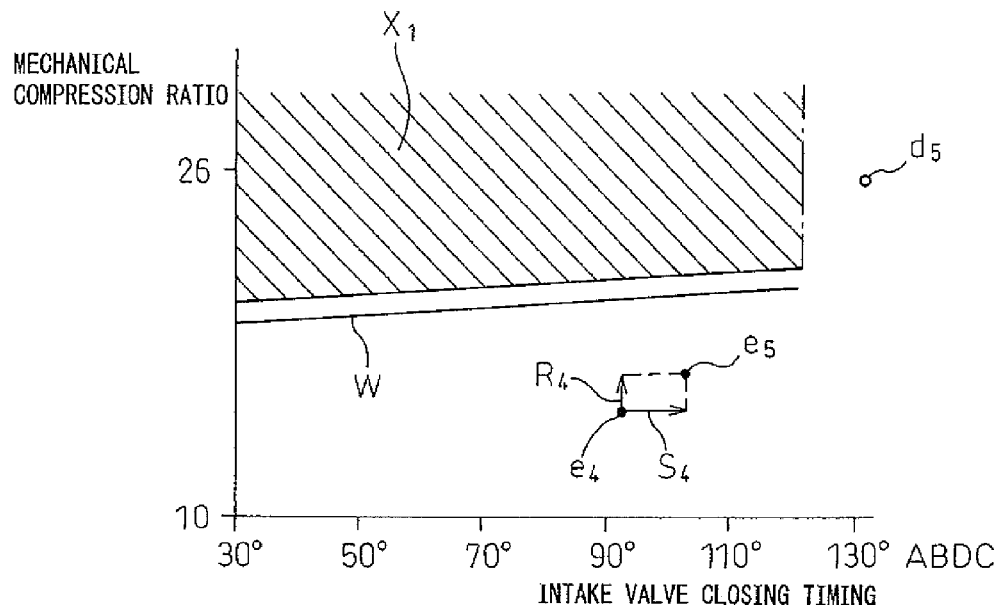
FIG. 25 is a view which shows a target operating point and an operating point.
Figure 26:
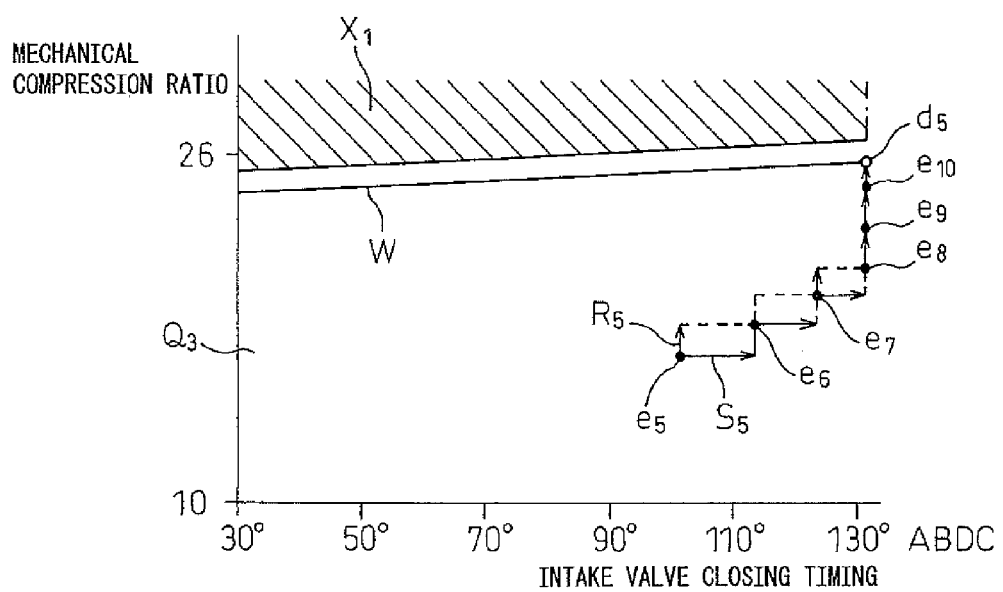
FIG. 26 is a view which shows a target operating point and an operating point.

Further, FIG. 21 shows the throttle full open plane $Q_6$, FIG. 22 shows the identical intake air amount plane where the intake air amount is $Q_5$, FIG. 23 shows the identical intake air amount plane where the intake air amount is a value between $Q_5$ and $Q_4$, FIG. 24 shows the identical intake air amount plane where the intake air amount is $Q_4$, FIG. 25 shows the identical intake air amount plane where the intake air amount is a value between $Q_4$ and $Q_3$, and FIG. 26 shows the identical intake air amount plane where the intake air amount is $Q_3$.

Now then, when the mechanical compression ratio and the closing timing of the intake valve are held at the operating point "n" shown in FIG. 20, the demanded intake air amount changes from $Q_6$ to $Q_5$. As a result, when the demanded operating point becomes $d_1$, first, as shown in FIG. 21, the target operating point $e_1$ on the throttle full open plane $Q_6$ is calculated. The method of calculation of this target operating point $e_1$ is the same as the method of calculation which was explained up to here. The target operating point $e_1$ which is closest to the demanded operating point $d_1$ without entering the no-entry region $X_1$ is calculated from the amount which the mechanical compression ratio can reach after a fixed time and the amount which the closing timing of the intake valve can reach after a fixed time. In the example which is shown in FIG. 21, this target operating point $e_1$ is positioned on the reference operating line W.

Now, the intake air amount at this target operating point $e_1$ is a value between $Q_6$ and $Q_5$ and becomes a state larger than the demanded intake air amount $Q_5$. However, the intake air amount is preferably made to match the demanded intake air amount as much as possible. In this regard, when making the demanded intake air amount decrease, it is possible to adjust the amount of intake air by changing the opening degree of the throttle valve 17. Therefore, when in a state where the amount of intake air at the target operating point $e_1$ is larger than the demanded intake air amount $Q_5$, the target values of the mechanical compression ratio and the closing timing of the intake valve are not made to change, but the throttle valve 17 is made to close to the target opening degree which is required for making the amount of intake air the demanded intake air amount $Q_5$.

That is, in FIG. 20, the point on the identical intake air amount plane $Q_5$ which is positioned directly under the target operating point $e_1$ on the throttle full open plane $Q_6$ which is shown in FIG. 21 is made the final target operating point $e_1$. The final target operating point $e_1$ on the identical intake air amount plane $Q_5$ is shown in FIG. 20 and FIG. 22. The mechanical compression ratio, the closing timing of the intake valve, and the opening degree of the throttle valve 17 are made to change toward the final target operating point $e_1$. That is, at this time, the mechanical compression ratio is made to increase, the closing timing of the intake valve is retarded, and the opening degree of the throttle valve 17 is made smaller than the full open state.

Next, if the demanded intake air amount becomes a value between $Q_5$ and $Q_4$ and the demanded operating point becomes $d_2$, this time, as shown in FIG. 22, the target operating point $e_2$ at the identical intake air amount plane at the current intake air amount $Q_5$ is calculated. The method of calculation of this target operating point $e_2$ is also the same as the method of calculation explained up to here. The target operating point $e_2$ which is the closest to the demanded operating point $d_2$ without entering the no-entry region $X_1$ is calculated from the amount of the mechanical compression ratio which can be reached after a fixed time and the amount of the closing timing of the intake valve which can be reached after a fixed time. In the example which is shown in FIG. 22, this target operating point $e_2$ is positioned on the reference operating line W in the identical intake air amount plane $Q_5$.

In this regard, in this case as well, the amount of intake air at the target operating point $e_2$ is in a state larger than the demanded intake air amount. Therefore, in this case as well, in FIG. 20, the point on the identical intake air amount plane (value between $Q_5$ and $Q_4$) which is positioned directly under the target operating point $e_2$ on the identical intake air amount plane $Q_5$ which is shown in FIG. 22 is made the final target operating point $e_2$. The final target operating point $e_2$ on this identical intake air amount plane (value between $Q_5$ and $Q_4$) is shown in FIG. 20 and FIG. 23. The mechanical compression ratio, the closing timing of the intake valve, and the opening degree of the throttle valve 17 are made to change toward the final target operating point $e_2$. At this time as well, the mechanical compression ratio is made to increase, the closing timing of the intake valve is retarded, and the opening degree of the throttle valve 17 is made smaller from the full open state.

Next, when the demanded intake air amount becomes $Q_4$, next becomes a value between $Q_4$ and $Q_3$, then becomes $Q_3$, a similar operation is successively repeated. That is, when the demanded intake air amount becomes $Q_4$, as shown in FIG. 24, the final target operating point $e_3$ on the identical intake air amount plane $Q_4$ is calculated, when the demanded intake air amount becomes a value between $Q_4$ and $Q_3$, as shown in FIG. 25, the final target operating point $e_4$ on the identical intake air amount plane (value between $Q_4$ and $Q_3$) is calculated, then, when the demanded intake air amount becomes $Q_3$, as shown in FIG. 26, the final target operating point $e_5$ on the identical intake air amount plane $Q_3$ is calculated.

During this time, that is, while the mechanical compression ratio, the closing timing of the intake valve, and the opening degree of the throttle valve 17 are successively made to change toward the final target operating points $e_3$, $e_4$, and $e_5$, the mechanical compression ratio is made to increase, the closing timing of the intake valve is retarded, and the opening degree of the throttle valve 17 is made smaller.

If the demanded intake air amount becomes $Q_3$, as shown in FIG. 26, the final target operating points $e_6$, $e_7$, $e_8$, $e_9$, and $e_{10}$ are successively calculated on the identical intake air amount plane $Q_3$, and the mechanical compression ratio, the closing timing of the intake valve, and the opening degree of the throttle valve 17 are made to change through the successive final target operating points $e_6$, $e_7$, $e_8$, $e_9$, and $e_{10}$ to the demanded operating point $d_5$. During this period, the mechanical compression ratio is made to increase, the closing timing of the intake valve is retarded until reaching $e_8$, and the opening degree of the throttle valve 17 is gradually increased and is made to fully open when reaching $e_8$.

Figure 27:
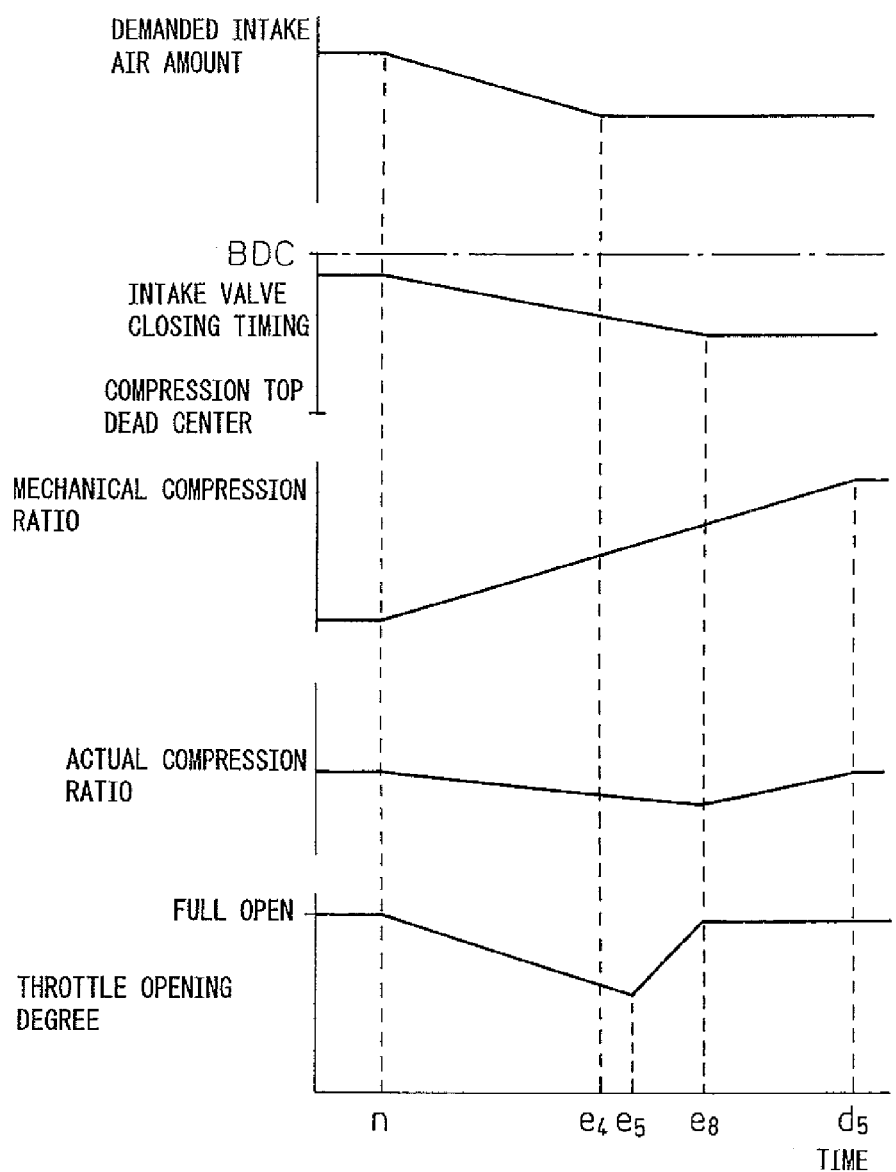
FIG. 27 is a time chart which shows changes in the mechanical compression ratio, the closing timing of the intake valve, the throttle opening degree, etc.

FIG. 27 shows the changes in the closing timing of the intake valve, the mechanical compression ratio, the actual compression ratio, and the throttle opening degree when, as shown in FIG. 20, the target intake air amount is made to decrease relatively fast from $Q_6$ (point "n") to $Q_3$ (target operating point $d_5$). From FIG. 27, it will be understood that in this case, after the demanded intake air amount becomes the target value (operating point $e_4$), the action of retarding the closing timing of the intake valve is ended (operating point $e_8$), then the action to increase the mechanical compression ratio is ended (target operating point $d_5$). On the other hand, the actual compression ratio gradually decreases until the action of retarding the closing timing of the intake valve is ended (operating point $d_8$), then gradually rises. Further, the throttle opening degree is made to gradually drop from the full open state until the operating point becomes the operating point $e_5$ on the identical intake air amount plane $Q_3$, then is made to gradually open to the full open state until the action of retarding the closing timing of the intake valve ends (operating point $e_8$).

As shown from FIG. 20 to FIG. 27, when the demanded intake air amount is made to decrease relatively fast, the throttle opening degree is controlled in addition to the control of the mechanical compression ratio and the closing timing of the intake valve. In the present invention, at this time, three-dimensional no-entry regions $X_1$ and $X_2$ are set for the combination of the mechanical compression ratio, the closing timing of the intake valve, and the throttle opening degree. The operating point showing the combination of the mechanical compression ratio, the closing timing of the intake valve, and the throttle opening degree is prohibited from entering the three-dimensional no-entry regions $X_1$ and $X_2$.

Note that, in this case as well, when the demanded intake air amount has changed, the target operating point which the mechanical compression ratio and the closing timing of the intake valve can reach after a fixed time when moving from the current operating point toward the operating point which satisfies the demanded intake air amount without entering the three-dimensional no-entry regions $X_1$ and $X_2$ is calculated, and the mechanical compression ratio and the closing timing of the intake valve are made to change toward the calculated target operating point. Furthermore, in this case, when the demanded intake air amount changes, the throttle opening degree is made to change in accordance with the demanded intake air amount so that the throttle opening degree does not enter the three-dimensional no-entry regions $X_1$ and $X_2$.

Note that, in this case as well, to enable the mechanical compression ratio, the closing timing of the intake valve, and the throttle opening degree to reach the demanded operating point which satisfies the demanded intake air amount as fast as possible, the target operating point is made the operating point the furthest from the current operating point among the operating points which they can reach after a fixed time when moving from the current operating point toward the operating point which satisfies the demanded intake air amount without entering the three-dimensional no-entry regions $X_1$ and $X_2$.

Further, in this case, in the embodiment according to the present invention, when the demanded intake air amount is decreased, the target operating point which the mechanical compression ratio and the closing timing of the intake valve can reach after a fixed time when moving from the current operating point toward the operating point which satisfies the demanded intake air amount without entering the no-entry regions $X_1$ and $X_2$ at the current intake air amount is calculated, and the mechanical compression ratio and the closing timing of the intake valve are made to change toward the target operating point. On the other hand, in this case, for the throttle opening degree, the target opening degree which satisfies the demanded intake air amount at the calculated target operating point is calculated, and the throttle opening degree is made to change to the target opening degree so long as not at the three-dimensional no-entry regions $X_1$ and $X_2$.

Figure 18:
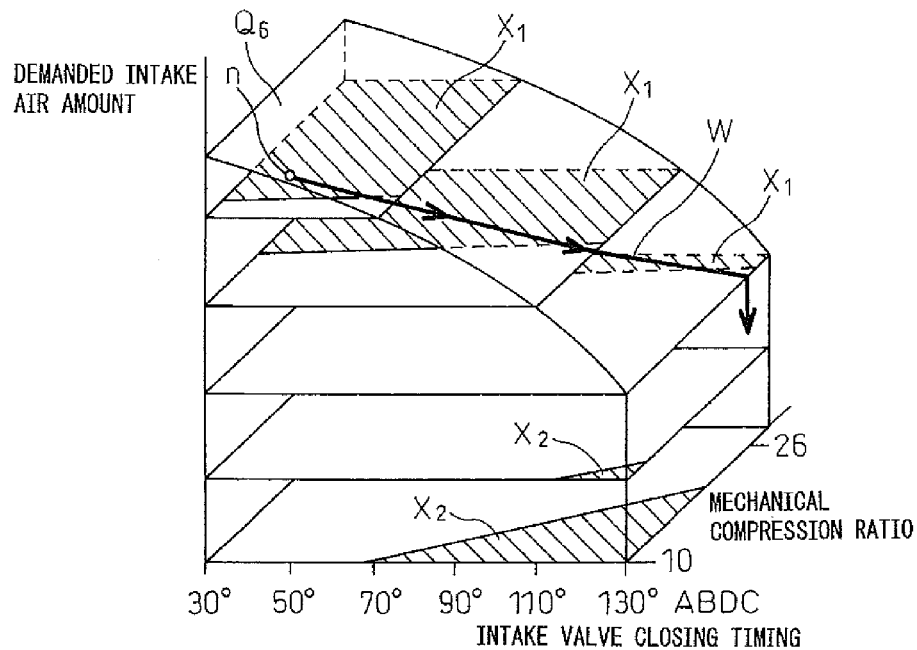
FIG. 18 is a view which shows changes in the mechanical compression ratio, the closing timing of the intake valve, and the throttle opening degree.

Now, as shown in FIG. 18 and FIG. 19, if the demanded intake air amount is made to decrease slowly and, as shown in FIG. 20 to FIG. 27, if the demanded intake air amount is made to decrease relatively slowly, the amount of intake air which is actually supplied to the combustion chamber 5 will constantly substantially match the demanded intake air amount. If the amount of intake air which is actually supplied to the combustion chamber 5 and the demanded intake air amount substantially match in this way, the method which was explained with reference to FIG. 18 and FIG. 19 or the method which was explained with reference to FIG. 20 to FIG. 27 may be used to control the engine load to the engine load which is demanded.

However, when the demanded intake air amount is made to rapidly decrease down to the minimum intake air amount, the amount of intake air which is actually supplied into the combustion chamber 5 cannot be decreased to follow the rapid decrease in the demanded intake air amount. Therefore, in this case, the amount of intake air which is supplied to the combustion chamber 5 will not match the demanded intake air amount. Therefore, in this case, it is not possible to use the explained method while referring to FIG. 20 to FIG. 27. That is, in this case, it is necessary to use another method.

Further, with the method which is shown from FIG. 20 to FIG. 27 when the demanded intake air amount is made to decrease down to the minimum intake air amount, the throttle valve 17 is made to close down to an opening degree which satisfies the minimum intake air amount, that is, the demanded intake air amount. In this case, the throttle opening degree which satisfies the minimum intake air amount, that is, the demanded intake air amount, is a relatively large opening degree. Therefore, at this time, the throttle valve 17 is only closed to a relatively large opening degree. However, when the demanded intake air amount is made to decrease down to the minimum intake air amount in this way, if the throttle valve 17 is only closed down to a relatively large opening degree, the speed of decrease of the amount of intake air which is actually supplied to the combustion chamber 5 becomes considerably slow and, as a result, a good vehicle deceleration feeling cannot be obtained.

Therefore, in the present invention, when the demanded intake air amount is rapidly made to decrease down to the minimum intake air amount, the throttle valve 17 is immediately fully closed. When the throttle valve 17 is immediately made to fully close in this way, the speed of decrease of the amount of intake air which is actually supplied into the combustion chamber 5 can be increased. Next, this will be explained with reference to FIG. 28.

Figure 28:
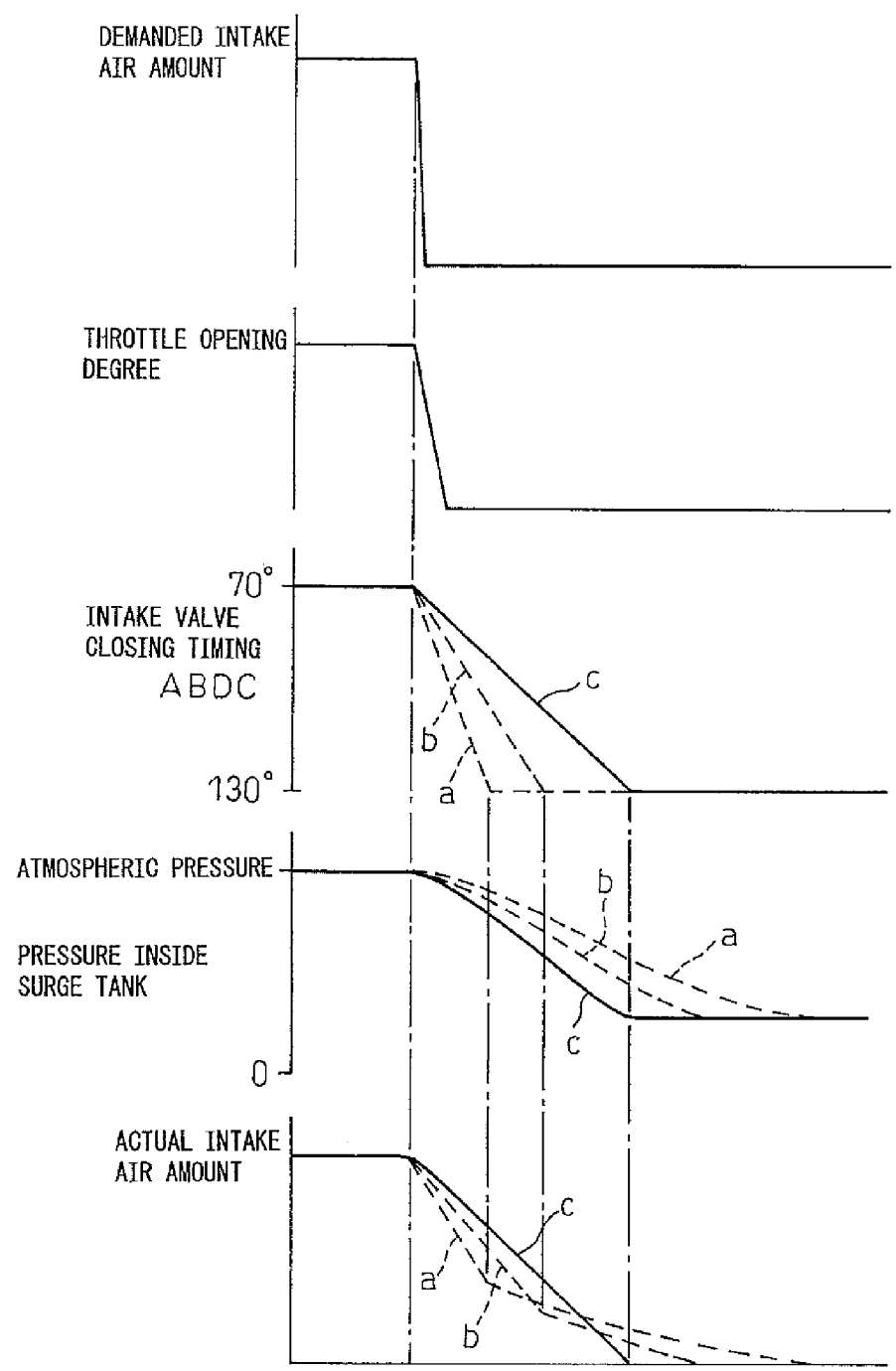
FIG. 28 is a time chart which shows changes in the amount of intake air which is actually supplied to combustion chambers 5.

FIG. 28 shows the change of the amount of intake air which is actually supplied into the combustion chamber 5 (below, simply called the "actual intake air amount") when the demanded intake air amount is made to decrease to the minimum intake air amount and the throttle valve 17 is made to immediately fully close, along with the change of the closing timing of the intake valve and the change of the pressure inside the surge tank 12. Note that, FIG. 28 shows the corresponding changes in the pressure inside the surge tank 12 and the actual intake air amount by "a", "b", and "c" in the case where the retardation speed of the closing timing of the intake valve is made different speeds shown by "a", "b", and "c". Incidentally, "a" shows the case where the closing timing of the intake valve is retarded by the fastest retardation speed.

Now, an internal combustion engine is usually provided with a large volume part such as a surge tank downstream of the throttle valve. If there is such a large volume part is present, even if throttle valve is made to fully close, the actual intake air amount is not immediately decreased until the air inside the large volume part is consumed. For example, when the demanded intake air amount becomes the minimum intake air amount, if immediately fully closing the throttle valve 17 and retarding the closing timing of the intake valve by the fastest speed, the actual intake air amount will appear to be made to rapidly decrease. However, in this case, as shown by "a" in FIG. 28, the actual intake air amount does not easily decrease.

That is, if retarding the closing timing of the intake valve, along with this, the volume of the combustion chamber 5 decreases at the time of start of the actual compression action and the actual intake air amount decreases. However, if making the retardation speed of the closing timing of the intake valve faster, the amount of air which is fed from the surge tank 12 to the inside of the combustion chamber 5 becomes smaller while the action of retardation is being performed. Therefore, as shown in "a" of FIG. 28, if the retardation speed of the closing timing of the intake valve is made faster, the pressure in the surge tank 12 will not fall easily and the actual intake air amount will rapidly fall during the action for retarding the closing timing of the intake valve, but will decrease slowly after the end of the retardation action.

As opposed to this, as shown by "b" or "c" in FIG. 28, if the retardation speed of the closing timing of the intake valve is made to drop slightly, the amount of air which is fed from the surge tank 12 to the combustion chamber 5 per unit time increases. Therefore, if the retardation speed of the closing timing of the intake valve is made to drop, the speed of drop of the pressure inside the surge tank 12 gradually becomes faster and the time until the actual intake air amount becomes the minimum intake air amount gradually becomes shorter. As shown in FIG. 28 in this way, when the demanded intake air amount is made to rapidly decrease down to the minimum intake air amount, even if the throttle valve 17 is immediately fully closed, the actual intake air amount is not decreased while following the decrease of the demanded intake air amount.

Figure 29:
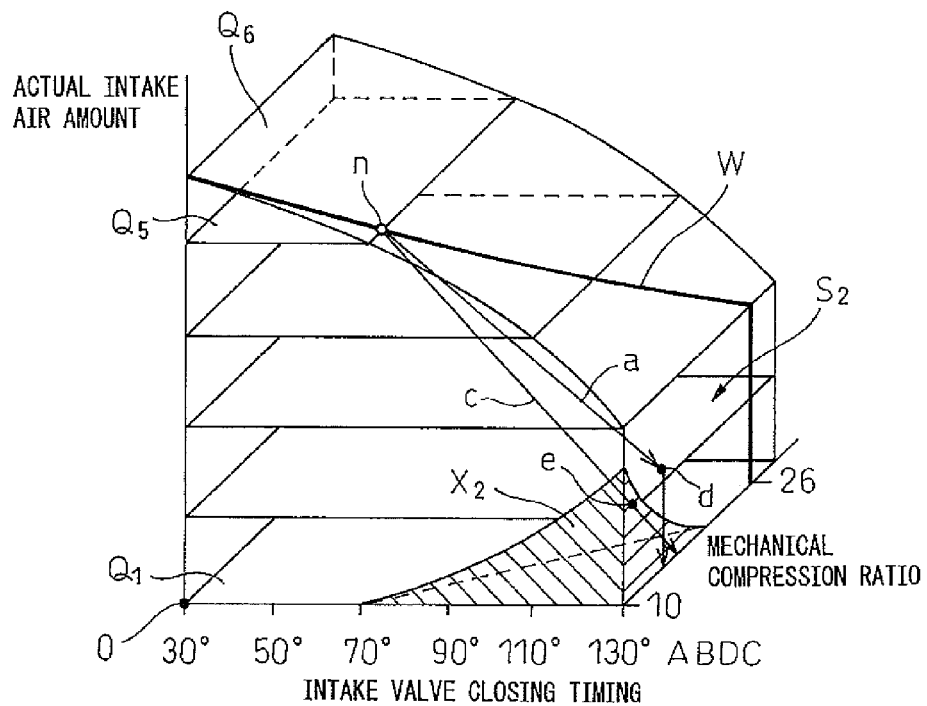
FIG. 29 is a view which shows a no-entry region $X_2$ and a target operating line W.
Figure 30:
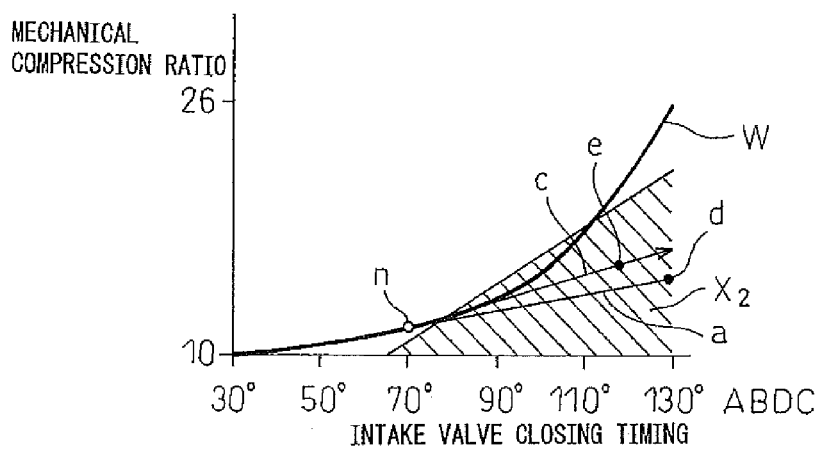
FIG. 30 is a view which shows a no-entry region $X_2$ and a target operating line W.

FIG. 29 is a view similar to FIG. 10, while FIG. 30 is a view similar to FIG. 11. However, the ordinate in FIG. 29 indicates not the demanded intake air amount, but the actual intake air amount. Note that, in the examples which are shown from FIG. 10 to FIG. 27 as well, the ordinates of FIG. 10 etc. indicated the actual intake air amount, but in the examples which are shown from FIG. 10 to FIG. 27, the demanded intake air amount and the actual intake air amount substantially matched, so for convenience in explanation, the ordinates of FIG. 10 etc. were expressed as the demanded intake air amount. Further, in FIG. 29 and FIG. 30, illustration of the high load side no-entry region $X_1$ was omitted and only the low load side no-entry region $X_2$ is shown. Furthermore, in FIG. 29, the low load side no-entry region $X_2$ is drawn in a three-dimensional manner.

Now then, if the demanded intake air amount is made to decrease to the minimum intake air amount, the possibility arises of the operating point showing the combination of the mechanical compression ratio, the closing timing of the intake valve, and the actual intake air amount entering the low load side no-entry region $X_2$. This will be explained while referring to FIG. 29 and FIG. 30.

FIG. 29 and FIG. 30 show the state of the operating point when the operating point is on the point "n" on the throttle full open plane $Q_6$ and the demanded intake air amount is made to decrease to the minimum intake air amount. Note that, in FIG. 29 and FIG. 30, "a" and "c" correspond to "a" and "c" in FIG. 28. That is, when the demanded intake air amount is made to decrease down to the minimum intake air amount, if the closing timing of the intake valve is retarded by the slowest speed, as shown by "a" in FIG. 29 and FIG. 30, the operating point moves from the point "n" to the point "d" on the right side plane $S_2$, then heads straight downward on the right side plane $S_2$. As a result, the operating point enters the no-entry region $X_2$ on the right side plane $S_2$. That is, at this time, as shown in FIG. 31, after the closing timing of the intake valve reaches the maximum retardation position, the operating point enters the no-entry region $X_2$ while the actual intake air amount is decreasing.

As opposed to this, when the demanded intake air amount is made to decrease down to the minimum intake air amount, if the closing timing of the intake valve is retarded by a speed slightly slower than the fastest speed, as shown by "c" in FIG. 29 and FIG. 30, the operating point moves from the point "n" toward the no-entry region $X_2$ and enters the no-entry region $X_2$ at the point "e". That is, at this time, as shown in FIG. 32, while the action of retarding the closing timing of the intake valve is being performed, the operating point enters the no-entry region $X_2$ while the actual intake air amount is decreasing.

Figure 31:
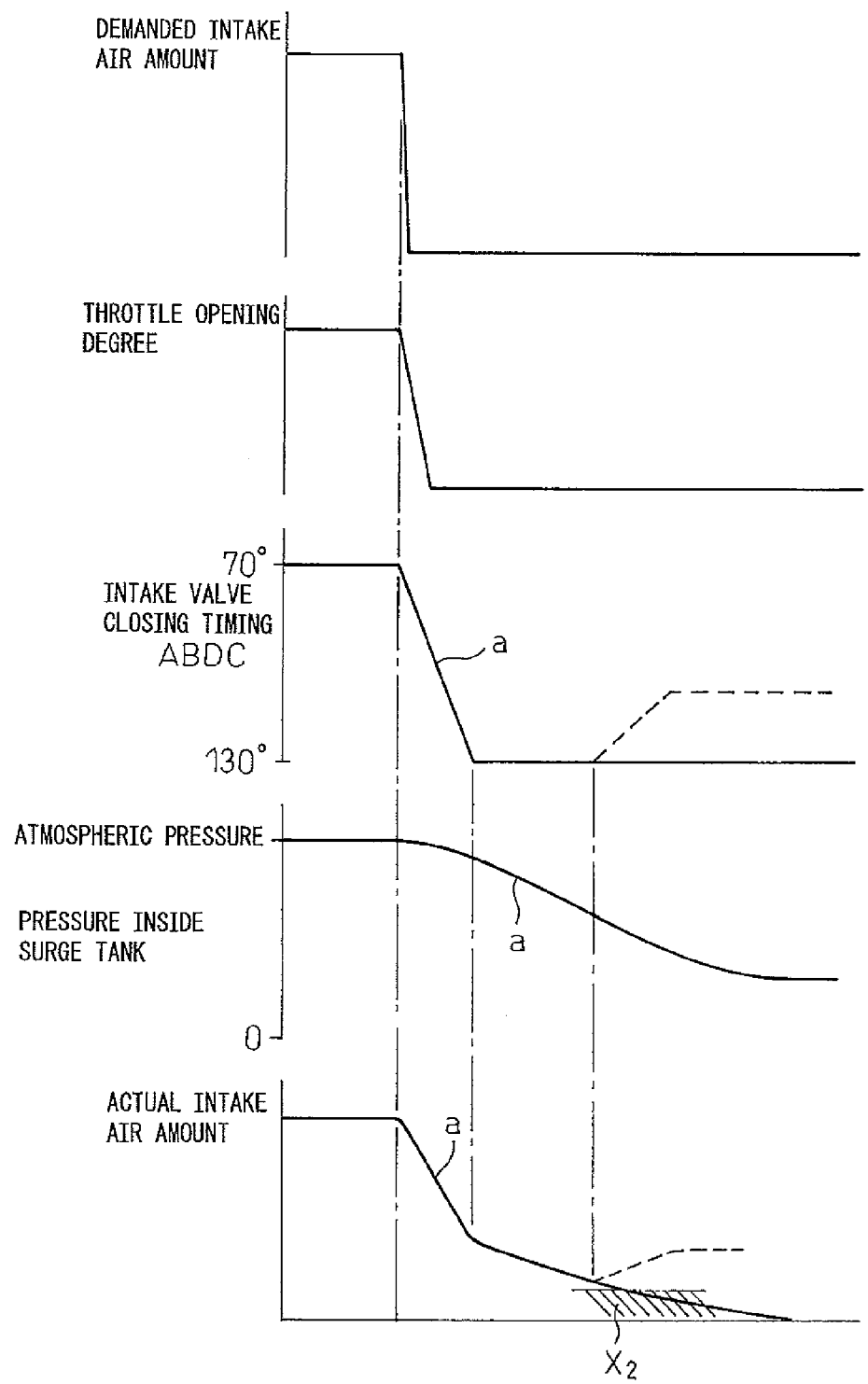
FIG. 31 is a time chart which shows changes in an actual intake air amount etc.
Figure 32:
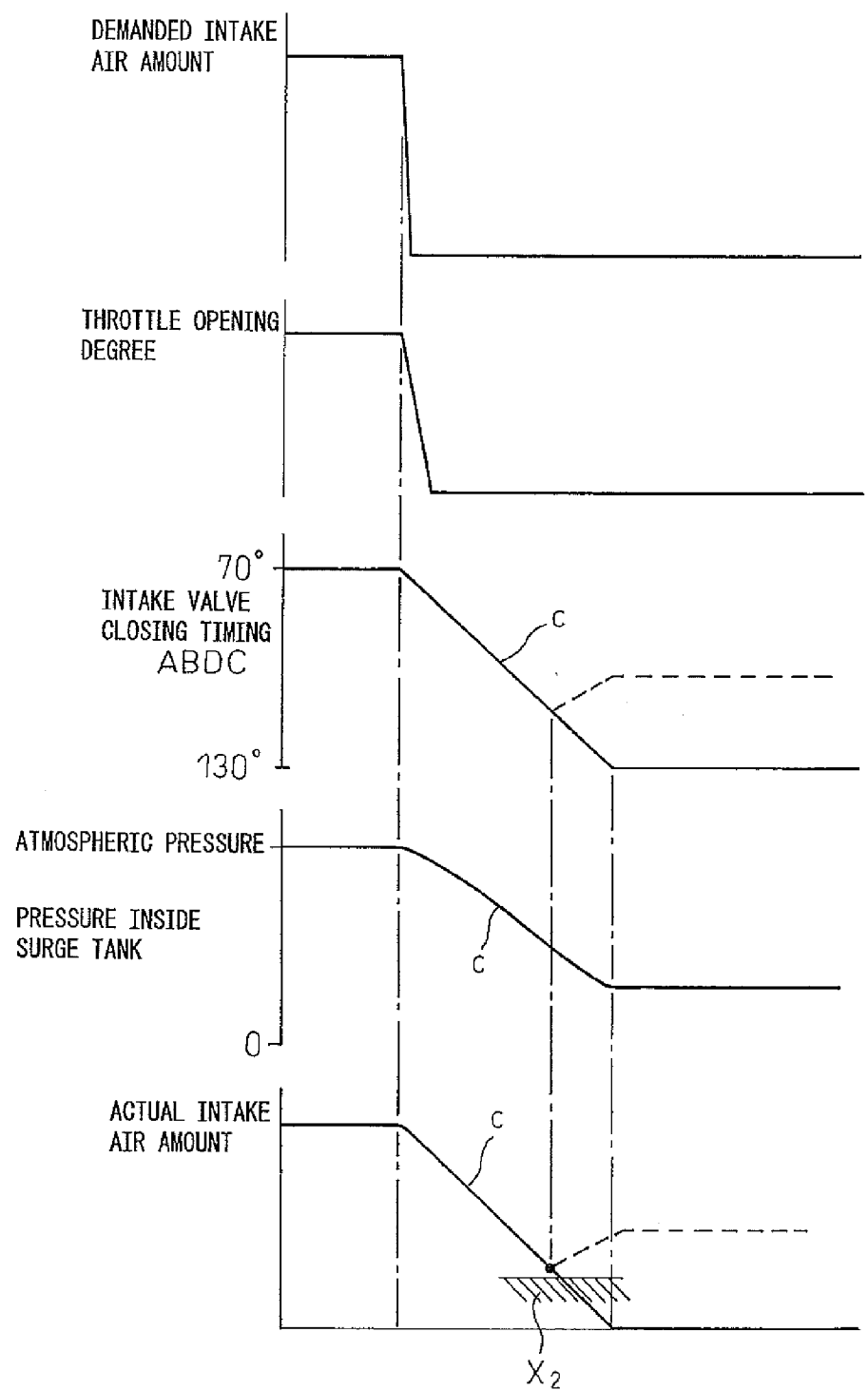
FIG. 32 is a time chart which shows changes in an actual intake air amount etc.

As will be understood from FIG. 31 and FIG. 32, the operating point enters the no-entry region $X_2$ while the actual intake air amount is decreasing. In this case, to block the operating point from entering the no-entry region $X_2$, when the operating point approaches the no-entry region $X_2$, it is sufficient to make the action of decreasing the actual intake air amount temporarily stop until the mechanical compression ratio sufficient increases. To make the action of decreasing the actual intake air amount stop, it is necessary to make the action of retarding the closing timing of the intake valve stop, but in this case, if the stopping position deviates even slightly, the operating point ends up entering the no-entry region $X_2$. Therefore, as an actual problem, it is difficult to accurately control the closing timing of the intake valve so that the action of decreasing the actual intake air amount stops.

Therefore, in actuality, when the operating point has approached the no-entry region $X_2$, as shown by the broken line in FIG. 31 and FIG. 32, the closing timing of the intake valve is advanced so that the actual intake air amount increases. However, when the demanded intake air amount is made to rapidly decrease, that is, at the time of rapid deceleration operation, if the actual intake air amount is made to temporarily increase when the actual intake air amount is decreased, the driver of the vehicle is given a strange feeling.

Figure 33:
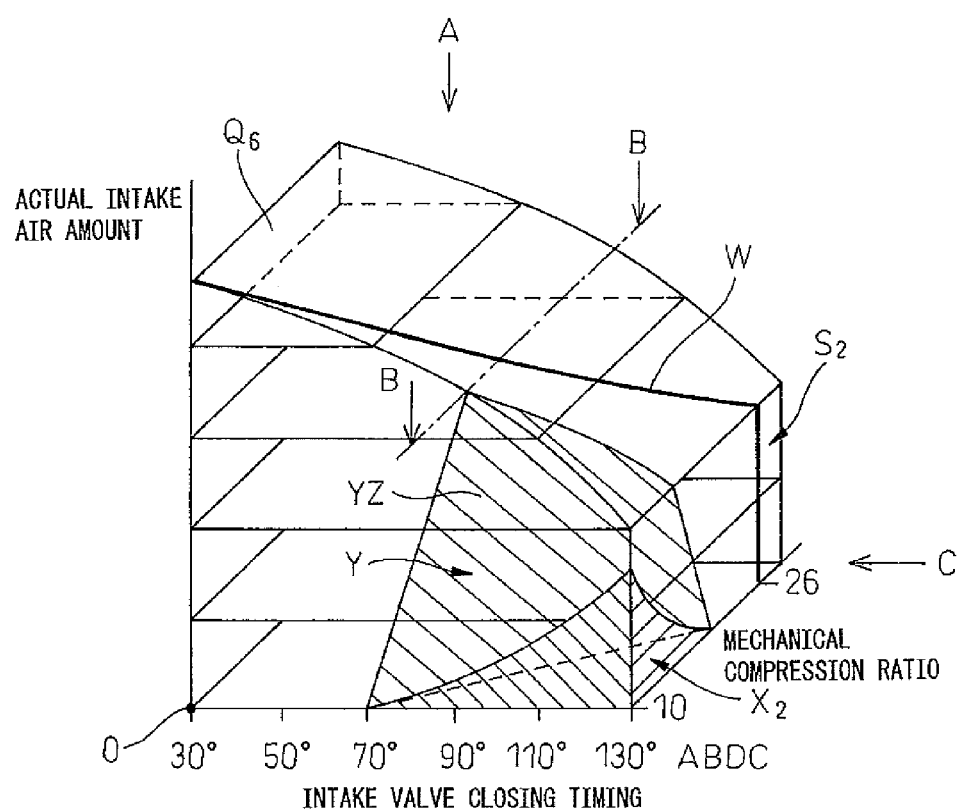
FIG. 33 is a view showing a no-entry layer.

Therefore, in the present invention, when the demanded intake air amount has decreased, the no-entry layer is set so as to cover the no-entry regions $X_2$ so that the operating point will not enter the no-entry region $X_2$ and a good deceleration feeling can be obtained. Next, this no-entry layer will be explained with reference to FIG. 33 and FIG. 34. Note that, FIG. 34(A) is a view seen along the arrow A in FIG. 33, FIG. 34(B) is a cross-sectional view seen along the section B-B in FIG. 33, and FIG. 34(C) shows the right side plane $S_2$ seen along the arrow C in FIG. 33. Note that, in these figures, only FIG. 34(B) shows the high load side no-entry region $X_1$.

As shown in FIG. 33 and FIGS. 34(A), (B), and (C), the no-entry region $X_2$ has the broadest region at the time of the minimum intake air amount and gradually becomes smaller along with the increase of the intake air amount. In the present invention, a no-entry layer Y is set for this no-entry region $X_2$ when the demanded intake air amount decreases. As will be understood from FIG. 33 and FIGS. 34(A), (B), and (C), this no-entry layer Y extends along the edge of the no-entry region $X_2$ at the time of the minimum intake air amount and extends from the no-entry region $X_2$ toward the intake air amount increase side while surrounding the no-entry region $X_2$ as the intake air amount increases from the minimum intake air amount. Specifically speaking, this no-entry layer Y extends from the top surface of the no-entry region $X_2$ to the throttle full open plane $Q_6$.

In the present invention, the operating point is prohibited from entering the no-entry layer Y. That is, in the present invention, when the demanded intake air amount is made to decrease and the operating point moves toward the no-entry region $X_2$, the operating point is prohibited from entering the no-entry layer Y, thereby the operating point is blocked from entering the no-entry region $X_2$.

In this regard, in the embodiment according to the present invention, after the demanded intake air amount is made to decrease and the operating point reaches the outer circumferencial face YZ of the no-entry layer Y, the operating point is made to move along the outer circumferencial face YZ of the no-entry layer Y in the direction of decrease of the amount of intake air. That is, in the embodiment according to the present invention, the outer circumferencial face YZ of the no-entry layer Y forms a movement guide plane of the operating point. The outer circumferencial face of the no-entry layer Y, that is, the movement guide plane YZ, is comprised of a slant plane which gradually becomes the highly mechanical compression ratio side the further from the throttle full open plane $Q_6$ to the minimum intake air amount plane Q. The slant angle of this movement guide plane YZ is determined by the speed of drop of the actual intake air amount and the speed of increase of the mechanical compression ratio.

That is, when the demanded intake air amount is made to decrease, the mechanical compression ratio is made to increase by the maximum speed, and the slant angle of the movement guide plane YZ is made a slant angle θK which is determined by the maximum increase CRK of the mechanical compression ratio per unit time and the maximum drop GAK of the actual intake air amount per unit time in FIG. 34(C) or a slant angle above this. When the slant angle of the movement guide plane YZ is made such a slant angle θK or more, the operating point which is guided along the movement guide plane YZ will never enter the no-entry layer Y, therefore the operating point will be blocked from entering the no-entry region $X_2$.

Note that, when the time until the actual intake air amount becomes the minimum intake air amount in FIG. 28 is the shortest, it is believed that the drop per unit time in the actual intake air amount becomes maximum. On the other hand, C of FIG. 28 shows where the time until when the actual intake air amount becomes the minimum intake air amount is the shortest. Therefore, in the embodiment according to the present invention, the drop in the actual intake air amount per unit time at the time which is shown by C in FIG. 28 is made the maximum drop GAK, and the slant angle θK of the movement guide plane YZ is determined from this maximum drop GAK and the maximum increase RK of the mechanical compression ratio.

Figure 35:
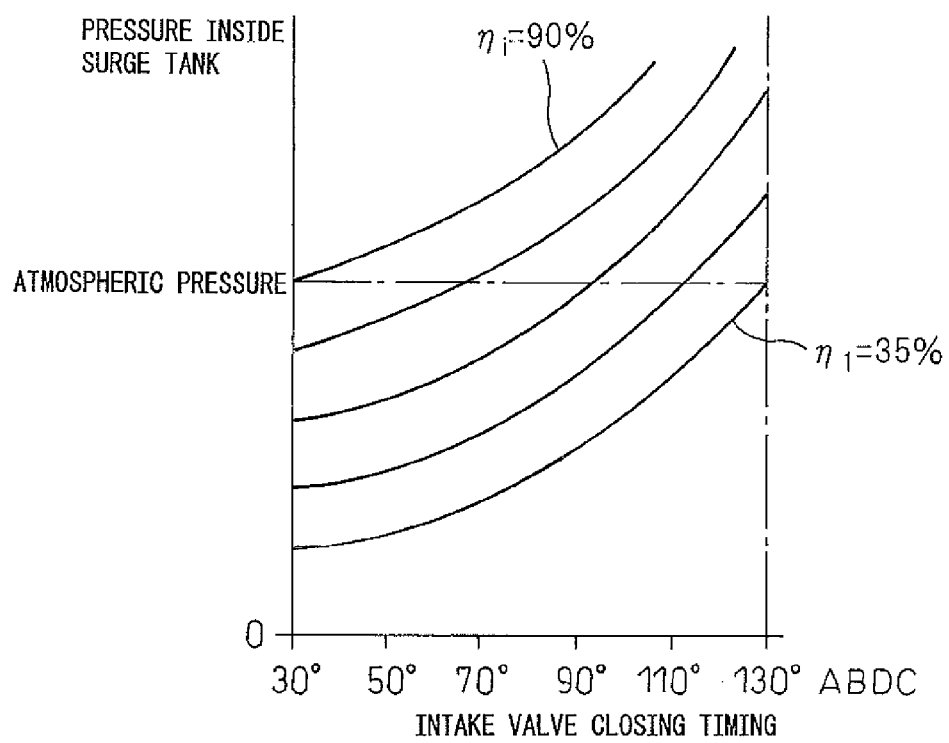
FIG. 35 is a view showing a charging efficiency.

Here, simply explaining the method of finding the actual intake air amount, in the internal combustion engine which is shown in FIG. 1, if the pressure inside of the surge tank 12, the closing timing of the intake valve, and the engine speed are determined, the charging efficiency is determined. In the embodiment according to the present invention, the actual intake air amount is calculated from this charging efficiency. FIG. 35 shows the equivalent charging efficiency lines at the time of a certain engine speed. In the example which is shown in FIG. 35, the charging efficiency η gradually rises from $η_1$ toward $η_i$. In the embodiment according to the present invention, the relationship which is shown in FIG. 35 is stored for various speeds. The charging efficiency is calculated from these relationships, while the actual intake air amount is calculated from the calculated charging efficiency.

The method of finding the actual intake air amount which is explained above is one example. The actual intake air amount can be found by another method as well. For example, it is also possible to use a model for the flow of intake air to find the actual intake air amount.

Next, referring to FIG. 36 to FIG. 38, the path of movement of an operating point when the demanded intake air amount is made to rapidly decrease to the minimum intake air amount will be explained. The operating point in this case, as explained earlier, is a point which is determined from the mechanical compression ratio, the closing timing of the intake valve, and the actual intake air amount. Note that, when the demanded intake air amount is made to rapidly decrease to the minimum intake air amount, as explained earlier, the throttle valve 17 is immediately made to fully close and the no-entry layer Y is set.

In the embodiment according to the present invention, this no-entry layer Y is not set except when the demanded intake air amount is made to rapidly decrease, therefore the operating point can enter the no-entry layer when the demanded intake air amount is increased or when the demanded intake air amount slowly decreases.

Figure 36:
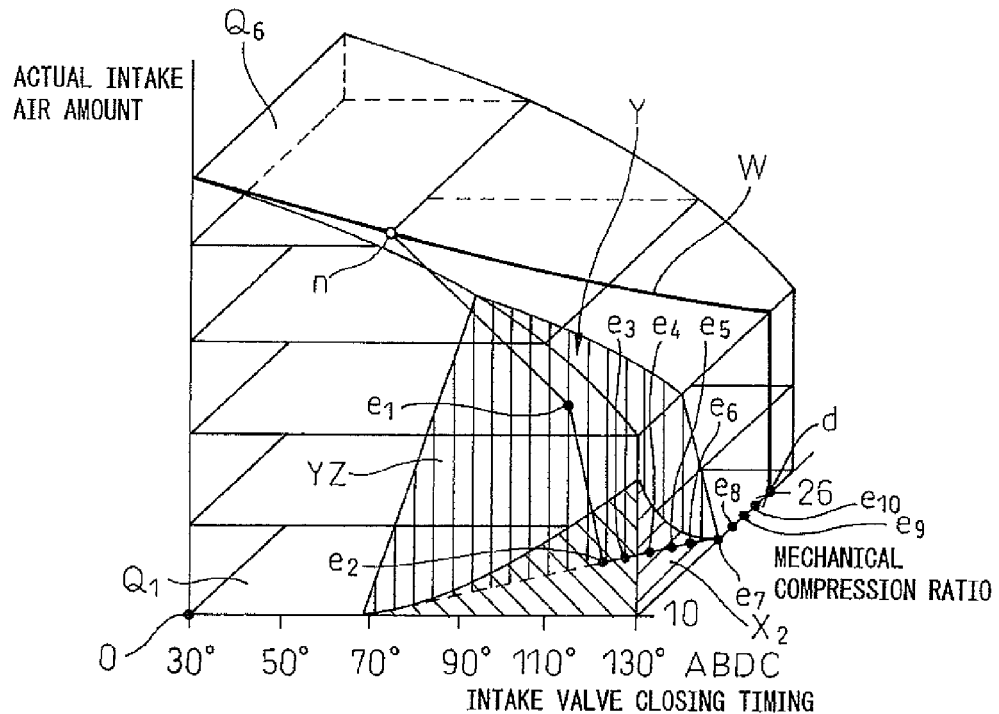
FIG. 36 is a view which shows a target operating point and an operating point.

Now then, when the mechanical compression ratio and the closing timing of the intake valve are held at the operating point "n" which is shown in FIG. 36, the demanded intake air amount becomes the minimum intake air amount, and as a result, if the demanded operating point reaches "d", the mechanical compression ratio is made to increase by the maximum speed until the operating point reaches the movement guide plane YZ of the no-entry layer Y. At this time, the closing timing of the intake valve is retarded by the speed shown in FIG. 28 by the solid line C, that is, a predetermined speed enabling the actual intake air to be made to decrease to the minimum intake air amount in the shortest time when the demanded intake air amount is made to decrease to the minimum intake air amount. That is, if expressed so as to be able to cover even the case which is shown by the broken line in FIG. 9, when the demanded intake air amount is made to decrease, an action to increase the mechanical compression ratio and an action to make the closing timing of the intake valve move in a direction away from intake bottom dead center are started. At this time, the speed by which the closing timing of the intake valve is made to move in a direction away from intake bottom dead center is made a predetermined speed which enables the actual intake air to be made to decrease to the minimum intake air amount in the shortest period when the demanded intake air amount is made to decrease to the minimum intake air amount.

Note that, while the mechanical compression ratio is made to increase by the maximum speed and the closing timing of the intake valve is being retarded by the speed which is shown in FIG. 28 by the solid line C, the pressure inside the surge tank 12 which is detected by the pressure sensor 25, the closing timing of the intake valve, and the engine speed are used as the basis to calculate the actual intake air amount, and the calculated actual intake air amount, mechanical compression ratio, and closing timing of the intake valve are used as the basis to judge if the operating point has reached the movement guide plane YZ.

Figure 37:
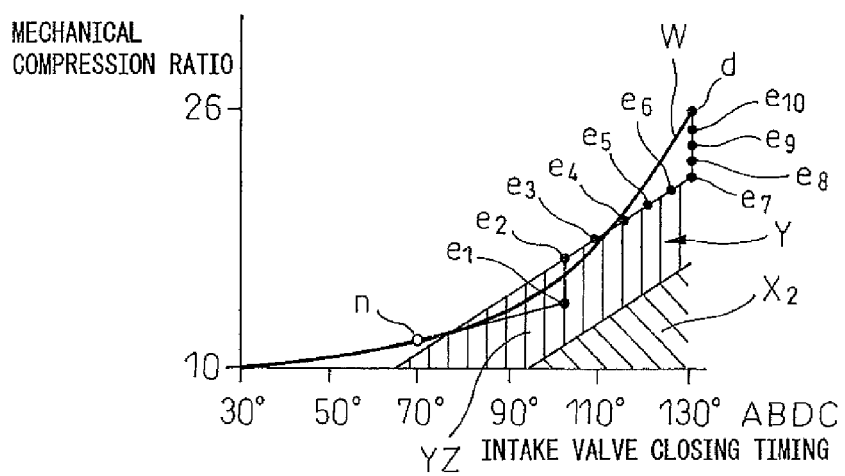
FIG. 37 is a view which shows a target operating point and an operating point.
Figure 38:
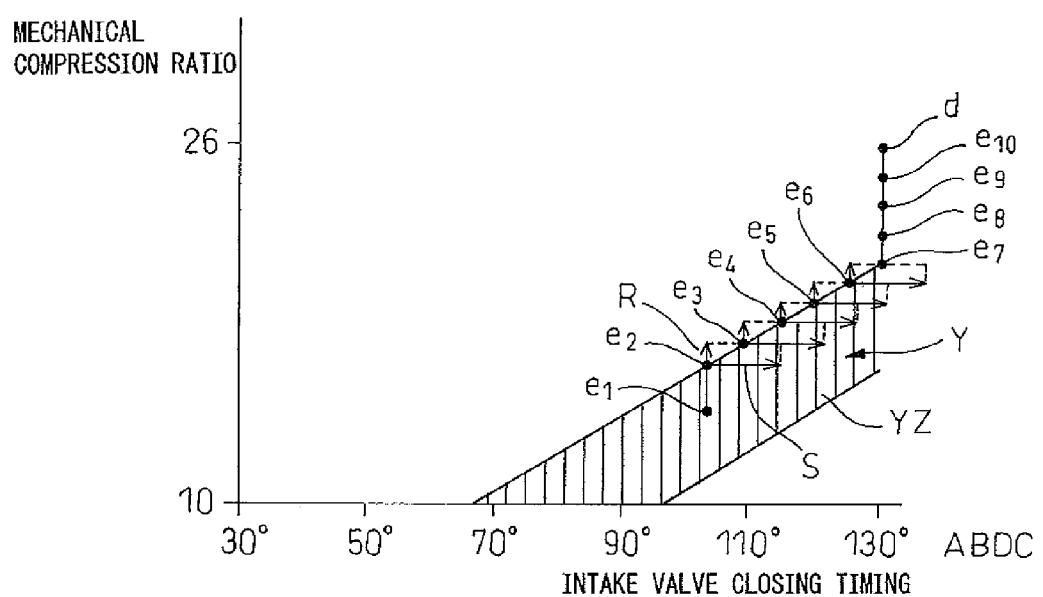
FIG. 38 is a view which shows a target operating point and an operating point.

FIG. 36 to FIG. 38 show the position of the operating point when reaching the movement guide plane YZ by $e_1$. In the example which is shown in FIG. 36 to FIG. 38, if the operating point reaches the movement guide plane YZ, the action of retarding the closing timing of the intake valve is stopped. As opposed to this, the mechanical compression ratio continues to be increased by the maximum speed regardless of whether the operating point reaches the movement guide plane YZ, therefore when the operating point reaches the movement guide plane YZ, the operating point is changed in direction of movement from $e_1$ to the direction of increase of the mechanical compression ratio.

When the operating point moves from $e_1$ in the direction of increase of the mechanical compression ratio, if the drop in the actual intake air amount is the maximum drop GAK, the operating point moves from $e_1$ along the movement guide plane YZ and reaches the minimum intake air amount plane $Q_1$. The position of the operating point at this time is shown by $e_2$.

If the operating point becomes $e_2$, as shown in FIG. 38, the target operating point $e_3$ which is closest to the demanded operating point "d" without entering the non-entry layer Y on the minimum intake air amount plane $Q_1$ is calculated from the amount R which the mechanical compression ratio can reach in a fixed time and the amount S which the closing timing of the intake valve can reach in a fixed time. In the same way, the target operating points $e_4$, $e_5$, $e_6$, $e_7$, $e_8$, $e_9$, and $e_{10}$ which are the closest to the demanded operating point "d" are successively calculated on the minimum intake air amount plane $Q_1$ from the amount which the mechanical ratio can reach after a fixed time and the amount which the closing timing of the intake valve can reach after a fixed time, and the mechanical compression ratio and the closing timing of the intake valve are made to change successively through the final target operating points $e_4$, $e_5$, $e_G$, $e_7$, $e_s$, $e_9$, and $e_{10}$ on the minimum intake air amount plane $Q_1$ until the demanded operating point "d". During this time, the mechanical compression ratio is made to increase, and the closing timing of the intake valve is retarded until reaching $e_7$.

Figure 39:
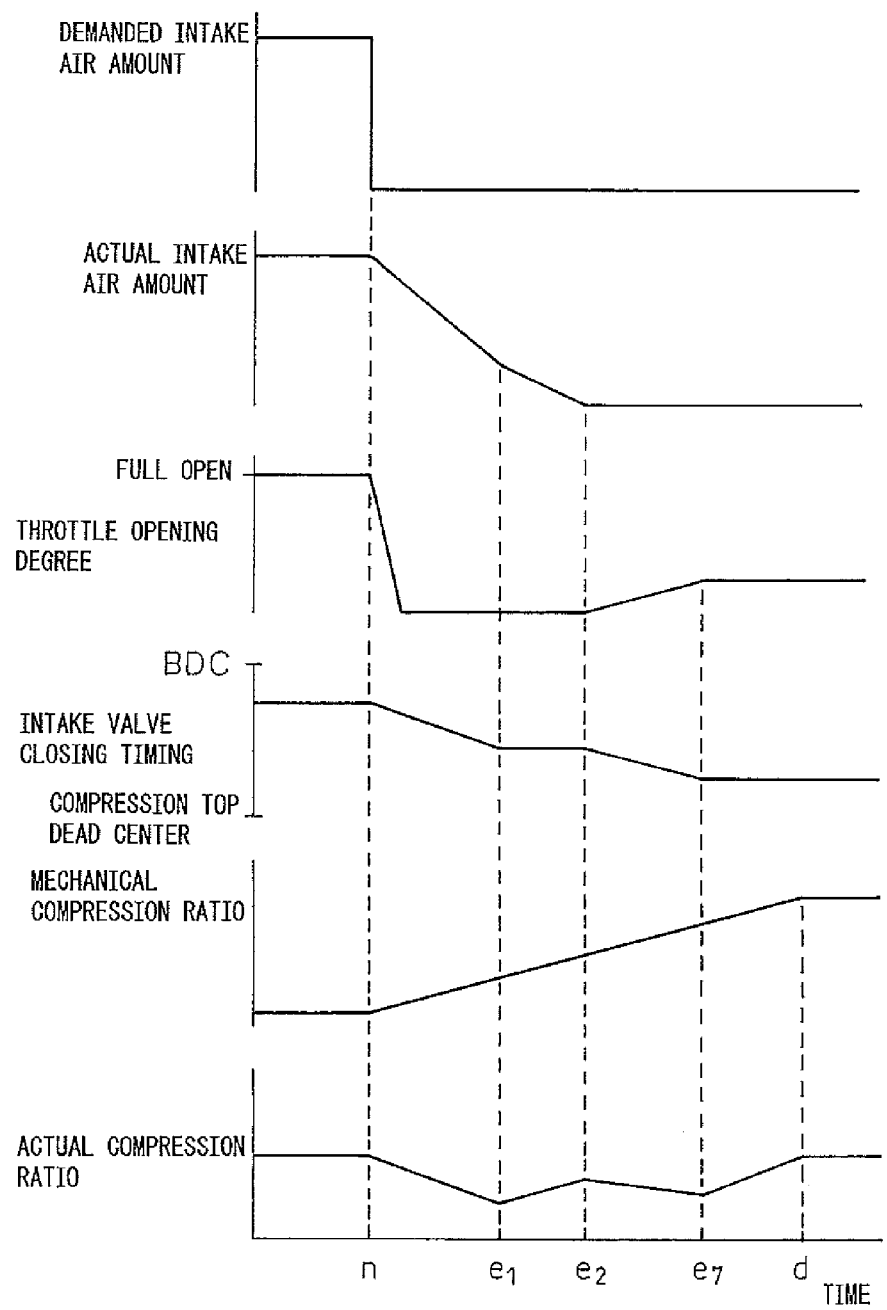
FIG. 39 is a time chart which shows changes in the mechanical compression ratio, the closing timing of the intake valve, the throttle opening degree, etc.

FIG. 39 shows the changes in the actual intake air amount, the throttle opening degree, the closing timing of the intake valve, the mechanical compression ratio, and the actual compression ratio in the case where the operating point is made to move as shown from FIG. 36 to FIG. 38. As will be understood from FIG. 39, after the demanded intake air amount is made to rapidly decrease, the actual intake air amount continues to decrease relatively rapidly, therefore a good vehicle deceleration feeling can be obtained.

On the other hand, in this example, the actual intake air amount reaches the minimum intake air amount, then the opening operation of the throttle valve 17 is started. The opening operation of this throttle valve 17 is performed after the intake air amount reaches the minimum intake air amount, then an action for retarding the closing timing of the intake valve is performed. Further, while the opening operation of the throttle valve 17 is being performed, the mechanical compression ratio continues to increase.

On the other hand, as explained earlier, when the operating point reaches the movement guide plane YZ, then the operating point moves an a direction of increase of the mechanical compression ratio from $e_1$, if the drop in the actual intake air amount is the maximum drop GAK, the operating point moves from $e_1$ along the movement guide plane YZ and reaches the point $e_2$ on the minimum intake air amount plane $Q_1$. As opposed to this, when the drop in the actual intake air amount is smaller than the maximum drop GAK, the operating point gradually moves away from the movement guide plane YZ toward the outside as the mechanical compression ratio increases and reaches the minimum intake air amount plane $Q_1$ at the high mechanical compression ratio side with respect to the no-entry layer Y. When the operating point reaches the minimum intake air amount plane $Q_1$, the same method as shown in FIG. 38 is used to successively calculate the operating point.

In this case as well, the actual intake air amount, the throttle valve opening degree, the closing timing of the intake valve, and the mechanical compression ratio change as shown in FIG. 39. However, in this case, the distance between the $e_1$ and $e_2$ becomes longer than the distance between the $e_1$ and $e_2$ which is shown in FIG. 39.

Figure 40:
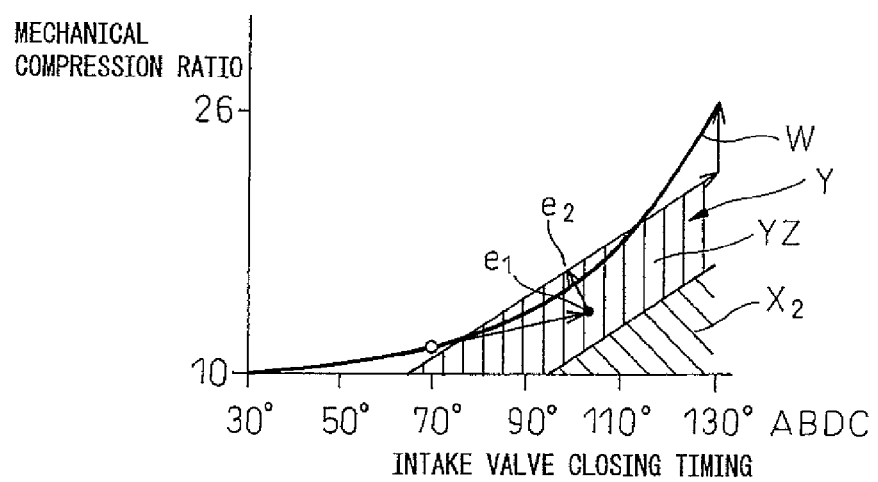
FIG. 40 is a view which shows a target operating point and an operating point.
Figure 41:
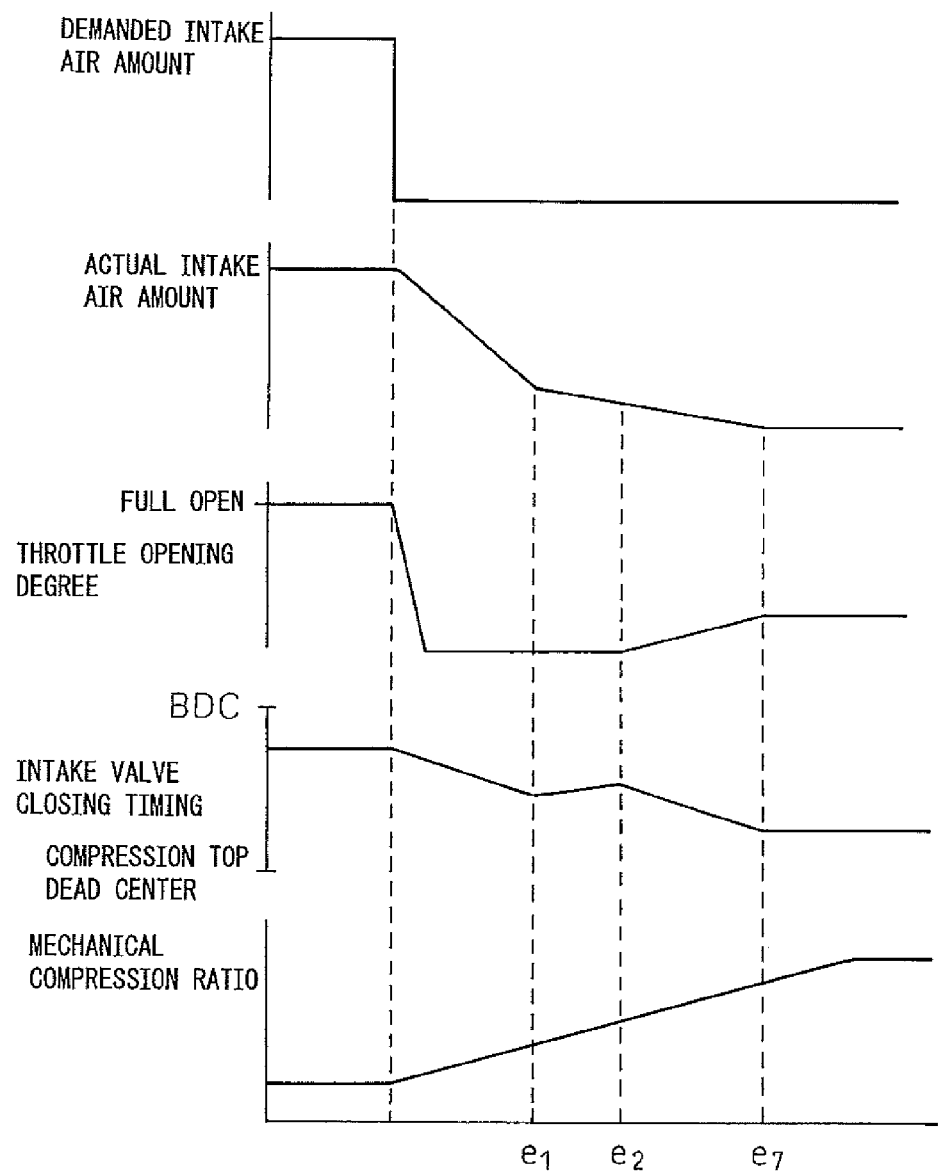
FIG. 41 is a time chart which shows changes in the mechanical compression ratio, the closing timing of the intake valve, the throttle opening degree, etc.

FIG. 40 and FIG. 41, as shown in FIG. 40, shows the case where the closing timing of the intake valve is made to advance slightly when the operating point reaches the movement guide plane YZ, then the operating point moves along the movement guide plane YZ toward the direction of increase of the mechanical compression ratio. At this time, if the actual intake air amount increases, the driver is given a strange felling, but as shown in FIG. 41, when the actual intake air amount does not increase between $e_1$ and $e_2$, the driver is not given a strange feeling. Therefore, in such a case, the closing timing of the intake valve can be advanced. That is, between $e_1$ and $e_2$, the closing timing of the intake valve can be made to advance, that is, can be made to move in a direction approaching intake bottom dead center in the range where the actual intake air amount does not change or is decreased.

Figure 42:
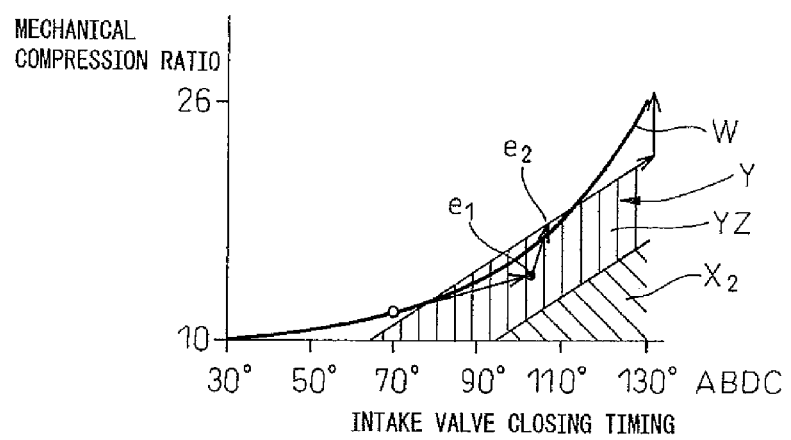
FIG. 42 is a view which shows a target operating point and an operating point.
Figure 43:
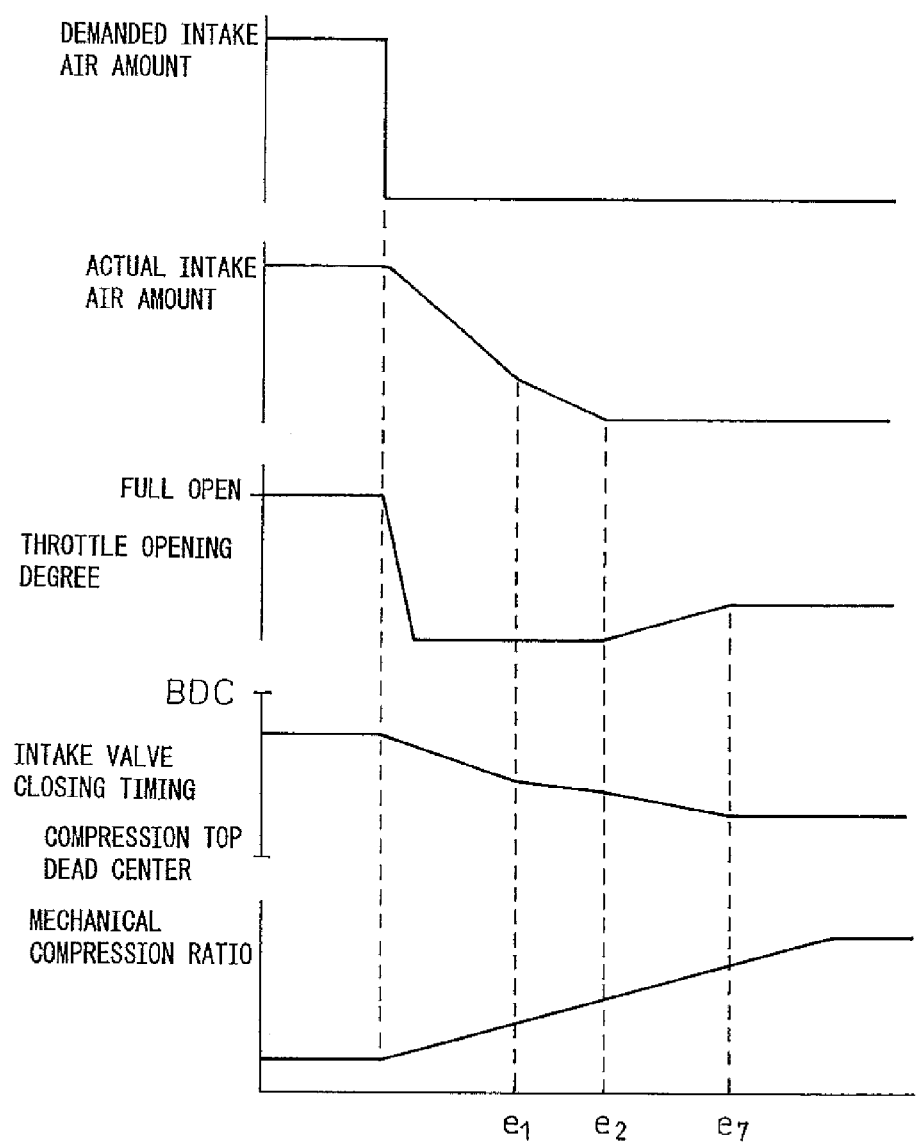
FIG. 43 is a time chart which shows changes in the mechanical compression ratio, the closing timing of the intake valve, the throttle opening degree, etc.

FIG. 42 and FIG. 43 show the case, as shown in FIG. 42, where the closing timing of the intake valve is retarded slightly when the operating point reaches the movement guide plane YZ, then the operating point moves along the movement guide plane YZ toward the direction of increase of the mechanical compression ratio. If retarding the closing timing of the intake valve in this way, the actual intake air amount is decreased quickly such as shown between $e_1$ and $e_2$ in FIG. 43. Therefore, a good feeling of vehicle deceleration is obtained. However, if retarding the closing timing of the intake valve, the risk arises of the operating point entering the no-entry layer Y. Therefore, the closing timing of the intake valve can be retarded, that is, is made to move in a direction away from intake bottom dead center in a range whereby the operating point will not enter the no-entry layer Y.

That is, in the embodiment according to the present invention, when the demanded intake air amount is made to decrease, an action to increase the mechanical compression ratio and an action to make the closing timing of the intake valve move in a direction away from intake bottom dead center are started. In the period after the operating point reaches the outer circumferencial face YZ of the no-entry layer Y, then is made to move along the outer circumferencial face YZ of the no-entry layer Y, the closing timing of the intake valve is retarded or advanced by a slower speed than the speed before reaching the outer circumference YZ or the action of retarding and advancing the closing timing of the intake valve is stopped. During this time, the mechanical compression ratio is made to increase by the maximum speed.

The method of control at the time of a deceleration operation explained from FIG. 28 to FIG. 43 is executed when the demanded intake air amount is rapidly decreased. In this embodiment according to the present invention, when the demanded intake air amount is made to decrease by a predetermined speed of decrease or more, it is judged that the demanded intake air amount is rapidly decreased. At this time, the deceleration operational control explained from FIG. 28 to FIG. 43 is executed. That is, in the embodiment according to the present invention, when the demanded intake air amount is made to decrease by a predetermined speed of decrease or more, the throttle valve 17 for controlling the intake air amount is made to fully close. At this time, the no-entry layer Y is set.

Further, in another embodiment according to the present invention, when the demanded intake air amount is made to decrease by a predetermined speed of decrease or more and the demanded intake air amount becomes a reference amount or less, it is judged that the demanded intake air amount is rapidly decreased. At this time, the throttle valve 17 is made to fully close and the no-entry layer Y is set. FIG. 44 to FIG. 47 show the routine for calculation of the target value when using such a judgment criteria.

Note that, in this routine, except for the initial control when the demanded intake air amount is made to rapidly decrease, the target operating point which can be reached after a predetermined fixed time is calculated for each this predetermined fixed time period. Therefore, the routine which is shown from FIGS. 44 to 47 is executed by interruption every this predetermined time period. This predetermined time period can be set in any way, but in the embodiment according to the present invention, this predetermined fixed time period is made 8 msec. Therefore, in the embodiment according to the present invention, the routine for calculation of the target value which is shown from FIGS. 44 to 47 is executed every 8 msec. The target operating point which can be reached after 8 msec from the current operating point is calculated every 8 msec.

Referring to FIGS. 44 to 47, first, at step 100, the demanded intake air amount GX is calculated. This demanded intake air amount GX, for example, is stored as a function of the amount of depression of the accelerator pedal 40 and the engine speed in advance in the ROM 32. Next, at step 101, the demanded operating point on the reference operating line W in accordance with the demanded intake air amount GX is calculated. Next, at step 102, it is judged if the rapid deceleration flag which is set at the time of rapid deceleration has been set. When the rapid deceleration flag has not been set, the routine proceeds to step 103.

At step 103, it is judged if the difference ($GX_1-GX$) between the demanded intake air amount $GX_1$ at the time of the previous interruption and the current demanded intake air amount GX is larger than a predetermined setting M, that is, if the demanded intake air amount GX has been caused to decrease by a predetermined speed of decrease or more. When the speed of decrease of the demanded intake air amount GX is less than the predetermined speed of decrease, the routine proceeds to step 106 of FIG. 45. As opposed to this, when the speed of decrease of the demanded intake air amount GX is the predetermined speed of decrease or more, the routine proceeds to step 104.

At step 104, it is judged if the demanded intake air amount GX becomes smaller than predetermined reference amount N. When GX≥N, the routine proceeds to step 106. As opposed to this, when GX<N, the routine proceeds to step 105 where the rapid deceleration flag is set. That is, the routine proceeds to step 105 where the rapid deceleration flag is set when the demanded intake air amount GX is made to decrease to a predetermined speed of deceleration or more and the demanded intake air amount GX becomes the reference amount N or less. At other times, the routine proceeds to step 106 of FIG. 45.

At step 106, it is judged if the current operating point is the demanded operating point. When the current operating point is the demanded operating point, the processing cycle is ended. As opposed to this, when the current operating point is not the demanded operating point, the routine proceeds to step 107 where it is judged if the demanded intake air amount GX is larger than the intake air amount GA at the current operating point.

Figure 15:
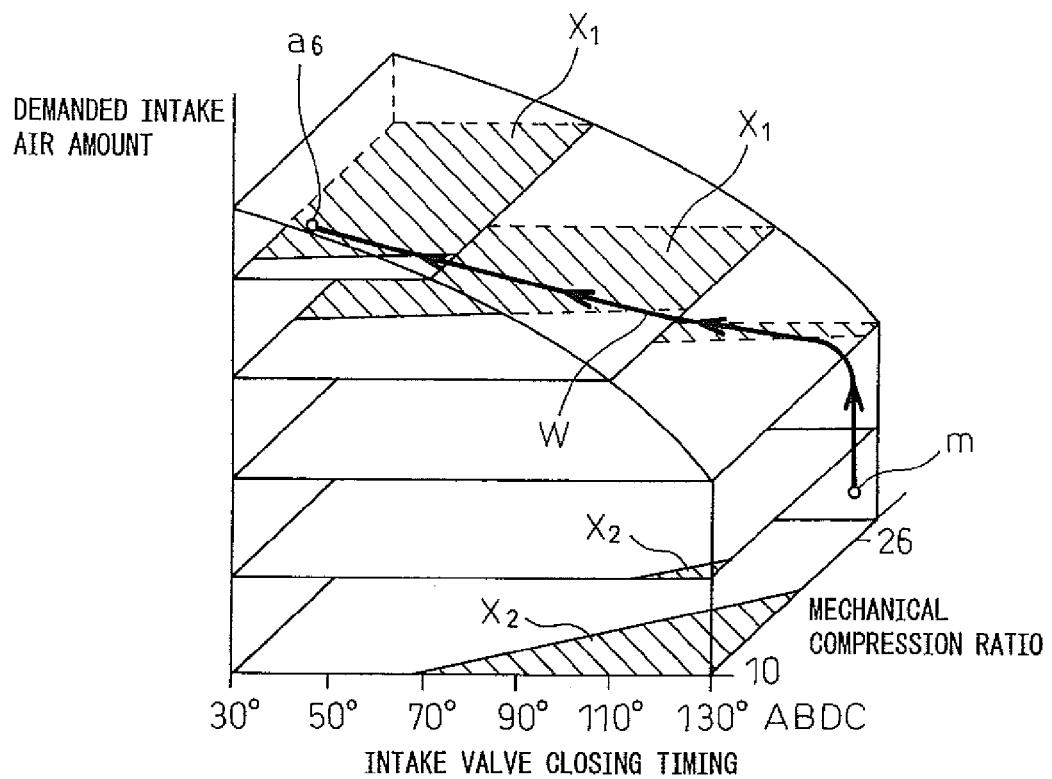
FIG. 15 is a view which shows changes in the mechanical compression ratio, the closing timing of the intake valve, and the throttle opening degree.

When GX>GA, that is, when increasing the intake air amount, the routine proceeds to step 108 where the target operating point is determined as explained based on FIG. 13 to FIG. 15. That is, at step 108, the closing timing of the intake valve which can be reached after a fixed time is calculated. Next, at step 109, the mechanical compression ratio which can be reached after a fixed time is calculated. At this time, the mechanical compression ratio which can be reached after a fixed time is calculated while considering the changeable amount of the mechanical compression ratio which was explained with reference to FIG. 16 and FIG. 17. Next, at step 110, the target throttle opening degree in accordance with the demanded intake air amount GX is calculated. This target throttle opening degree is usually made the full open degree when the demanded operating point is positioned on the throttle full open plane $Q_6$.

Next, at step 111, the target operating point is determined by the method which was explained based on FIG. 14. Next, at step 112, the target value of the mechanical compression ratio and the target value of the closing timing of the intake valve are calculated from the determined target operating point. The target value of the throttle opening degree is already calculated as the target throttle opening degree at step 110.

On the other hand, when, at step 107, it is judged that GX≤GA, that is, when the intake air amount should be decreased or the intake air amount becomes the demanded intake air amount, the routine proceeds to step 113 where, as explained based on FIG. 18 to FIG. 27, the target operating point is determined. That is, at step 131, the closing timing of the intake valve which can be reached after a fixed time is calculated, then, at step 114, the mechanical compression ratio which can be reached after a fixed time is calculated. At this time as well, the mechanical compression ratio which can be reached after a fixed time is calculated considering the changeable amount of the mechanical compression ratio which is explained with reference to FIG. 16 and FIG. 17. Next, at step 115, the target operating point is calculated, then, at step 116, the target throttle opening degree which satisfies the demanded intake air amount is calculated.

Figure 44:
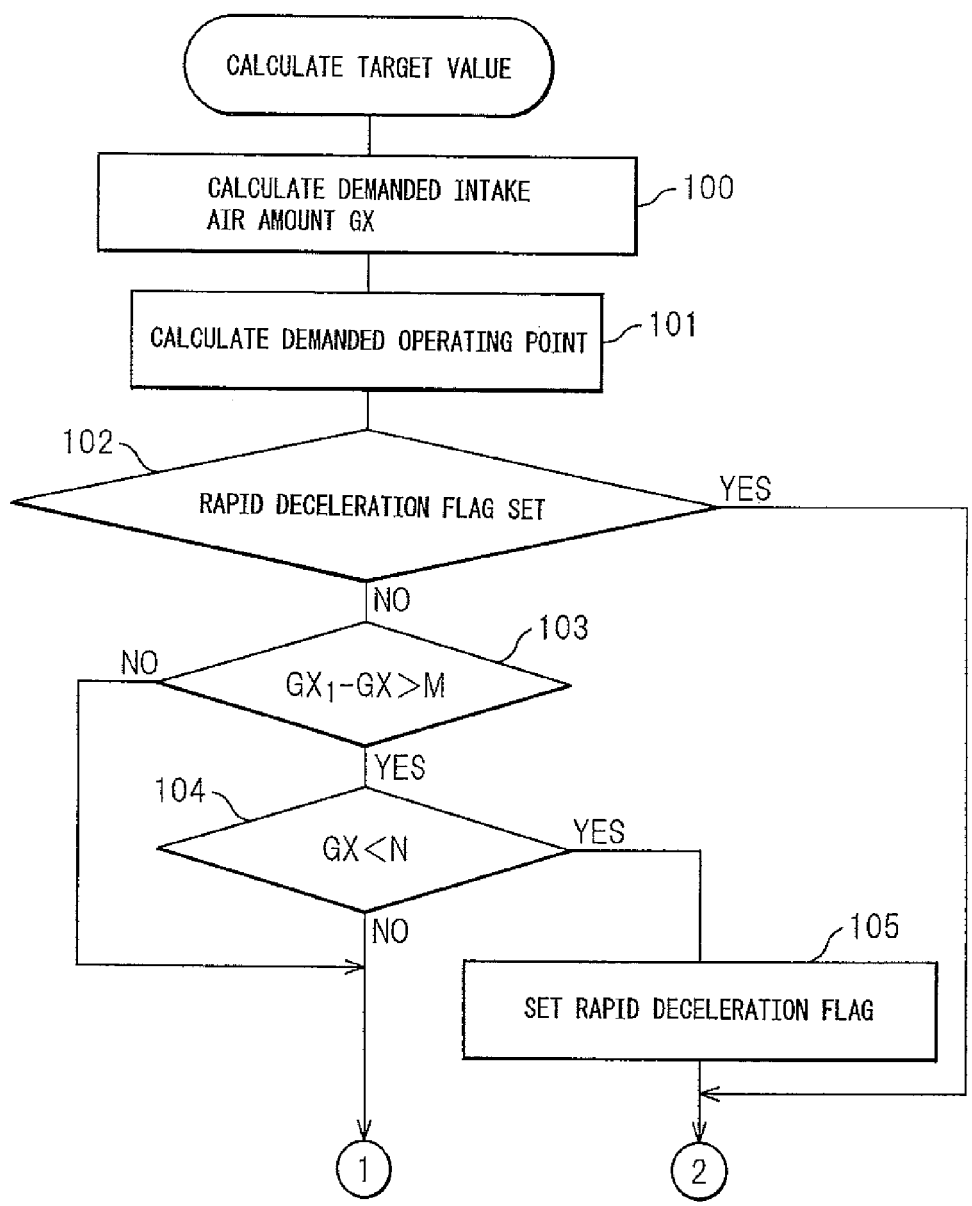
FIG. 44 is a flow chart for calculating a target value.
Figure 45:
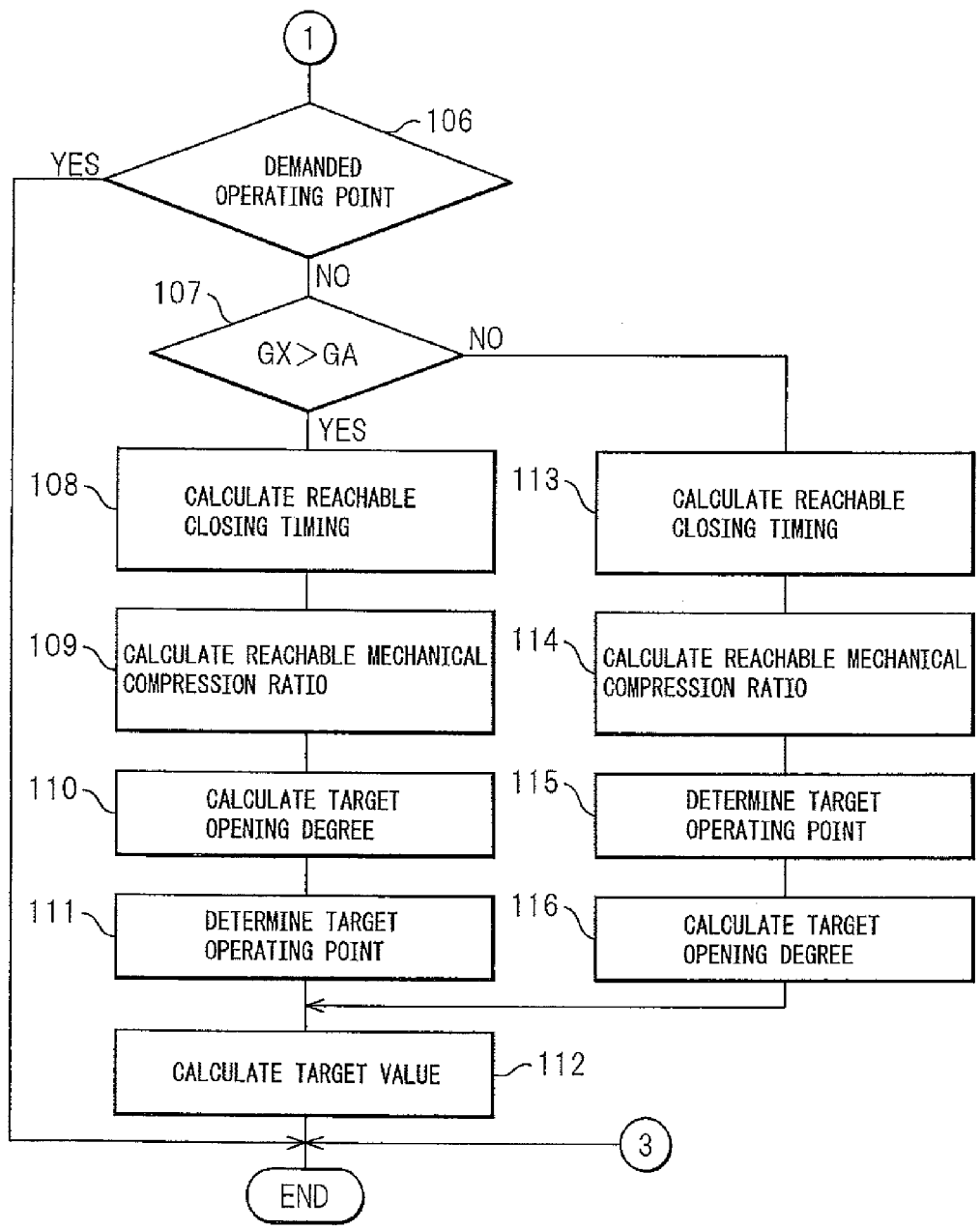
FIG. 45 is a flow chart for calculating a target value.
Figure 46:
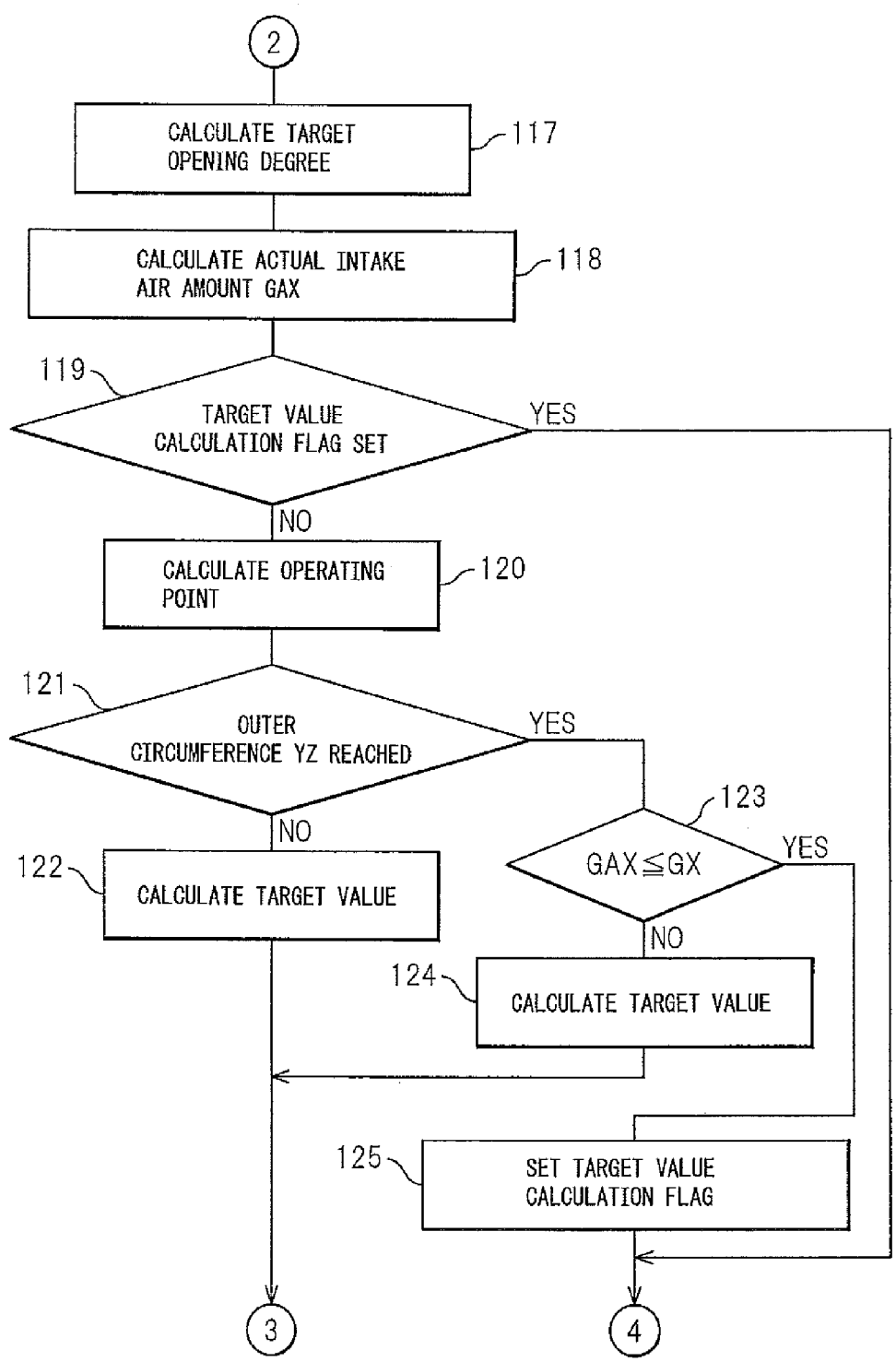
FIG. 46 is a flow chart for calculating a target value.

On the other hand, when the rapid deceleration flag is set at step 105 of FIG. 44, the routine proceeds to step 117 of FIG. 46. Note that, once the rapid deceleration flag is set, after that, the routine jumps from step 102 of FIG. 44 to step 117 of FIG. 46. At step 117, the target opening degree of the throttle valve 17 is calculated. After the rapid deceleration flag is set, when the routine proceeds to step 117 the first time, the target opening degree of the throttle valve 17 is made a predetermined minimum target opening degree, that is, fully closed. Note that, as explained with reference to FIG. 39, FIG. 41, and FIG. 43, the target opening degree of the throttle valve 17 is made fully closed, then after a while is made to gradually increase.

Next, at step 118, the pressure inside the surge tank 12, the closing timing of the intake valve, and the engine speed are used as the basis to calculate the actual intake air amount GAX. Next, at step 119, it is judged if a target value calculation flag for calculating the target value after the point $e_2$ at FIG. 39, FIG. 41 and FIG. 43 is set. When target value calculation flag is not set, the routine proceeds to step 120 where the current operating point which shows the combination of the mechanical compression ratio, the closing timing of the intake valve, and the actual intake air amount GAX is calculated.

Next, at step 121, it is judged if the operating point reaches the outer circumferencial face YZ of the no-entry layer Y. When the operating point does not reach the outer circumferencial face YZ of the no-entry layer, the routine proceeds to step 122 where the target values of the closing timing of the intake valve and the mechanical compression ratio are calculated. At this time, the target value of the closing timing of the intake valve is made the closing timing of the intake valve which can be reached after a fixed time when retarded by a speed which is shown by the solid line C at FIG. 28, while the target value of the mechanical compression ratio is made the mechanical compression ratio which can be reached after a fixed time considering the changeable amount of the mechanical compression ratio which is explained with reference to FIG. 16 and FIG. 17. Therefore, at this time, the closing timing of the intake valve is retarded by a speed which is shown by the solid line C in FIG. 28, while the mechanical compression ratio is made to increase by the maximum speed possible. Next, the processing cycle is ended.

On the other hand, when, at step 121, it is judged that the operating point reaches the outer circumferencial face XYZ of the no-entry layer Y, the routine proceeds to step 123 where it is judged if the actual intake air amount GAX becomes the demanded intake air amount GX or less. When GAX>GA, that is, when the actual intake air amount GAX is greater than the demanded intake air amount GA, the routine proceeds to step 124 where the target values of the closing timing of the intake valve and the mechanical compression ratio are calculated. At this time, the target value of the mechanical compression ratio is made the mechanical compression ratio which can be reached after a fixed time considering the changeable amount of the mechanical compression ratio which is explained with reference to FIG. 16 and FIG. 17. Therefore, at this time, the mechanical compression ratio is made to increase by the maximum speed possible.

On the other hand, at this time, the target value of the closing timing of the intake valve is left as the current closing timing of the intake valve, a somewhat advanced timing, or a somewhat retarded timing. Therefore, at this time, the closing timing of the intake valve is temporarily fixed, is somewhat advanced, or is somewhat retarded. Next, the processing cycle is ended. At this time, the operating point moves along the outer circumferencial face of the no-entry layer Y, that is, the movement guide plane YZ.

Figure 47:
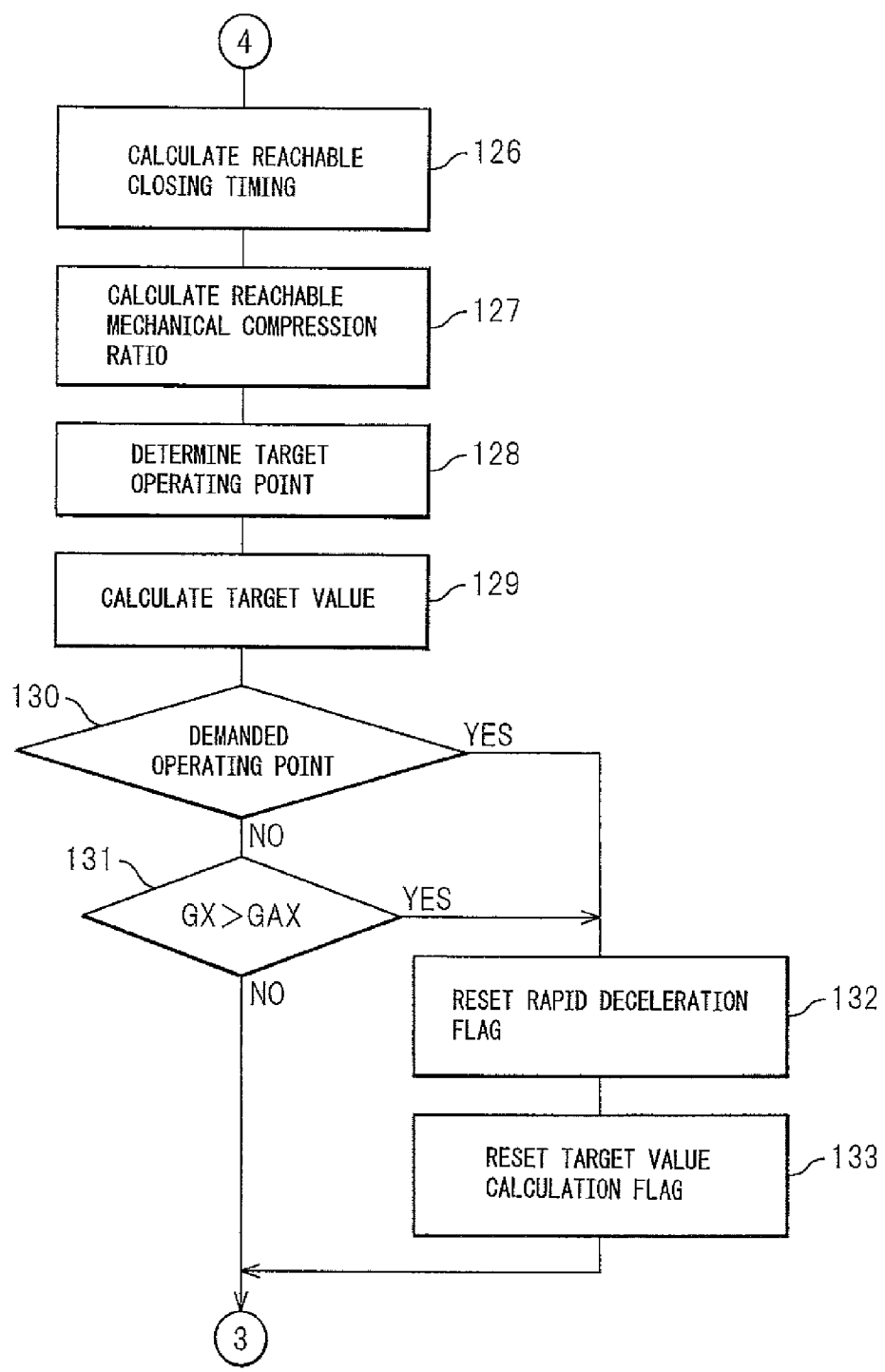
FIG. 47 is a flow chart for calculating a target value.

Next, when, at step 123, it is judged that GAX≤GX, that is, the actual intake air amount GAX falls to the demanded intake air amount GX, the routine proceeds to step 125 where the target calculation flag is set, then the routine proceeds to step 126 of FIG. 47. Note that, once the target calculation flag is set, the routine jumps from step 119 of FIG. 46 to step 126 of FIG. 47. At step 126, the closing timing of the intake valve which can be reached after a fixed time is calculated, then, at step 127, the mechanical compression ratio which can be reached after a fixed time is calculated. At this time as well, the mechanical compression ratio which can be reached after a fixed time considering the changeable amount of the mechanical compression ratio explained with reference to FIG. 16 and FIG. 17 is calculated.

Next, at step 128, the method which was explained based on FIG. 38 is used to determine the target operating point. Next, at step 129, the determined target operating point is used to calculate the target value of the mechanical compression ratio and the target value of the closing timing of the intake valve. Next, at step 130, it is judged if the current operating point is the demanded operating point "d" or not. When the current operating point is the demanded operating point "d", the routine proceeds to step 132 where the rapid deceleration flag is reset. Next, the routine proceeds to step 133 where the target value calculation flag is reset, then the processing cycle is ended.

On the other hand, when, at step 130, it is judged that the current operating point is not the demanded operating point "d", the routine proceeds to step 131 where it is judged if the demanded intake air amount GX becomes higher than the actual intake air amount GAX. When GX≤GAX, the processing cycle is ended. As opposed to this, when GX>GAX, for example, when an acceleration operation is performed during deceleration, the routine proceeds from step 131 to step 132 where ordinary control is returned to.

Figure 48:
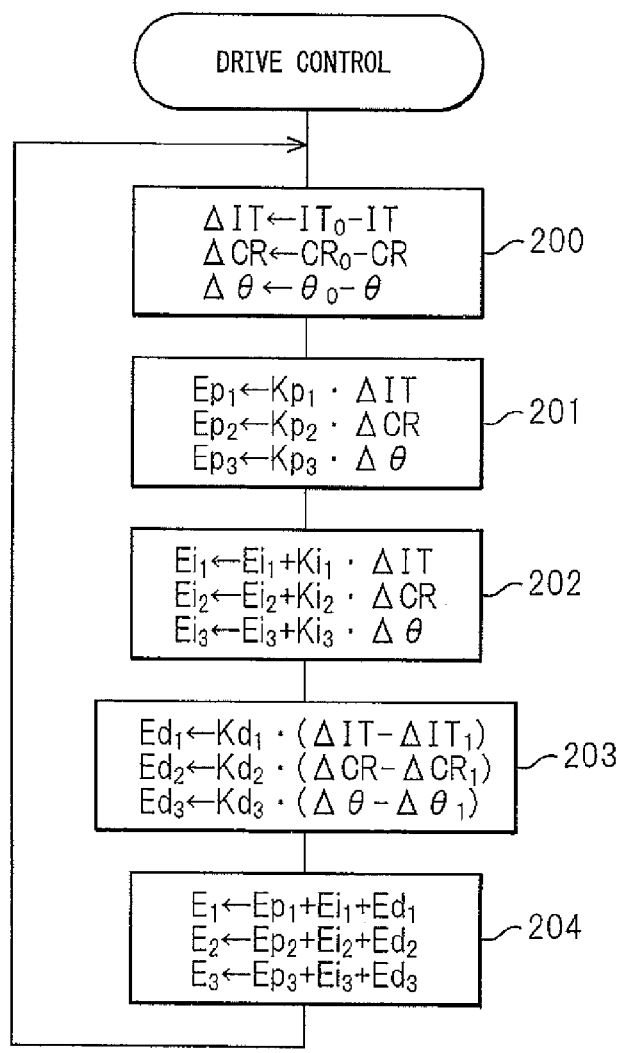
FIG. 48 is a flow chart for drive control of the variable compression ratio mechanism etc.

FIG. 48 shows the drive routine for driving the variable compression ratio mechanism A, variable valve timing mechanism B, and throttle valve 17 using PID control so that the mechanical compression ratio, the closing timing of the intake valve, and the throttle opening degree become the calculated target values in the routine shown from FIG. 44 to FIG. 47. This routine is repeatedly executed when the operation of the engine is started.

Referring to FIG. 48, at step 200, the difference $\Delta IT$ (=$IT_0$−IT) between the target value $IT_0$ of the closing timing of the intake valve and the current closing timing IT of the intake valve is calculated, the difference $\Delta CR$ (=$CR_0$−CR) between the target value $CR_0$ of the mechanical compression ratio and the current mechanical compression ratio CR is calculated, and the difference $\Delta\theta(\theta_0-\theta)$ between the target value $\theta_0$ of the throttle opening degree and the current throttle opening degree $\theta$ is calculated.

Next, at step 201, $\Delta IT$ is multiplied with the proportional constant $K_{p1}$ to calculate the proportional term $E_{p1}$ of the drive voltage for the variable valve timing mechanism B, $\Delta CR$ is multiplied with the proportional constant $K_{p2}$ to calculate the proportional term $E_{p2}$ of the drive voltage for the variable compression ratio mechanism A, and $\Delta\theta$ is multiplied with the proportional constant $K_{p3}$ to calculate the proportional term $E_{p3}$ of the drive voltage for the throttle valve 17.

Next, at step 202, $\Delta IT$ is multiplied with the integral constant $K_{i1}$ and this multiplication result ($K_{i1} \cdot \Delta IT$) is cumulatively added to calculate the integral term $E_{i1}$ of the drive voltage for the variable valve timing mechanism B, $\Delta CR$ is multiplied with the integral constant $K_{i2}$ and this multiplication result ($K_{i2} \cdot \Delta CR$) is cumulatively added to calculate the integral term $E_{i2}$ of the drive voltage for the variable compression ratio mechanism A, and $\Delta\theta$ is multiplied with the integral constant $K_{i3}$ and this multiplication result ($K_{i3} \cdot \Delta\theta$) is cumulatively added to calculate the integral term $E_{i3}$ of the drive voltage for the throttle valve 17.

Next, at step 203, the difference ($\Delta IT - \Delta IT_1$) between the current $\Delta IT$ and the previously calculated $\Delta IT_1$ is multiplied with the differential constant $K_{d1}$ to calculate the differential term $E_{d1}$ of the drive voltage for the variable valve timing mechanism B, the difference ($\Delta CR - \Delta CR_1$) between the current $\Delta CR$ and the previously calculated $\Delta CR_1$ is multiplied with the differential constant $K_{d2}$ to calculate the differential term $E_{d2}$ of the drive voltage for the variable compression ratio mechanism A, and the difference ($\Delta\theta - \Delta\theta_1$) between the current $\Delta\theta$ and the previously calculated $\Delta f_1$ is multiplied with the differential constant $K_{d3}$ to calculate the differential term $E_{d3}$ of the drive voltage for the throttle valve 17.

Next, at step 204, the proportional term $E_{p1}$, the integral term $E_{i1}$, and the differential term $E_{d1}$ are added to calculate the drive voltage $E_1$ for the variable valve timing mechanism B, the proportional term $E_{p2}$, the integral term $E_{i2}$, and the differential term $E_{d2}$ are added to calculate the drive voltage $E_2$ for the variable compression ratio mechanism A, and the proportional term $E_{p3}$, the integral term $E_{i3}$, and the differential term $E_{d3}$ are added to calculate the drive voltage $E_3$ for the throttle valve 17.

If the variable valve timing mechanism B, the variable compression ratio mechanism A, and the throttle valve 17 are driven in accordance with these drive voltage $E_1$, $E_2$, and $E_3$, the closing timing of the intake valve, the mechanical compression ratio, and the throttle opening degree are respectively changed toward the successively changing target values.

REFERENCE SIGNS LIST

1 . . . crankcase
2 . . . cylinder block
3 . . . cylinder head
4 . . . piston
5 . . . combustion chamber
7 . . . intake valve
17 . . . throttle valve
70 . . . intake valve drive-use camshaft
A . . . variable compression ratio mechanism
B . . . variable valve timing mechanism
$X_1$, $X_2$ . . . no-entry region
Y . . . no-entry layer
YZ . . . movement guide plane

The invention claimed is:

1. A spark ignition type internal combustion engine comprising a variable compression ratio mechanism which can change a mechanical compression ratio and a variable valve timing mechanism which can control a closing timing of an intake valve, wherein a no-entry region for a combination of a mechanical compression ratio, a closing timing of an intake valve and an intake air amount is set, an operating point showing the combination of the mechanical compression ratio, the closing timing of the intake valve and the intake air amount is prohibited from entering the no-entry region regardless of an operating state of the engine, the no-entry region has a broadest region at the time of a minimum intake air amount and gradually becomes smaller as the intake air amount increases, a no-entry layer is set which extends along an edge of the no-entry region at the time of the minimum intake air amount and which extends from the no-entry region toward an intake air amount increase side while surrounding the no-entry region as the intake air amount increases from the minimum intake air amount, said operating point is prohibited from entering the no-entry layer when the demanded intake air amount is made to decrease and said operating point moves toward the no-entry region, and thereby said operating point is blocked from entering the no-entry region.

2. The spark ignition type internal combustion engine as claimed in claim 1 wherein after the demanded intake air amount is made to decrease and said operating point reaches an outer circumferential face of the no-entry layer, said operating point is made to move along the outer circumferential face of the no-entry layer.

3. The spark ignition type internal combustion engine as claimed in claim 2 wherein when the demanded intake air amount is made to decrease, an action to increase the mechanical compression ratio and an action to make the closing timing of the intake valve move in a direction away from intake bottom dead center are started and, during the period said operating point is made to move along the outer circumferential face of the no-entry layer after said operating point reaches the outer circumferential face of the no-entry layer, the closing timing of the intake valve is retarded or advanced by a speed slower than a speed before reaching said circumferential face or an action of advancing and retarding the closing timing of the intake valve is stopped, the mechanical compression ratio being made to increase by a maximum speed during this period.

4. The spark ignition type internal combustion engine as claimed in claim 1 wherein when the demanded intake air amount is made to decrease, an action to increase the mechanical compression ratio and an action to make the closing timing of the intake valve move in a direction away from intake bottom dead center are started and, at this time, a speed of making the closing timing of the intake valve move in a direction away from intake bottom dead center is made a predetermined speed which enables an actual intake air to be decreased to a minimum intake air amount in a shortest time when the demanded intake air amount is made to decrease to the minimum intake air amount.

5. The spark ignition type internal combustion engine as claimed in claim 1 wherein when the demanded intake air amount is made to decrease by a predetermined speed of decrease or more, a throttle valve for control of the intake air amount is made to fully close.

6. The spark ignition type internal combustion engine as claimed in claim 5 wherein when the demanded intake air amount is made to decrease by less then the predetermined speed of decrease, a target operating point which can be reached after a fixed time without entering the no-entry region from a current operating point toward the operating point which satisfies the demanded intake air amount is calculated for the mechanical compression ratio and the closing timing of the intake valve, the mechanical compression ratio and the closing timing of the intake valve are made to change toward the calculated target operating point, and, at this time, the throttle opening degree is made to change in accordance with the demanded intake air amount so that the throttle opening degree does not enter the no-entry region.

7. The spark ignition type internal combustion engine as claimed in claim 6 wherein said target operating point is made an operating point which is the furthest from the current operating point among the operating points which can be reached after a fixed time without entering said no-entry region from the current operating point to the operating point which satisfies the demanded intake air amount.

* * * * *